US009591454B2

(12) United States Patent
Julian et al.

(10) Patent No.: US 9,591,454 B2
(45) Date of Patent: Mar. 7, 2017

(54) COMPUTATIONAL COMPLEXITY REDUCTION OF TRAINING WIRELESS STRENGTH-BASED PROBABILISTIC MODELS FROM BIG DATA

(71) Applicant: Google Inc., Mountain View, CA (US)

(72) Inventors: Brian John Julian, Cupertino, CA (US); Etienne Le Grand, Mountain View, CA (US); Brian Patrick Williams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 62 days.

(21) Appl. No.: 14/843,935

(22) Filed: Sep. 2, 2015

(65) Prior Publication Data

US 2016/0080905 A1 Mar. 17, 2016

Related U.S. Application Data

(60) Provisional application No. 62/049,245, filed on Sep. 11, 2014.

(51) Int. Cl.
*G01R 31/08* (2006.01)
*H04W 4/02* (2009.01)
(Continued)

(52) U.S. Cl.
CPC ........... *H04W 4/025* (2013.01); *H04W 24/08* (2013.01); *H04W 64/00* (2013.01)

(58) Field of Classification Search
CPC ..... H04W 24/00; H04L 41/142; G01S 5/0278
See application file for complete search history.

(56) References Cited

U.S. PATENT DOCUMENTS

| 7,979,252 B2 | 7/2011 | Horvitz et al. |
| 2013/0244688 A1 | 9/2013 | Huang et al. |
| 2014/0139375 A1 | 5/2014 | Faragher et al. |

OTHER PUBLICATIONS

M. Angermann et al., "Characterization of the Indoor Magnetic Field for Applications in Localization and Mapping", Proceedings of 2012 International Conference on Indoor Positioning and Indoor Navigation, Nov. 15, 2012, p. 1-9.

(Continued)

*Primary Examiner* — Shaq Taha
(74) *Attorney, Agent, or Firm* — McDonnell Boehnen Hulbert & Berghoff LLP

(57) ABSTRACT

Disclosed are apparatus and methods for providing outputs; e.g., location estimates, based on signal strength measurements. A computing device can receive a particular signal strength measurement, which can include a wireless-signal-emitter (WSE) identifier and a signal strength value and can be associated with a measurement location. The computing device can determine one or more bins; each bin including statistics for WSEs and associated with a bin location. The statistics can include mean and standard deviation values. The computing device can: determine a particular bin whose bin location is associated with the measurement location for the particular signal strength measurement, determine particular statistics of the particular bin associated with a wireless signal emitter identified by the WSE identifier of the particular signal strength measurement, and update the particular statistics based on the signal strength value. The computing device can provide an estimated location output based on the bins.

20 Claims, 23 Drawing Sheets

(51) Int. Cl.
*H04W 24/08* (2009.01)
*H04W 64/00* (2009.01)

(56) References Cited

OTHER PUBLICATIONS

G. C. Cawley et al., "Fast exact leave-one-out cross-validation of sparse least-squares support vector machines", Neural Networks, Dec. 2004, pp. 1467-75, vol. 17, Issue 10.
B. Ferris, "WiFi-SLAM Using Gaussian Process Latent Variable Models", Proceedings of the 20th International Joint Conference on Artificial Intelligence, Jan. 9, 2007, pp. 2480-2485.
M. Frassl et al., "Magnetic Maps of Indoor Environments for Precise Localization of Legged and Non-legged Locomotion", Proceedings of 2013 IEEE/RSJ International Conference on Intelligent Robots and Systems (IROS), Nov. 3, 2013, pp. 913-920.
Z. Gharamani, "A Tutorial on Gaussian Processes", Nov. 8, 2010.
P.W. Goldberg et al., "Regression with Input-dependent Noise: A Gaussian Process Treatment", Advances in Neural Information Processing Systems 10, Dec. 1, 1997, pp. 493-499.
B. J. Julian et al., "Distributed Approximation of Joint Measurement Distributions Using Mixtures of Gaussians", Robotics Science and Systems VIII, Jul. 9, 2012, pp. 169-176.
B. J. Julian, "Calculating Mean Wireless Signal Strengths Using a Gaussian Process Approach Incorporating Predictive Standard Deviations", U.S. Appl. No. 14/843,941, filed Sep. 2, 2015.
B. J. Julian et al., "Data Driven Evaluation and Rejection of Trained Gaussian Process-Based Wireless Mean and Standard Deviation Models", U.S. Appl. No. 14/843,955, filed Sep. 2, 2015.
B. J. Julian et al., "Gaussian Process-Based Approach for Identifying Correlation Between Wireless Signals", U.S. Appl. No. 14/843,961, filed Sep. 2, 2015.
K. Kersting et al., "Most likely heterscedatic gaussian process regression", Proceedings of the 24th International Conference on Machine Learning, Jun. 20, 2007, pp. 393-400.
C.E. Rasumussen et al., "Gaussian Processes for Machine Learning", Second Printing, 2006.
SAS Institute,"SAS/STAT(R) 9.2 User's Guide, Second Edition, Prior Distributions", May 9, 2010, available via the Internet at web.archive.org/web/20100509150438/http://support.sas.com/documentation/cd1/en/statug/63033/HTML/default/viewer.htm#statug_introbayes_sect004.htm (last visited Sep. 2, 2015).
H. Wang et al., "No Need to War-Drive: Unsupervised Indoor Localization", Proceedings of the 10th International Conference on Mobile Systems, Applications, and Services, Jun. 25, 2012, pp. 197-210.
Wikimedia Foundation, Inc., "Conjugate Prior", Wikipedia, Mar. 12, 2014.
Wikimedia Foundation, Inc., "Gaussian Process", Wikipedia, Jun. 20, 2014.
Wikimedia Foundation, Inc., "Heteroscedasticity", Wikipedia, Jun. 3, 2014.
Wikimedia Foundation, Inc., "Homoscedasticity", Wikipedia, Apr. 11, 2014.
Wikimedia Foundation, Inc., "Hyperparameter", Wikipedia, Mar. 1, 2014.
Wikimedia Foundation, Inc., "Normal-gamma distribution", Wikipedia, May 5, 2014.
Wikimedia Foundation, Inc., "Spatial database", Wikipedia, Apr. 30, 2014.
Wikimedia Foundation, Inc., "Student's t-distribution", Wikipedia, Jun. 25, 2014.

Measurement Bin Data 460

Bin Index 462
Physical Location Information 464
Discarded Indicator 466
NWSE = Number of WSEs with SSMs 468
For each Wireless Signal Emitter (WSE):
    WSE Identifier(s) 470
    SSM Data 472 (SSM values)
    Statistics Data 474
        Number of Observed SSMs 476a
        Mean SSM Value 476b
        Std. Dev of Observed SSMs 476c
    GP Reference(s) 478
...

Measurement Bin Operations 480

Add SSM(s) 482
Age SSM(s) 484
Update Bin Statistics 486
Mark Bin as Discarded 488a
Mark Bin as Active (not Discarded) 488b
Merge Bin with Another Bin 490
Split Bin 492
Access Bin Data 494
    Bin Index Accessor 496a
    Location Information Accessor 496b
    Associated AP(s) Accessor 496c
...

FIG. 4F

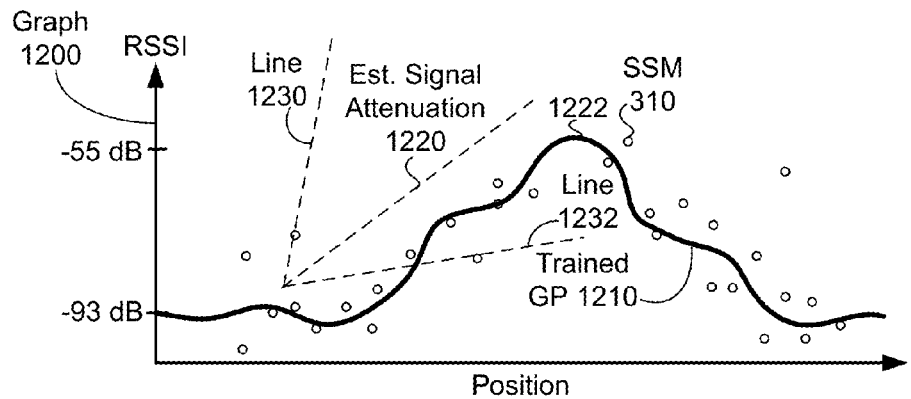
FIG. 12
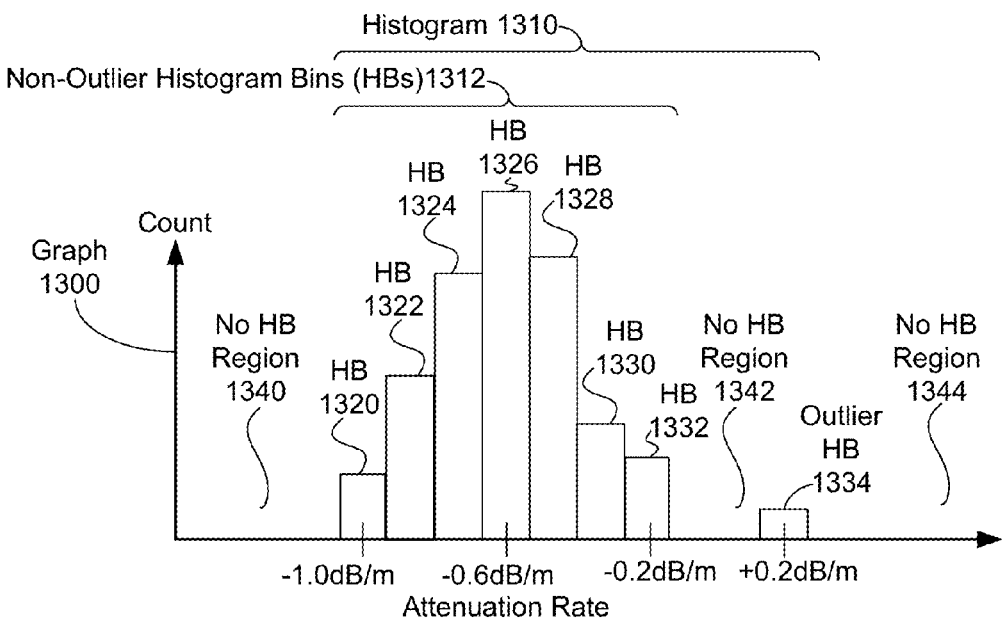
FIG. 13A
Hyperparameter Histogram 1350
    Hyperparameter ID 1352
    Number of Histogram Bins 1354
    For each Histogram Bin
        Hyperparameter Range 1360
        Hyperparameter Count 1362
        Outlier Indicator 1364
FIG. 13B

Verified GPs 152

GP Dependency Checking Module 160

1510 Determine set of NCHP Comparison Hyperparameters
    for GPs, 0 < NCHP ≤ total number of hyperparameters NHP.
1520 Select a set SGP of N Verified GPs, GP1, GP2, ..., N > 1
    each GP in SGP associated with location L.
1522 Initially indicate each GP in SGP is independent.
1530 FOR each pair GP1, GP2 of GPs in SGP:
1532     indep = 0;
1534     IF ((GP1 is indicated as independent) AND
            (GP2 is indicated as independent))
1540         FOR each hyperparameter HP(i) of the NCHP Comparison
                Hyperparameters:
1542             IF (distance(GP1.HP(i), GP2.HP(i)) > threshold(HP(i)))
1544                 indep = 1;
1550             END IF // distance(....)
1552         END FOR // each hyperparameter
1554         IF (indep == 0)
                Mark at least one of GP1 and GP2 as dependent.
1556         END IF // (indep == 0)
1560     END IF // ((GP1 is independent) ....
1570 END FOR // each pair GP1, GP2
1572 Output each GP in SGP that is marked as an independent GP.
1580 If more verified GPs, return to 1510.

Independent GPs 162

FIG. 15

Example Gaussian Process Data 1610
    Gaussian Process Identifier 1620
    Physical Location Information 1630
    Verification Indicator 1640
    Independence Indicator 1642
    Wireless Signal Emitter Identifier 1650
    Number of Hyperparameters (NHP) 1660
        Hyperparameter 1 Value 1662
        Hyperparameter 2 Value 1664
        ...
        Hyperparameter NHP Value 1666
    ...

FIG. 16

COMPUTATIONAL COMPLEXITY REDUCTION OF TRAINING WIRELESS STRENGTH-BASED PROBABILISTIC MODELS FROM BIG DATA

CROSS-REFERENCE TO RELATED APPLICATIONS

This application claims priority to U.S. Patent App. No. 62/049,245, entitled "Computational Complexity Reduction of Training Wireless Strength-Based Probabilistic Models from Big Data", filed Sep. 11, 2014, the contents of which are fully incorporated by reference herein for all purposes.

BACKGROUND

Unless otherwise indicated herein, the materials described in this section are not prior art to the claims in this application and are not admitted to be prior art by inclusion in this section.

A number of applications for mobile computing devices, such as mobile telephones, utilize location information. A variety of technologies exist for determining location information about mobile computing devices. One location technology is the Global Positioning System (GPS) technology, which involves processing signals from a number of satellites (typically 3 or 4) and determining location based on the processed signals.

GPS technology provides fairly accurate results, but can consume a great deal of power and so rapidly drains power of mobile computing devices. At some times, too few satellites are in range of a mobile device to enable GPS location of the mobile device. Other location systems involve use of triangulating radio (or other electromagnetic) waves, but these systems are not always accurate and may have significant environmental restrictions. For example, infrared or microwave systems are line of sight only and so may not be accurate for outdoor locations. Further, in some areas, radio wave-based triangulation systems may not have enough wave sources to enable triangulation.

SUMMARY

In one aspect, a method is provided. A computing device receives a plurality of signal strength measurements. A particular signal strength measurement of the plurality of signal strength measurements includes a wireless-signal-emitter identifier and a signal strength value and is associated with a measurement location. The computing device determines a plurality of measurement bins. A particular measurement bin is associated with a bin location and includes a plurality of statistics for each of one or more wireless signal emitters. The plurality of statistics include a mean value and a standard deviation value. The computing device determines a particular measurement bin of the plurality of measurement bins, where the particular measurement bin has a bin location associated with the measurement location of the particular signal strength measurement. The computing device determines a particular plurality of statistics of the particular measurement bin that are associated with a wireless signal emitter identified by the wireless-signal-emitter identifier of the particular signal strength measurement. The computing device updates the particular plurality of statistics based on the signal strength value of the particular signal strength measurement. The computing device provides an estimation location output based on the plurality of measurement bins.

In another aspect, a computing device is provided. The computing device includes one or more processors and data storage. The data storage is configured to store at least computer-readable program instructions. The instructions are configured to cause, upon execution by the one or more processors, the computing device to perform functions. The functions include: receiving a plurality of signal strength measurements, where a particular signal strength measurement of the plurality of signal strength measurements includes a wireless-signal-emitter identifier and a signal strength value and is associated with a measurement location; determining a plurality of measurement bins, where a particular measurement bin of the plurality of measurement bins is associated with a bin location, where the particular measurement bin includes a plurality of statistics for each of one or more wireless signal emitters, and where the plurality of statistics include a mean value and a standard deviation value; determining a particular measurement bin of the plurality of measurement bins, the particular measurement bin having a bin location associated with the measurement location of the particular signal strength measurement; determining a particular plurality of statistics of the particular measurement bin that are associated with a wireless signal emitter identified by the wireless-signal-emitter identifier of the particular signal strength measurement; updating the particular plurality of statistics based on the signal strength value of the particular signal strength measurement; and providing an estimated location output based on the plurality of measurement bins.

In another aspect, an article of manufacture is provided. The article of manufacture includes a computer-readable storage medium that has instructions stored thereon that, in response to execution by one or more processors, cause the one or more processors to perform functions. The functions include: receiving a plurality of signal strength measurements, where a particular signal strength measurement of the plurality of signal strength measurements includes a wireless-signal-emitter identifier and a signal strength value and is associated with a measurement location; determining a plurality of measurement bins, where a particular measurement bin of the plurality of measurement bins is associated with a bin location, where the particular measurement bin includes a plurality of statistics for each of one or more wireless signal emitters, and where the plurality of statistics include a mean value and a standard deviation value; determining a particular measurement bin of the plurality of measurement bins, the particular measurement bin having a bin location associated with the measurement location of the particular signal strength measurement; determining a particular plurality of statistics of the particular measurement bin that are associated with a wireless signal emitter identified by the wireless-signal-emitter identifier of the particular signal strength measurement; updating the particular plurality of statistics based on the signal strength value of the particular signal strength measurement; and providing an estimation location output based on the plurality of measurement bins.

In another aspect, a computing device is provided. The computing device includes: means for receiving a plurality of signal strength measurements, where a particular signal strength measurement of the plurality of signal strength measurements includes a wireless-signal-emitter identifier and a signal strength value and is associated with a measurement location; means for determining a plurality of measurement bins, where a particular measurement bin of the plurality of measurement bins is associated with a bin location, where the particular measurement bin includes a plurality of statistics for each of one or more wireless signal emitters, and where the plurality of statistics include a mean value and a standard deviation value; means for determining a particular measurement bin of the plurality of measurement bins, the particular measurement bin having a bin location associated with the measurement location of the particular signal strength measurement; means for determining a particular plurality of statistics of the particular measurement bin that are associated with a wireless signal emitter identified by the wireless-signal-emitter identifier of the particular signal strength measurement; means for updating the particular plurality of statistics based on the signal strength value of the particular signal strength measurement; and means for providing an estimation location output based on the plurality of measurement bins.

In one aspect, a method is provided. A computing device determines a plurality of measurement bins. A particular measurement bin of the plurality of measurement bins is associated with one or more wireless signal emitters. The particular measurement bin includes a mean signal strength value and a standard deviation of signal strength values for each wireless signal emitter of the one or more wireless signal emitters associated with the measurement bin. The computing device determines a designated wireless signal emitter. The computing device determines a collection of measurement bins of the plurality of measurement bins, where a particular measurement bin in the collection of measurement bins is associated with the designated wireless signal emitter. The computing device trains a mean Gaussian process for the designated wireless signal emitter based on the mean signal strength values of the collection of measurement bins and the standard deviation of signal strength values of the collection of measurement bins. The mean Gaussian process is associated with a covariance matrix. A particular diagonal entry of the covariance matrix is based upon a standard deviation of signal strength values of a corresponding measurement bin in the collection of measurement bins. The computing device provides an estimated location based on the trained mean Gaussian process.

In another aspect, a computing device is provided. The computing device includes one or more processors and data storage. The data storage is configured to store at least computer-readable program instructions. The instructions are configured to cause, upon execution by the one or more processors, the computing device to perform functions. The functions include: determining a plurality of measurement bins, where a particular measurement bin of the plurality of measurement bins is associated with one or more wireless signal emitters, and where the particular measurement bin includes a mean signal strength value and a standard deviation of signal strength values for each wireless signal emitter of the one or more wireless signal emitters associated with the particular measurement bin; determining a designated wireless signal emitter; determining a collection of measurement bins of the plurality of measurement bins, where a particular measurement bin in the collection of measurement bins is associated with the designated wireless signal emitter; training a mean Gaussian process to model signals emitted by the designated wireless signal emitter based on the mean signal strength values of the collection of measurement bins and the standard deviation of signal strength values of the collection of measurement bins, where the mean Gaussian process is associated with a covariance matrix, and where a particular diagonal entry of the covariance matrix is based upon a standard deviation of signal strength values of a corresponding measurement bin in the collection of measurement bins; and providing an estimated location based on the trained mean Gaussian process.

In another aspect, an article of manufacture is provided. The article of manufacture includes a computer-readable storage medium having instructions stored thereon that, in response to execution by one or more processors, cause the one or more processors to perform functions. The functions include: determining a plurality of measurement bins, where a particular measurement bin of the plurality of measurement bins is associated with one or more wireless signal emitters, and where the particular measurement bin includes a mean signal strength value and a standard deviation of signal strength values for each wireless signal emitter of the one or more wireless signal emitters associated with the particular measurement bin; determining a designated wireless signal emitter; determining a collection of measurement bins of the plurality of measurement bins, where a particular measurement bin in the collection of measurement bins is associated with the designated wireless signal emitter; training a mean Gaussian process to model signals emitted by the designated wireless signal emitter based on the mean signal strength values of the collection of measurement bins and the standard deviation of signal strength values of the collection of measurement bins, where the mean Gaussian process is associated with a covariance matrix, and where a particular diagonal entry of the covariance matrix is based upon a standard deviation of signal strength values of a corresponding measurement bin in the collection of measurement bins; and providing an estimated location based on the trained mean Gaussian process.

In another aspect, a computing device is provided. The computing device includes: means for determining a plurality of measurement bins, where a particular measurement bin of the plurality of measurement bins is associated with one or more wireless signal emitters, and where the particular measurement bin includes a mean signal strength value and a standard deviation of signal strength values for each wireless signal emitter of the one or more wireless signal emitters associated with the particular measurement bin; means for determining a designated wireless signal emitter; means for determining a collection of measurement bins of the plurality of measurement bins, where a particular measurement bin in the collection of measurement bins is associated with the designated wireless signal emitter; means for training a mean Gaussian process to model signals emitted by the designated wireless signal emitter based on the mean signal strength values of the collection of measurement bins and the standard deviation of signal strength values of the collection of measurement bins, where the mean Gaussian process is associated with a covariance matrix, and where a particular diagonal entry of the covariance matrix is based upon a standard deviation of signal strength values of a corresponding measurement bin in the collection of measurement bins; and means for providing an estimated location based on the trained mean Gaussian process.

In one aspect, a method is provided. A computing device determines a plurality of trained Gaussian processes related to signal strengths of wireless networks. A particular trained Gaussian process in the plurality of trained Gaussian processes is associated with one or more hyperparameters. The computing device determines one or more designated hyperparameters of the one or more hyperparameters. The computing device determines a hyperparameter histogram of a plurality of values of the one or more designated hyperparameters, where one or more particular values in the plurality of values are one or more values for the designated hyperparameters associated with a trained Gaussian process of the plurality of trained Gaussian processes. After determining the hyperparameter histogram, the computing device determines a candidate Gaussian process, where the candidate Gaussian process is associated with one or more candidate hyperparameter values for the one or more designated hyperparameters. The computing device determines whether the one or more candidate hyperparameter values are valid based on the hyperparameter histogram. After determining that the one or more candidate hyperparameter values are valid, the computing device adds the candidate Gaussian process to the plurality of trained Gaussian processes. The computing device provides an estimated location output based on the plurality of trained Gaussian processes.

In another aspect, a computing device is provided. The computing device includes one or more processors and data storage. The data storage is configured to store at least computer-readable program instructions. The instructions are configured to, upon execution by the one or more processors, cause the computing device to perform functions. The functions include: determining a plurality of trained Gaussian processes related to signal strengths of wireless networks, where a particular trained Gaussian process in the plurality of trained Gaussian processes is associated with one or more hyperparameters; determining one or more designated hyperparameters of the one or more hyperparameters; determining a hyperparameter histogram of a plurality of values of the one or more designated hyperparameters, where one or more particular values in the plurality of values are one or more values for the one or more designated hyperparameters associated with a trained Gaussian process of the plurality of trained Gaussian processes; after determining the hyperparameter histogram, determining a candidate Gaussian process, where the candidate Gaussian process is associated with one or more candidate hyperparameter values for the one or more designated hyperparameters; determining whether the one or more candidate hyperparameter values are valid based on the hyperparameter histogram; after determining that the one or more candidate hyperparameter values are valid, adding the candidate Gaussian process to the plurality of trained Gaussian processes; and providing an estimated location output based on the plurality of trained Gaussian processes.

In another aspect, an article of manufacture is provided. The article of manufacture includes a computer-readable storage medium having instructions stored thereon that, in response to execution by one or more processors, cause the one or more processors to perform functions. The functions include: determining a plurality of trained Gaussian processes related to signal strengths of wireless networks, where a particular trained Gaussian process in the plurality of trained Gaussian processes is associated with one or more hyperparameters; determining one or more designated hyperparameters of the one or more hyperparameters; determining a hyperparameter histogram of a plurality of values for the one or more designated hyperparameters, where one or more particular values in the plurality of values are one or more values for the one or more designated hyperparameters associated with a trained Gaussian process of the plurality of trained Gaussian processes; after determining the hyperparameter histogram, determining a candidate Gaussian process, where the candidate Gaussian process is associated with one or more candidate hyperparameter values for the one or more designated hyperparameters; determining whether the one or more candidate hyperparameter values are valid based on the hyperparameter histogram; after determining that the one or more candidate hyperparameter values are valid, adding the candidate Gaussian process to the plurality of trained Gaussian processes; and providing an estimated location output based on the plurality of trained Gaussian processes.

In another aspect, a computing device is provided. The computing device includes: means for determining a plurality of trained Gaussian processes related to signal strengths of wireless networks, where a particular trained Gaussian process in the plurality of trained Gaussian processes is associated with one or more hyperparameters; means for determining one or more designated hyperparameters of the one or more hyperparameters; means for determining a hyperparameter histogram of a plurality of values for the one or more designated hyperparameters, where one or more particular values in the plurality of values are one or more values for the one or more designated hyperparameters associated with a trained Gaussian process of the plurality of trained Gaussian processes; means for, after determining the hyperparameter histogram, determining a candidate Gaussian process, where the candidate Gaussian process is associated with one or more candidate hyperparameter values for the one or more designated hyperparameters; means for determining whether the one or more candidate hyperparameter values are valid based on the hyperparameter histogram; means for, after determining that the one or more candidate hyperparameter values are valid, adding the candidate Gaussian process to the plurality of trained Gaussian processes; and means for providing an estimated location output based on the plurality of trained Gaussian processes.

In one aspect, a method is provided. A computing device determines a plurality of trained Gaussian processes that model signals emitted by a plurality of wireless signal emitters. Each Gaussian process of the plurality of trained Gaussian processes is based on one or more hyperparameters. The plurality of trained Gaussian processes includes a first Gaussian process and a second Gaussian process, where the first Gaussian process is based on first hyperparameter values of the one or more hyperparameters related to a first wireless signal emitter of the plurality of wireless signal emitters, and where the second Gaussian process is based on second hyperparameter values of the one or more hyperparameters related to a second wireless signal emitter of the plurality of wireless signal emitters. The computing device determines a set of comparison hyperparameters from the one or more hyperparameters. The computing device determines a first set of comparison hyperparameter values of the first hyperparameter values and a second set of comparison hyperparameter values of the second hyperparameter values. The computing device determines whether the first set of comparison hyperparameter values are within one or more threshold values of the second set of comparison hyperparameter values. After determining that the first set of comparison hyperparameter values are within the one or more threshold values of the second set of comparison hyperparameter values, the computing device determines that the first Gaussian process and the second Gaussian process are dependent Gaussian processes. After determining that the first Gaussian process and the second Gaussian process are dependent Gaussian processes, the computing device determines a representative Gaussian process based on the first Gaussian process and the second Gaussian process. The computing device provides an estimated-location output based on the representative Gaussian process.

In another aspect, a computing device is provided. The computing device includes one or more processors and data storage. The data storage is configured to store at least computer-readable program instructions. The instructions are configured to cause, upon execution by the one or more processors, the computing device to perform functions. The functions include: determining a plurality of trained Gaussian processes that model signals emitted by a plurality of wireless signal emitters, each Gaussian process of the plurality of trained Gaussian processes based on one or more hyperparameters, where the plurality of trained Gaussian processes includes a first Gaussian process and a second Gaussian process, where the first Gaussian process is based on first hyperparameter values of the one or more hyperparameters related to a first wireless signal emitter of the plurality of wireless signal emitters, and where the second Gaussian process is based on second hyperparameter values of the one or more hyperparameters related to a second wireless signal emitter of the plurality of wireless signal emitters; determining a set of comparison hyperparameters from the one or more hyperparameters; determining a first set of comparison hyperparameter values of the first hyperparameter values and a second set of comparison hyperparameter values of the second hyperparameter values; determining whether the first set of comparison hyperparameter values are within one or more threshold values of the second set of comparison hyperparameter values; after determining that the first set of comparison hyperparameter values are within the one or more threshold values of the second set of comparison hyperparameter values, determining that the first Gaussian process and the second Gaussian process are dependent Gaussian processes; after determining that the first Gaussian process and the second Gaussian process are dependent Gaussian processes, determining a representative Gaussian process based on the first Gaussian process and the second Gaussian process; and providing an estimated-location output based on the representative Gaussian process.

In another aspect, an article of manufacture is provided. The article of manufacture includes a computer-readable storage medium having instructions stored thereon that, in response to execution by one or more processors, cause the one or more processors to perform functions. The functions include: determining a plurality of trained Gaussian processes that model signals emitted by a plurality of wireless signal emitters, each Gaussian process of the plurality of trained Gaussian processes based on one or more hyperparameters, where the plurality of trained Gaussian processes includes a first Gaussian process and a second Gaussian process, where the first Gaussian process is based on first hyperparameter values of the one or more hyperparameters related to a first wireless signal emitter of the plurality of wireless signal emitters, and where the second Gaussian process is based on second hyperparameter values of the one or more hyperparameters related to a second wireless signal emitter of the plurality of wireless signal emitters; determining a set of comparison hyperparameters from the one or more hyperparameters; determining a first set of comparison hyperparameter values of the first hyperparameter values and a second set of comparison hyperparameter values of the second hyperparameter values; determining whether the first set of comparison hyperparameter values are within one or more threshold values of the second set of comparison hyperparameter values; after determining that the first set of comparison hyperparameter values are within the one or more threshold values of the second set of comparison hyperparameter values, determining that the first Gaussian process and the second Gaussian process are dependent Gaussian processes; after determining that the first Gaussian process and the second Gaussian process are dependent Gaussian processes, determining a representative Gaussian process based on the first Gaussian process and the second Gaussian process; and providing an estimated-location output based on the representative Gaussian process.

In another aspect, a computing device is provided. The computing device includes: means for determining a plurality of trained Gaussian processes that model signals emitted by a plurality of wireless signal emitters, each Gaussian process of the plurality of trained Gaussian processes based on one or more hyperparameters, where the plurality of trained Gaussian processes includes a first Gaussian process and a second Gaussian process, where the first Gaussian process is based on first hyperparameter values of the one or more hyperparameters related to a first wireless signal emitter of the plurality of wireless signal emitters, and where the second Gaussian process is based on second hyperparameter values of the one or more hyperparameters related to a second wireless signal emitter of the plurality of wireless signal emitters; means for determining a set of comparison hyperparameters from the one or more hyperparameters; means for determining a first set of comparison hyperparameter values of the first hyperparameter values and a second set of comparison hyperparameter values of the second hyperparameter values; means for determining whether the first set of comparison hyperparameter values are within one or more threshold values of the second set of comparison hyperparameter values; means for, after determining that the first set of comparison hyperparameter values are within the one or more threshold values of the second set of comparison hyperparameter values, determining that the first Gaussian process and the second Gaussian process are dependent Gaussian processes; means for, after determining that the first Gaussian process and the second Gaussian process are dependent Gaussian processes, determining a representative Gaussian process based on the first Gaussian process and the second Gaussian process; and means for providing an estimated-location output based on the representative Gaussian process.

BRIEF DESCRIPTION OF THE FIGURES

In the figures:

FIG. 4F shows example measurement bin data and example measurement bin operations, in accordance with an example embodiment.

FIG. 12 is a graph of example signal strength measurements with a corresponding Gaussian process and estimated signal attenuation graph, in accordance with an example embodiment.

FIG. 13A is an example histogram of hyperparameter values for a Gaussian process, in accordance with an example embodiment.

FIG. 13B shows example data for a histogram of hyperparameter values for a Gaussian process, in accordance with an example embodiment.

FIG. 15 is a diagram of an example Gaussian process dependency checking module, in accordance with an example embodiment.

FIG. 16 shows example data for a Gaussian process, in accordance with an example embodiment.

DETAILED DESCRIPTION

Overview

Figure 1:
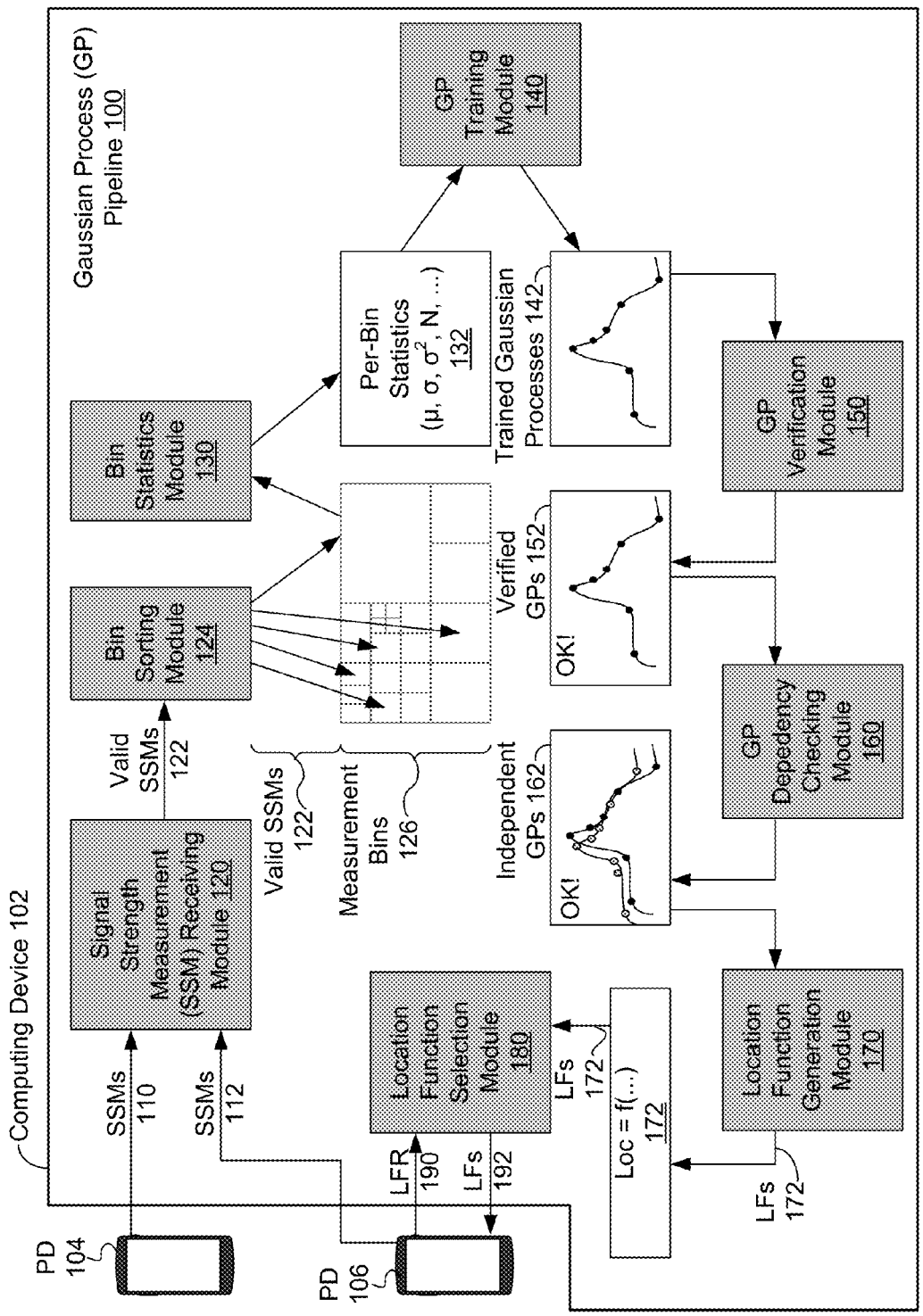
FIG. 1 is a diagram of an example computing device with an example Gaussian Process (GP) pipeline, in accordance with an example embodiment.

Disclosed herein are techniques for determining a location of a mobile computing device based on use of Gaussian processes trained using signal strength measurements. A Gaussian process is a statistical model that can use known values of a random variable provided over a range of times and/or locations to estimate values of the random variable for a specified time and/or location (or vice versa). The signal strength measurements can be observed from one or more wireless signal emitters (e.g., IEEE 802.11-compliant access points, Bluetooth low energy beacons, wireless wide-area network (WWAN) cell towers, nodes, base stations) within range of the mobile computing device. Then, a Gaussian process trained with the signal strength measurements can calculate mean signal strengths for all possible locations, including locations without training data. Then, one or more Gaussian processes can be used to determine a device location based on signal strength measurements provided by a mobile computing device.

Each signal strength measurement for a given wireless signal emitter can include signal strength measurement data, such as, location information of the mobile computing device, an wireless signal emitter identifier, and an observed signal strength. In some scenarios, very large amounts of signal strength measurement data can be generated by a large number of mobile devices observing a variety of wireless signal emitters. For example, if each of $10^7$ mobile computing devices sends an average of 10 bytes of signal strength measurement data per second, then an average of $10^8$ bytes/second are received. At that rate, about 6 terabytes of signal strength measurement data would be received in one minute.

The sizes of some signal strength measurement data sets can make some algorithms impractical due to time and/or space constraints. For example, the optimization of a Gaussian process is cubic in time with respect to the size of the training set (i.e., all measurements concerning a particular signal source), thus these training sets would ideally contain less than 1000 signal strength measurements. One approach to make large data sets more manageable is to sample data from the large data set and operate on the sampled data, rather than on the entire data set. Data set sampling can discard useful information for localization purposes, especially regarding higher spatial bandwidths. Another approach to simplify problems with large data sets is to make some (simplifying) assumptions about the distribution of data within the data set, and then operate based on the assumptions. For example, these assumptions include assuming that the mean and/or standard deviation of part or all of the data set is known; that the mean and/or standard deviation is/are source independent; and that the mean and/or standard deviation is/are position independent.

The Gaussian processes can be generated using a Gaussian process pipeline. To effectively process such a large set of input data, a geographical regions associated with signal strength measurements can be divided into areas, which can represented by the Gaussian process pipeline using measurement bins. Depending on application and environment, measurement bins can represent uniformly-sized areas or variably-sized areas. For example, in a region with many active mobile computing devices, measurement bins can represent relatively small geographical areas; e.g., on the order of 5 square meters. In other regions with fewer mobile computing devices, and therefore fewer measurements, measurement bins can be larger. And, in cases with few or no measurements, a region can be unrepresented by measurement bins; e.g., an uninhabited region can be represented by a few, if any, measurement bins. In some cases, measurement bins can be arranged into hierarchical grid maps. In other cases, measurement bins can be 3D; e.g., cover a volume for one or more floors of a multi-story building.

For a received signal strength measurement, the Gaussian process pipeline can determine a measurement bin corresponding to the location of the signal strength measurement. Then, part or all of the signal strength measurement can be stored in the measurement bin. In some cases, the signal strength data is not stored; rather, statistics of signal strength measurements can be stored and updated with each new signal strength measurement for the measurement bin. Using measurement bins allows storage of many measurements received over time. Also, a specified area to be represented by a single location; e.g., a central position of an area represented by a designated measurement bin.

Measurement bins can feasibly represent huge amounts of signal strength measurement data. For example, Manhattan Island has an area of about 60 square kilometers=60,000,000 square meters. During an average day in 2012, between 2 million to 4 million people were estimated to be resident on the island, depending on time of day. If half of those people used one mobile device at any given time, then one to two million mobile devices would be active at any time. If each active device on Manhattan generated 10 bytes of signal strength measurement data per second, then 10 to 20 million bytes of signal strength measurement data would be generated per second by Manhattan Island. That translates to 36 to 72 billion bytes of data of signal strength measurement data per hour for Manhattan.

Suppose that 60,000,000 square meters representing of Manhattan Island is divided into 10 square meter (about 107 square feet) measurement areas, for a total of 6,000,000 measurement areas to cover Manhattan. In some examples, the Gaussian process pipeline can represent each measurement area by a measurement bin that stores a latitude and longitude of the centroid (or center) of the measurement area and, for each of one or more wireless signal emitters, mean signal strength and standard deviation of signal strengths values. If each measurement bin takes about 50 bytes of storage, the 6,000,000 measurement bins can use about 300,000,000 bytes of storage to represent a covering of Manhattan using 10 square meter areas. These 300,000,000 bytes can represent gigabytes of signal strength measurements received each hour from millions of mobile devices. Further, as statistics can be updated as signal strength measurements are received, each signal strength measurement have an effect on per-bin statistics; as opposed to sub-sampling techniques that discard samples without determining any effect.

Once statistics have been calculated for a large number of measurement bins, a large number of mean and standard deviation paired values can be generated by the Gaussian process pipeline, which in turn can be used to train a large number of heteroscedastic Gaussian processes. For example, a Gaussian process generated using mean signal strength values from a collection of measurement bins representing a range of locations can be used to calculate mean signal strengths for all possible locations, including locations without training data; e.g., mean values. The Gaussian process pipeline can be configured to verify the trained Gaussian processes and check the valid Gaussian processes for independence.

Valid and independent Gaussian processes can be used to generate signal strength-measurement-based probabilistic maps. These maps can be provided to mobile computing devices for location services that can use signal strength measurements to determine location rather than using other location techniques (e.g., GPS). Such location services can be used by other applications, such as mapping, social networks, and emergency services. Also, the location services can determine locations without specific location-finding hardware, such as a GPS or other location sensors, outside of standard signal-sampling devices. Thus, Gaussian-process based location services can be used on most, if not all, modern mobile computing devices.

Example Gaussian Process Pipeline

FIG. 1 is a diagram of computing device 102 with Gaussian process pipeline 100, in accordance with an example embodiment. As discussed above, mobile devices can generate vast data sets of signal strength measurements. In some cases, these data sets can be continuously augmented with signal strength measurements of signals originating from many wireless signal emitters. A wireless signal emitter can be any device that produces signals over the air that allow a computing device, including mobile computing devices, to connect to a communication network; e.g., a Wi-Fi™ access point for a wireless local area network (WLAN), a base station for a WWAN, WWAN cell tower, or other device configured to produce communication-related wireless signals. Each signal strength measurement can include a position (e.g., latitude and longitude) and signal strength (e.g., −75 dB), where the latter is modeled as a value taken from a normal distribution that is dependent on both the signal source and the measurement position.

One problem is how to reduce the computational complexity of training wireless-based probabilistic models (e.g., grid maps) from very large amounts of signal strength measurement data. Given this formulation, algorithms for map construction to support localization (e.g., having a mobile phone know where it is within an airport) can be developed.

A signal strength measurement can be modeled as a value taken from a normal distribution that is dependent on both the signal source and the measurement position. Concerning the dependency on measurement position, Gaussian process pipeline 100 can operate under an assumption that the mean and standard deviation are constant yet unknown within each a geographical area uniquely represented by one measurement bin, and that each measurement bin is probabilistically independent from all other measurement bins. These assumptions allow Gaussian process pipeline 100 to use a Student's t-distribution to calculate the predictive mean and standard deviation of a signal strength measurement within each bin. In other words, if a future signal strength measurement is taken from within a bin, the expected mean and standard deviation of the signal strength can be calculated given all past measurements.

Gaussian process pipeline 100 can represent many (e.g., thousands) of temporally separated signal strength measurements using a single position (e.g., a single latitude and longitude pair, a single latitude, longitude, altitude triple) and various statistics, such as a mean and standard deviation of signal strength measurements. As a result, the original dataset can be adaptively reduced to a feasible size to support construction of location maps.

Gaussian process pipeline 100 can allow a mean and standard deviation pair to be optimally (in the Bayesian sense) updated in constant time by storing only a few parameters; e.g., joint conjugate hyperparameters of a normal-gamma distribution. In other words, an update calculation can be done in a recursive fashion that is computationally independent of the size of the dataset. The recursive nature of Gaussian process pipeline 100 automatically aggregates data, which can be beneficial from a privacy standpoint, as the aggregated data does not include per-user identification data.

Gaussian process pipeline 100 includes several modules, including signal strength measurement (SSM) receiving module 120, bin sorting module 124, bin statistics module 130, Gaussian process (GP) training module 140, Gaussian process verification module 150, Gaussian process dependency checking module 160, location function generation module 170, and location function selection module 180.

Modules in Gaussian process pipeline 100 can share data; e.g., an output of one module can be stored as data used as input to another module. For example, signal strength measurement receiving module 120 can receive signal strength measurements from a number of mobile computing devices, such as, but not limited to, programmable devices (PDs) 104, 106. In some examples, signal strength measurement receiving module 120 can receive signal strength measurements from one or more statically-located (e.g., not mobile) computing devices.

Each signal strength measurement of signal strength measurements 120 can include location information about a mobile computing device; e.g., programmable device 104 or 106, providing the signal strength measurement, an identifier of a wireless signal emitter generating a signal being measured and a signal strength value. For example, a mobile device near the latitude/longitude pair (41.7723, −88.03696) can measure a signal strength of −75 dB for a signal generated by a WiFi™ network having a Service Set ID (SSID) of "RevirTen". Then, an example signal strength measurement 120 for an access point for this WiFi network can have data indicating an identifier of the access paint, the "RevirTen" SSID or another identifier, a type of network; "Wi-Fi™" or "802.11", a location such as the latitude/longitude pair (41.7723, −88.03694 and the signal strength value of "−75 dB". Other example signal strength measurements 120 can have more, less, and/or different data.

Signal strength measurement receiving module 120 can validate received signal strength measurements and provide such measurements as validated signal strength measurements 122 to bin sorting module 124, as discussed below in the context of at least FIGS. 2 and 3. Bin sorting module can use validated signal strength measurements 122 as input data and place validated signal strength measurements 122 into measurement bins 126 based on location information in validated signal strength measurements 122. Example measurement bins are illustrated and discussed below in the context of at least FIGS. 4A, 4B, 4C, 4D, 4E, 4F, and 5.

In some embodiments, a spatial index of some or all based on the measurement locations of measurement bins 126 can be generated by Gaussian pipeline 100. The spatial index part of a spatial database (not shown in FIG. 1) that stores and enables geographically-related and/or geometrically-related queries regarding measurement bins 126. For example, the spatial index can be a grid, tree representation; e.g., quadtree, octree, R-tree, or other representation that enables definition of measurement bins 126 with respect to a geography; e.g., one or more streets, blocks, neighborhoods, cities, states, counties, provinces, countries, and/or continents (and equivalents thereof), and/or a geometry; e.g., a point, on a line, within a planar polygon, on a plane, a polygonally-defined space, and/or a volume.

Bin statistics module 130 can take information from measurement bins 126 as input and determine per-bin statistics 132 for some or all measurement bins 126 as outputs. Per-bin statistics 132 can include, but are not limited to, a mean signal strength value for validated signal strength measurements 122, a standard deviation of signal strength values, and a count of validated signal strength measurements 122.

For example, suppose a particular measurement bin MB of measurement bins 126 had received the following ten example signal strength values: −75, −74, −72, −77, −68, −80, −77, −77, −74, and −75. Then, bin statistics module 130 can calculate, for measurement bin MB, per-bin statistics 132 such as a mean signal strength value of −74.9, a standard deviation value of 3.2812, and a count of 10. Then, if another signal strength value were to be provided to measurement bin 126, bin statistics module 130 can update per-bin statistics 132. For example, if two new signal strength values of −77 and −75 were received, bin statistics module 130 can update per-bin statistics 132 to have a mean signal strength value of −75.0833, a standard deviation value of 3.0289, and a count of 12. Many other examples of signal strength values and statistics are possible as well.

Gaussian process training module 140 can take per-bin statistics 132 as input data and generate trained Gaussian processes 142 as outputs, such as discussed below in the context of at least FIGS. 6-10. That is, Gaussian process training module 140 can, for a designated wireless signal emitter DWSE, get per-bin statistics 132 for DWSE related to corresponding measurement bins 126. Then, the per-bin statistics 132 for DWSE can be used to train one or more Gaussian processes; e.g., a mean Gaussian process and/or a standard deviation Gaussian process for DWSE.

In some embodiments, Gaussian process pipeline 100 can use multiple stages to train Gaussian processes 142. For example, suppose Gaussian process pipeline 100 was being used, in part, to generate multiple Gaussian processes for some or all wireless signal emitters; e.g., both a mean Gaussian process and a standard deviation Gaussian process for these wireless signal emitters. Then, a first Gaussian process, such as a mean Gaussian process for a designated wireless signal emitter DWSE2, can be trained first and put through one or more checks, such as verification checks performed by Gaussian process verification module 150, dependency checks performed by Gaussian process dependency checking module 160, and/or other checks. If the first Gaussian process passes the checks, then subsequent Gaussian process(es) for DWSE2; e.g., a standard deviation Gaussian process, can be trained. If the first Gaussian process does not pass the checks, then subsequent Gaussian processes for DWSE2 may or may not be calculated. For example, if the first Gaussian process is merged into another Gaussian process, then the subsequent Gaussian process(es) for DWSE2 can be trained based on data used to train the merged Gaussian process. As another example, if the first Gaussian process does not pass the checks, the first Gaussian process can be discarded and/or subsequent Gaussian processes may not be trained.

Gaussian process verification module 150 can take trained Gaussian processes 142 as input data and generate verified Gaussian processes 152 as outputs, such as discussed below in the context of at least FIGS. 11-14. Gaussian processes depend on one or more hyperparameters, or parameters for a prior distribution of data being modeled, such as parameters about data about signal strength measurements. In the context of Gaussian functions modeling signal strength measurements, the hyperparameters can include, but are not limited to, hyperparameters that specify information about: location(s) about signals measured to obtain signal strength measurement data, power output of the measured signals, signal attenuation of the measured signals, and/or noise in the measured signals.

For verification, some or all of the hyperparameter values can be compared with hyperparameter values of other trained and similar Gaussian processes. For example, let GP1 be a Gaussian process of trained Gaussian processes 142. To verify GP1, Gaussian process verification module 150 can check whether hyperparameter values of GP1 are within tolerance of hyperparameter values of other trained and similar Gaussian processes. If the hyperparameters of GP1 are within tolerance of other trained and similar Gaussian processes, then GP1 can be considered as a verified Gaussian process. Otherwise, GP1 can be considered to be an unverified Gaussian process. Gaussian process verification module 150 can output any Gaussian processes considered to be verified as verified Gaussian processes 152.

Other verification techniques can be used as well by Gaussian process verification module 150. For example, values of functions that take one or more hyperparameter values as inputs can be compared as part of verification. That is, a function, such as a cost function, average, weighted average, or another function of one or more verification hyperparameter values, can be used to calculate verification values for respective Gaussian processes GP1 and GP2. That is, values V1 and V2 can be determined as verification values for GP1 and GP2, where V1=f(GP1.VHP1, . . . ) and V2=f(GP2.VHP1, . . . ), f( ) is a function for determining verification values, GP1.VHP1 is a verification hyperparameter value for Gaussian process GP1, and GP2.VHP1 is a verification hyperparameter value for Gaussian process GP2. Then, if V1 and V2 are within tolerance, and GP1 and/or GP2 can be classified as verified Gaussian processes.

Gaussian process dependency checking module 160 can take verified Gaussian processes 152 as inputs and determine independent Gaussian processes 162 as output, such as discussed below in the context of at least FIGS. 15-19. To determine whether two Gaussian processes are dependent, Gaussian process dependency checking module 160 can compare hyperparameters of the two Gaussian processes. If all compared hyperparameters are within tolerance of each other, then the two processes can be considered to be dependent.

For example, suppose that two verified Gaussian processes VGP1 and VGP2, are selected from verified Gaussian processes 152 to be tested for dependency. Further suppose that each of VGP1 and VGP2 each is specified using a number NHP, NHP>0, of hyperparameters and that a number CNHP of comparison hyperparameters, 0<CNHP≤NHP are checked for dependency by Gaussian process dependency checking module 160. Then, for each hyperparameter CHP of the comparison hyperparameters, Gaussian process dependency checking module 160 can determine respective values V1(CHP) and V2(CHP) of the comparison hyperparameter from respective verified Gaussian processes VGP1 and VGP2. Then, Gaussian process dependency checking module 160 can compare V1(CHP) and V2(CHP) to see if the two values are within a tolerance value T(CHP) of each other; if V1(CHP) and V2(CHP) are not within tolerance value T(CHP) of each other, then VGP1 and VGP2 are independent of each other. But, if Gaussian process dependency checking module 160 compares all of the CNHP hyperparameter values of VGP1 and VGP2 and determines that all of the CNHP hyperparameter values of VGP1 are within tolerance of VGP2, then VGP1 and VGP2 can be considered to be dependent Gaussian processes.

Other dependency techniques can be used as well by Gaussian process dependency checking module 160. For example, values of functions that take one or more comparison hyperparameter values as inputs can be compared as part of dependency checking That is, a function, such as a cost function, average, weighted average, or another function of one or more comparison hyperparameter values, can be used to calculate for dependency values for respective verified Gaussian processes VGP1 and VGP2. That is, values DV1 and DV2 can be determined as dependency values for VGP1 and VGP2, where DV1=fd(VGP1.CHP1, . . . ) and DV2=fd(VGP2.CHP1, . . . ), fd( ) is a function for determining dependency values, VGP1.CHP1 is a comparison hyperparameter value for verified Gaussian process VGP1, and VGP2.CHP1 is a comparison hyperparameter value for verified Gaussian process VGP2. Then, if DV1 and DV2 are within tolerance, and VGP1 and VGP2 can be classified as dependent Gaussian processes.

Gaussian process dependency checking module 160 can compare multiple pairs of Gaussian processes before determining whether a Gaussian process is dependent on another Gaussian process or independent. For example, if the comparison hyperparameters include hyperparameters related to location, signal attenuation, and noise, then Gaussian process dependency checking module 160 can compare Gaussian processes and determine two Gaussian processes with similar location, signal attenuation, and noise characteristics, as expressed by corresponding hyperparameters, are dependent Gaussian processes. Gaussian process dependency checking module 160 can output any Gaussian processes determined to be independent as independent Gaussian processes 162.

In some embodiments, some or all dependent Gaussian processes can be discarded; e.g., by dependency checking module 160. In other embodiments, some or all dependent Gaussian processes can be merged. For example, suppose two Gaussian processes, DGP1 and DGP2, are considered by Gaussian process dependency checking module 160 to be dependent. Then, data, such as per-bin statistics, used to generate Gaussian process DGP1 can be combined with data used to generate Gaussian process DGP2. After combining the data for DGP1 with the data for DGP2, a specific Gaussian process merger module (not shown in FIG. 1) and/or Gaussian process training module 140 can train a Gaussian process using the combined DGP1/DGP2 data to generate a merged Gaussian process MGP. Merged Gaussian process MGP can then be checked in the same fashion as any other trained Gaussian process.

Location function generation module 170 can take independent Gaussian processes 162 as inputs and determine one or more location functions (LFs) 172 as outputs. A location function of location functions 172 can take one or more signal strength measurements as inputs and determine a location, such as a latitude and longitude as an output. The location function(s) 172 can be Gaussian processes, functions based on Gaussian processes; e.g., combinations of Gaussian processes, inverses of Gaussian processes, maps generated using Gaussian processes and/or other functions based on independent Gaussian processes 162.

Location function selection module 180 can search location functions 172 to find location functions LF1, LF2, . . . associated with one or more wireless signal emitters WSE1, WSE2, . . . indicated by location function request(s) 190 provided by a computing device, such as programmable device 106 as indicated in FIG. 1, and return one or more location functions 192 to determine locations based on signal strength measurements of wireless signal emitters WSE1, WSE2, . . . . In some embodiments, function request(s) 190 can include a range of locations, such as a bounding box, that can be used to specify one or more spaces of interest. Then, location function selection module 180 can search for location functions 172; e.g., LF1, LF2 . . . associated with the one or more spaces of interest. Then, any location functions LF1, LF2, . . . found by location function selection module 180 can be provided as location functions 192 in response to location function request 190.

In some embodiments, a location module, not shown in FIG. 1, can take signal strength measurements from a number of wireless signal emitters WSE3, WSE4 . . . and determine a location L associated with the signal strength measurements from wireless signal emitters WSE3, WSE4 . . . . In other embodiments, Gaussian process pipeline 100 can be configured to generate output(s) representing some or all of signal strength measurements 110, 112, 122, measurement bins 126, per-bin statistics 132, Gaussian processes 142, 152, 152, location functions 172, 192, location function request 190, maps generated by Gaussian process 100, and/or locations associated with the signal strength measurements, such as location L mentioned immediately prior. For example, binary, human-readable, and/or other representations of signal strength measurements 110, 112, 122, measurement bins 126, per-bin statistics 132 can be output by Gaussian process pipeline 100 As another example, graphs, tables, images, and/or other representations of Gaussian processes 142, 152, 152, location functions 172, 192, and/or maps can be output by Gaussian process pipeline 100. Many other examples of outputs of Gaussian process pipeline 100 are possible as well.

Using Measurement Bins to Store and Process Signal Strength Measurements

Figure 2:
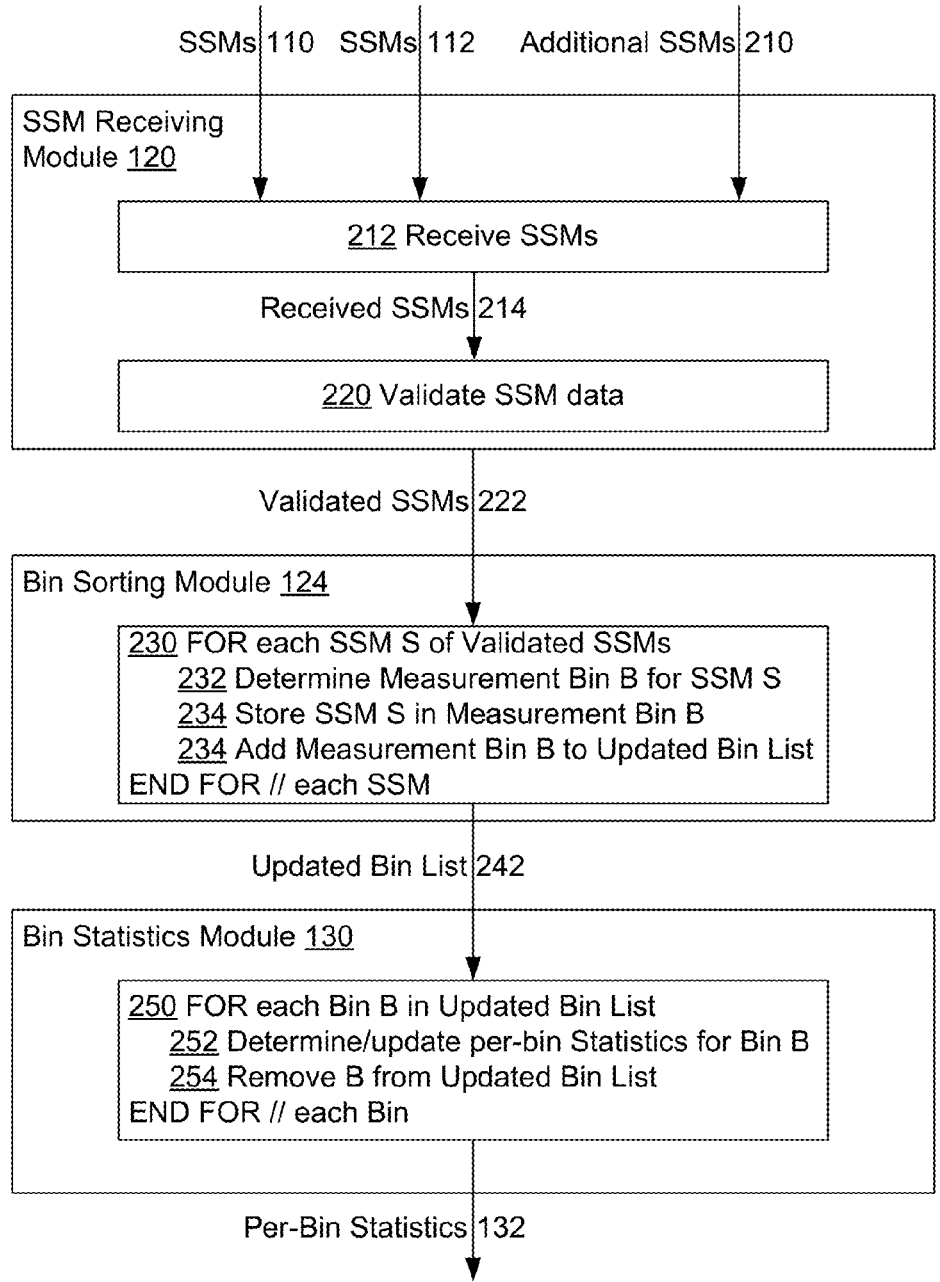
FIG. 2 is a diagram of an example signal strength measurement (SSM) receiving module, bin sorting module, and bin statistics module, in accordance with an example embodiment.

FIG. 2 is a diagram of signal strength measurement receiving module 120, bin sorting module 124, and bin statistics module 130, in accordance with an example embodiment. FIG. 2 shows example pseudo-code for signal strength measurement receiving module 120 to illustrate concepts for processing signal strength measurements.

Signal strength measurement receiving module 120 can use signal strength measurement functionality 212 to receive signal strength measurements from a number of mobile computing devices and/or other computing devices, such as but not limited to, signal strength measurements 110, 112, 210 and provide received signal strength measurements 214.

Each signal strength measurement in received signal strength measurements 214 can be for a particular wireless signal emitter. For example, a signal strength measurement for wireless signal emitter WSE1 can include: location information for a location L1 where the signal strength of WSE1 was measured, an wireless signal emitter identifier for WSE1 (e.g., a WiFi™ SSID, a Media Access Control (MAC) address, a Basic SSID (BSSID), an Internet Protocol (IP) address, a Cell ID from a WWAN), and an observed signal strength value (e.g., −75 dB) for WSE1 at location L1.

Location information about location L1 can be specified as a latitude/longitude pair of values, a latitude/longitude/ altitude triple of values, a street address or intersection, a name of well-known landmark (e.g., the Golden Gate Bridge), and/or using some other technique. In some embodiments, one or more times can be associated with a signal strength measurement; e.g., a time when the signal strength was measured, a time when the signal strength measurement was received.

In some embodiments, signal strength measurement receiving module 120 can convert location information to a common format for location information; e.g., convert a received street address to a latitude/longitude pair or latitude/longitude/altitude triple. In other embodiments, signal strength measurement receiving module 120 can normalize observed signal strength values such that data originating from different mobile device models and/or different type of wireless signal emitters are statistically comparable. In still other embodiments, signal strength measurement receiving module 120 can convert wireless signal emitter identifiers into a common format; e.g., MAC addresses, Cell IDs, etc.

Upon receiving signal strength measurements 214, signal strength measurement receiving module 120 can use validate signal strength measurement functionality 220 to validate some or all of received signal strength measurements 214. As one example, validate signal strength measurement functionality 220 can validate location information; e.g., verify that location information is specified, check location information is within specific ranges of values (e.g., determine that the location information does not have any nonnumerical latitude or longitude values or values greater than 360) and/or within a given geographical area, and/or perform other checks of location information. As another example, validate signal strength measurement functionality 220 can validate wireless signal emitter identifiers; e.g., range check address information for validity, attempt address, domain name, and/or SSID lookups (e.g., convert a domain name to an IP address), and/or perform other checks of wireless signal emitter information. As yet another example, validate signal strength measurement functionality 220 can range check observed signal strength values for validity; e.g., verify the signal strength values are between 80 and −200 dB/m. In some embodiments, signal strength measurement receiving module 120 does not include strength measurement functionality 220; e.g., validate signal strength measurement functionality 220 is performed elsewhere in Gaussian pipeline 100 or is not performed at all.

After signal strength measurement receiving module 120 has output validated signal strength measurements 222, bin sorting module 124 can place validated signal strength measurements 222 into corresponding measurement bins 126 and generate updated bin list 242. More specifically, at block 230, bin sorting module 124 can begin a FOR loop select a signal strength measurement S of validated signal strength measurements 222. Then, at block 232, bin sorting module 124 can determine a measurement bin B of measurement bins 126 for the received signal strength measurement S. For example, bin sorting module 124 can obtain location information from signal strength measurement S and determine measurement bin MB as being associated with a location indicated by the location information. Then, at block 234, bin sorting module 124 can store some or all of the data of signal strength measurement S in measurement bin B, and at block 236, add information about measurement bin B to updated bin list 242. For example, the information about measurement bin B can be (a copy of) measurement bin B, an identifier for B, and/or a reference to B. After completing block 234, bin sorting module 124 can process the next (if any) signal strength measurement of validated signal strength measurements 222. The updated bin list can indicate each measurement bin that that has received measurements since statistics for the measurement bin were last calculated.

After bin sorting module 124 has output updated bin list 242, bin statistics module 130 can take updated bin list 242 and generate per-bin statistics 132. More specifically, at block 250, bin statistics module 130 can begin a FOR loop and determine a measurement bin B using updated bin list 242. Then, at block 252, bin statistics module 130 can determine and/or update bin statistics for measurement bin B. For example, bin statistics module 130 can determine a count or number of signal strength measurements associated with measurement bin B, a mean signal strength value associated with measurement bin B, a standard deviation of signal strength values associated with measurement bin B, a variance of signal strength values associated with measurement bin B, and/or other statistics associated with measurement bin B. Then, at block 254, bin statistics module 130 can remove information about measurement bin B from the updated bin list to indicate that measurement bin B has up-to-date statistics. After completing block 254, bin sorting module 124 can process the next (if any) measurement bin on the updated bin list.

As per-bin statistics are calculated at block 252, the calculated per-bin statistics can be output as per-bin statistics 132. Per-bin statistics 132 can include the values of statistics and/or information about a measurement bin with up-to-date statistics, where the information about the measurement bin such as discussed above with respect to updated bin list 242. For example, at block 254, bin statistics module 130 can remove information about measurement bin B from the updated bin list. At block 254, a bin statistics module 130 can also add information about B to a list of measurement bins with up-to-date statistics; e.g., per-bin statistics 132.

In some embodiments, bin statistics module 130 can be configured to select each of some or all of measurement bins 126 on a periodic basis to determine and/or update per-bin statistics 132 to represent selected measurement bin. Then, once a pass through measurement bins 126 is complete, bin statistics module 130 can start another pass through measurement bins 126 to (re)calculate per-bin statistics 132. Other techniques for selecting measurement bins 126 to calculate per-bin statistics 132 are possible as well.

Figure 3:
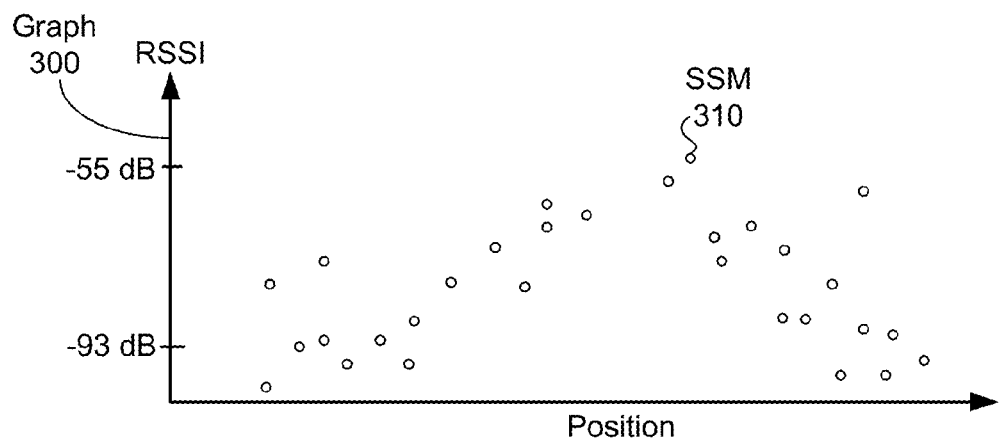
FIG. 3 is a graph of example signal strength measurements, in accordance with an example embodiment.

FIG. 3 shows graph 300 of thirty example signal strength measurements, in accordance with an example embodiment. Graph 300 graphs positions for signal strength measurements along the X or horizontal axis, and graphs signal strength measurement values along the Y or vertical axis. The signal strength measurement values along of graph 300 include signal strength measurement 310 and are indicated as received signal strength indications (RSSI). The signal strength measurement values generally measured between −40 dB and −100 dB, with graph 300 specifically indicating the −55 dB and −93 dB levels.

Figure 4A:
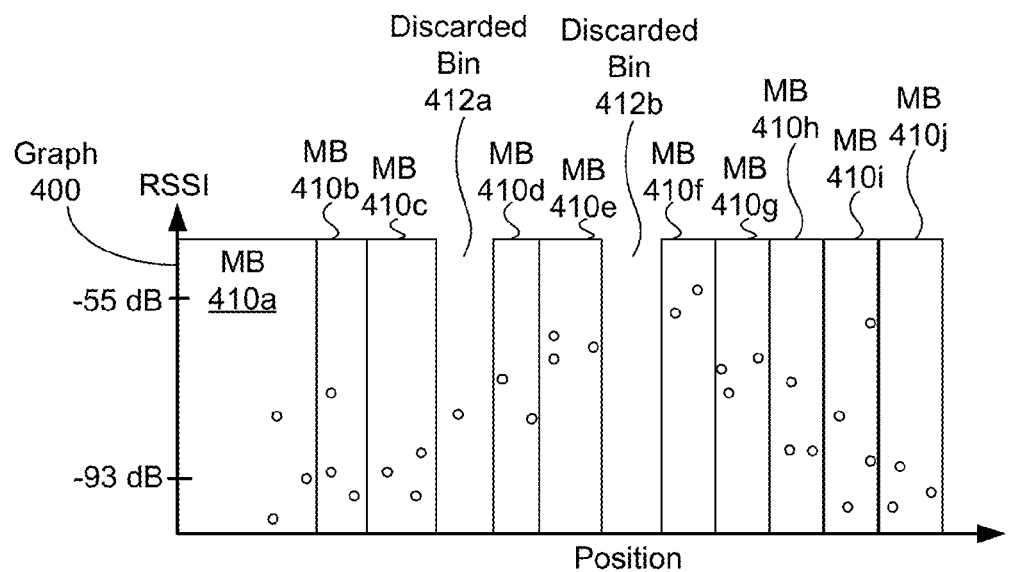
FIG. 4A is a graph of example signal strength measurements, with one-dimensional (1D) measurement bins, in accordance with an example embodiment.

FIG. 4A is a graph of the thirty example signal strength measurements shown in FIG. 3 placed into 10 1D measurement bins (MBs) 410a, 410b, 410c, 410d, 410e, 410f, 410g, 410h, 410i and 410j, in accordance with an example embodiment. Measurement bins can have of varying sizes; for example, FIG. 4A shows that bin 410a is larger than bin 410b. Each of measurement bins 410a-410j includes at least two signal strength measurements; where measurement bins 410d and 410f hold only two signal strength measurements, and measurement bin 410i holds four signal strength measurements. In some cases, a region can have too few measurements for a measurement bin. For example, FIG. 4A shows discarded bins 412a and 412b where fewer than two measurements have been recorded; discarded bins 412a, 412b represent respective regions with one and zero signal strength measurements, respectively.

Figure 4B:
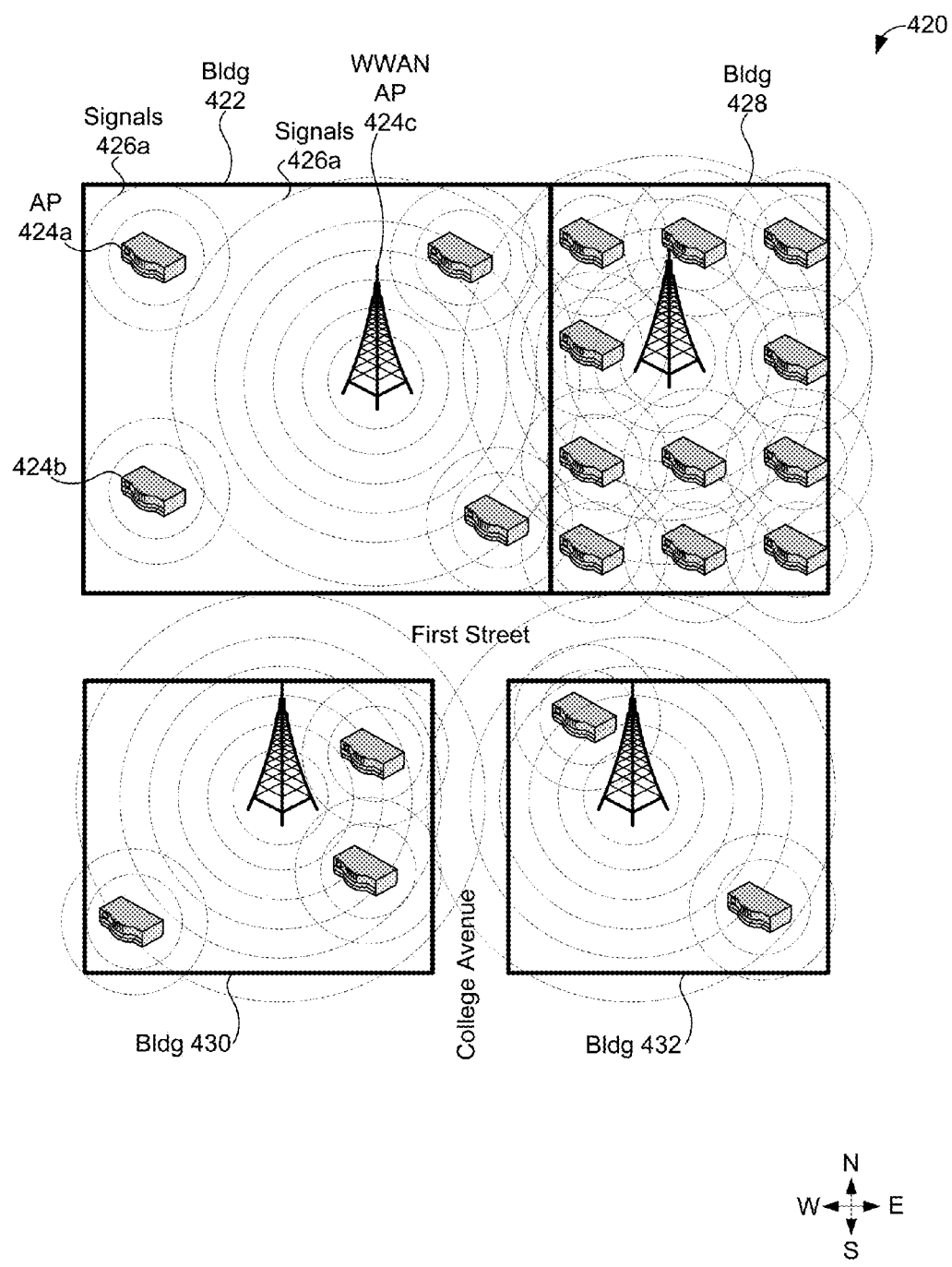
FIG. 4B depicts an example scenario of access points (APs) emitting wireless signals, in accordance with an example embodiment.

Measurement bins can have one, two, or more dimensions. FIG. 4B depicts scenario 420 in a region where access points (examples of wireless signal emitters) are emitting wireless signals, in accordance with an example embodiment. In scenario 420, the region includes four buildings 422, 428, 430, and 432 are along First Street, with buildings 422 and 428 adjoining on a north side of First Street. Buildings 430 and 432 are on the south side of First Street separated by College Avenue, which terminates at its intersection with First Street.

In scenario 400, each of buildings 422, 428, 430, and 432 has at least one active access point. FIG. 4B shows: building 422 with four WLAN access points, including access points 424a, 424b, and WWAN access point 424c; building 428 with eleven WLAN access points and one WWAN access point; building 430 with three WLAN access points and one WWAN access point; and building 432 with two WLAN access points and one WWAN access point. Each access point in scenario 400 is actively generating and emitting signals; for example, access point 424a is emitting signals 426a. In FIG. 4B, emitted signals are shown using dashed lines.

Figure 4C:
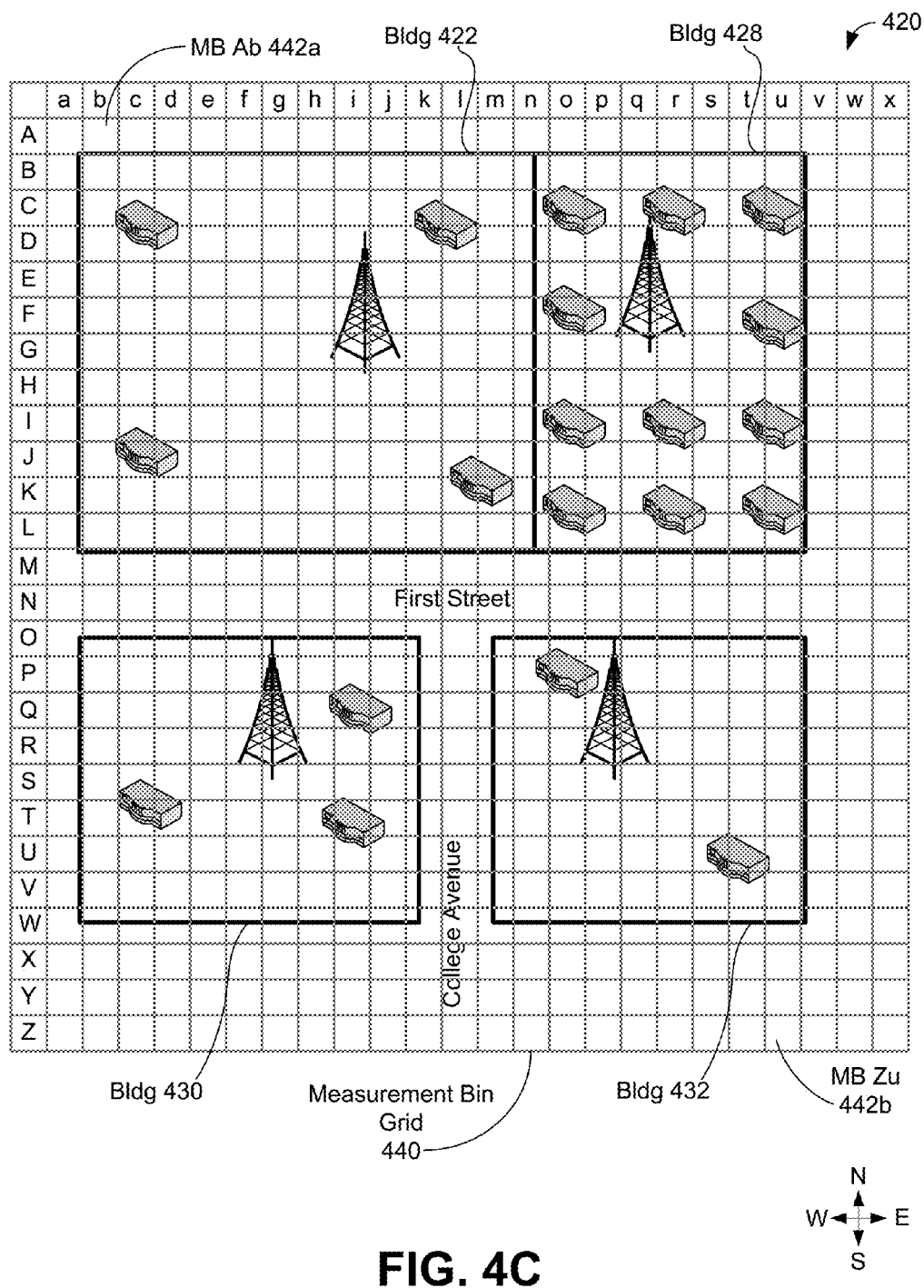
FIGS. 4C and 4D each depict example two-dimensional (2D) measurement bins for the region depicted in FIG. 4B, in accordance with an example embodiment.

FIG. 4C depicts example measurement bin grid 440 of uniform 2D measurement bins for the region depicted in FIG. 4B, in accordance with an example embodiment. FIG. 4C shows the region of scenario 420 with twenty-six row by twenty-four column measurement bin grid 440, where the measurement bins are shown using grey lines. The measurement bins of grid 440 of FIG. 4C are addressed or indexed using a row value followed by a column value, where the row values are indexed using upper-case letters and the column values are indexed using lower-case letters. For example, measurement bin Ab 442a, is in the first row (row A) and in the second column (column b) of measurement bin grid 440. Similarly, measurement bin Zu 442b, is in the twenty-sixth row (row Z) and in the twenty-first column (column u) of grid 440. In other embodiments, measurement bins can be addressed using other techniques; e.g., using numerical row and/or column addresses or using a unique identifier for each measurement bin that is independent of row and/or column location.

Figure 4D:
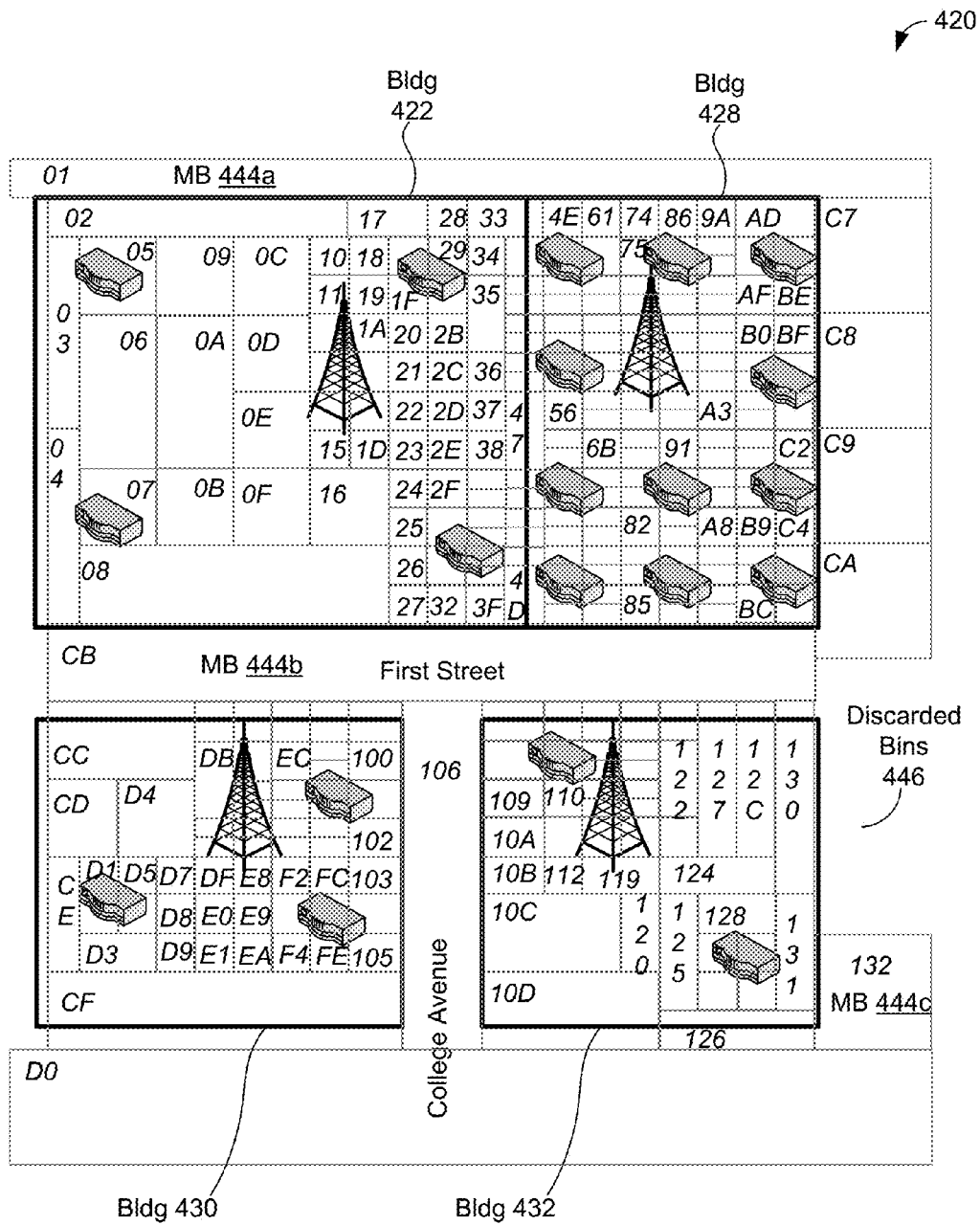

FIG. 4D depicts example non-uniform 2D measurement bins for the region depicted in FIG. 4B, in accordance with an example embodiment. FIG. 4D shows the region overlaid with 306 non-uniform measurement bins, where the measurement bins are shown using grey lines. Measurement bins in FIG. 4D can be generated by starting with the uniform grid of FIG. 4C and then merging bins with few signal strength measurements, splitting bins with many signal strength measurements, and discarding some bins, such as discarded bins 446.

FIG. 4D also shows a hexadecimal-based partial indexing of the measurement bins, as indexes are shown for measurement bins where the indexes can be legibly displayed. Hexadecimal numbers were used to reduce the physical size of index values and allow legible display of more indexes. In other embodiments, other numerical representations, e.g., binary or decimal, can be used rather than hexadecimal indexes.

In FIG. 4D, indexes increase as bins go down columns from measurement bin 444a, shown in FIG. 4D with a hexadecimal index "01" (decimal 1), until reaching First Street, which is mainly shown covered by measurement bin 444b and indexed using hexadecimal index "CB" (decimal 203). After indexing measurement bin 444b, indexes again increase as bins go down columns from measurement bin 444, until reaching the last bin 444c indexed with hexadecimal index "132" (decimal 306).

Figure 4E:
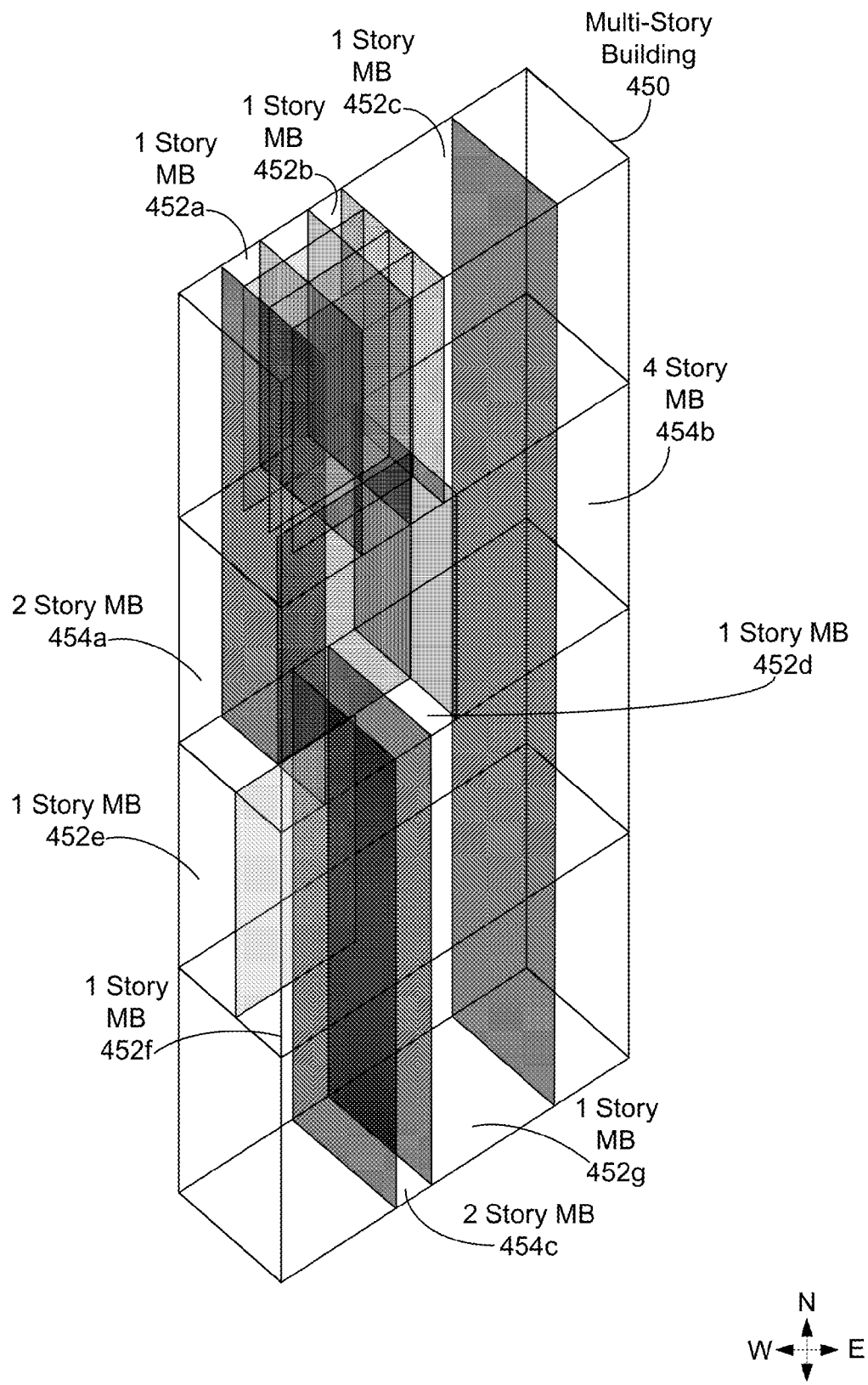
FIG. 4E depicts an example multi-story building with three-dimensional (3D) measurement bins, in accordance with an example embodiment.

FIG. 4E depicts multi-story building 450 overlaid with 3D measurement bins, in accordance with an example embodiment. FIG. 4E shows several bins having one-story of altitude such as measurement bins 452a, 452b, 452c related to a top-most (fourth) story of building 450, measurement bin 452d related to a second-top-most (third) story, measurement bin 452e related to a third-top-most (second) story, and measurement bin 452f related to a bottom-most (first) story. FIG. 4E also shows bins having two or more stories of altitude, such as two-story measurement bins 454a, 454c and four-story measurement bin 454b. As such, measurement bins 126 can be uniform in one, two, or three dimensions or, as shown in FIG. 4E, can vary in three dimensions.

FIG. 4F shows example measurement bin data 460 and example measurement bin operations 480, in accordance with an example embodiment. In some embodiments, a measurement bin can have more, less, and/or different data than indicated as measurement bin data 460. In other embodiments, a measurement bin can be associated with more, less, and/or different operations than indicated as measurement bin operations 480.

Measurement bin data 460 can include bin index 462, physical location information 464, discarded indicator 466, and number of wireless signal emitters 468. Bin index 462 can identify the bin; e.g., bin index 462 can a bin index as discussed above in the context of FIGS. 4B and 4C or some other type of identifier that can distinguish the measurement bin from other measurement bins. Physical location information 464 can specify an area or volume associated with the measurement bin; e.g., a latitude, longitude and perhaps altitude locating a center point, a centroid, a bounding box, or other representation of an area or volume. Discarded indicator 466 can indicate whether the measurement bin is discarded. Number of wireless signal emitters 468 can indicate a number of wireless signal emitters whose signal strength measurements are represented by the measurement bin. In some embodiments, a measurement bin can be indicated as discarded if number of wireless signal emitters 468 is set to 0, and then an explicit discarded indicator may not be used.

If number of wireless signal emitters 468 is greater than zero, measurement bin data 460 can include data for each wireless signal emitter. As shown in FIG. 4F, measurement bin data 460 can include, for each wireless signal emitter, one or more wireless signal emitters 470, signal strength-measurement data 472, statistics data 474, and Gaussian process references 478. Wireless signal emitter identifier(s) 470 can be, for example, an SSID, a MAC address, an IP, a Cell ID, and/or some other data identifying for a wireless signal emitter. Signal strength measurement data 472 can include one or more signal strength values and/or measurements of signals emitted by the wireless signal emitter, and perhaps one or more times associated with corresponding signal strength values/measurements. Statistics data 474 can include statistics for the measurement bin. FIG. 4F shows example statistics, including but not limited to, number of observed signal strength measurements 476a, mean signal strength measurement value 476b, a standard deviation of signal strength measurement values 476c. Gaussian process references 478 can include one or more references to Gaussian processes associated with the wireless signal emitter.

Measurement bin operations 480 can add signal strength measurements operation 482, age signal strength measurements operation 484, update bin statistics operation 486, mark measurement bin discarded operation 488a, mark measurement bin active operation 488b, merge measurement bin operation 490, split measurement bin operation 492, and access measurement bin data operations 494.

Add signal strength measurements operation 482 can involve storing signal strength measurements as part of measurement bin data 460; e.g., as signal strength measurement data 472. Age signal strength measurements operation 484 can include comparing one or more times associated with stored signal strength measurements data 472 to a predetermined time. Example time(s) associated with a signal strength measurement data include, but are not limited to, a time of reception of a signal strength measurement and a time that signal strength was measured. Example predetermined times include, but are not limited to, a fixed predetermined time such as 08:00 AM GMT on Jul. 31, 2014 and a relative predetermined time such as 1 hour ago, etc. If a time associated with a signal strength measurement is before the predetermined time, the signal strength measurement can be considered to be stale (i.e., too old) and ignored and/or discarded.

Update bin statistics operation 486 can involve determining, calculating, and/or recalculating statistics for the measurement bin; e.g., statistics in statistics data 474. Mark measurement bin discarded operation 488a and mark measurement bin active operation 488b can involve setting data; e.g., discarded indicator 466 and/or number of wireless signal emitters 468, to value(s) that indicate that the measurement bin is discarded or active (not discarded), respectively. Merge measurement bin operation 490 can include techniques for combining the measurement bin with one or more other measurement bins. Split measurement bin operation 492 can include dividing the measurement bin into two or more measurement bins. Access measurement bin data operations 494 can allow some or all of measurement bin data 460 to be read and/or written, where the measurement bin can specified using: a measurement bin index for accessor 496a, location information for accessor 496b, one or more wireless signal emitters associated with the measurement bin for accessor 496c, and/or using some other criterion/criteria.

Figure 5:
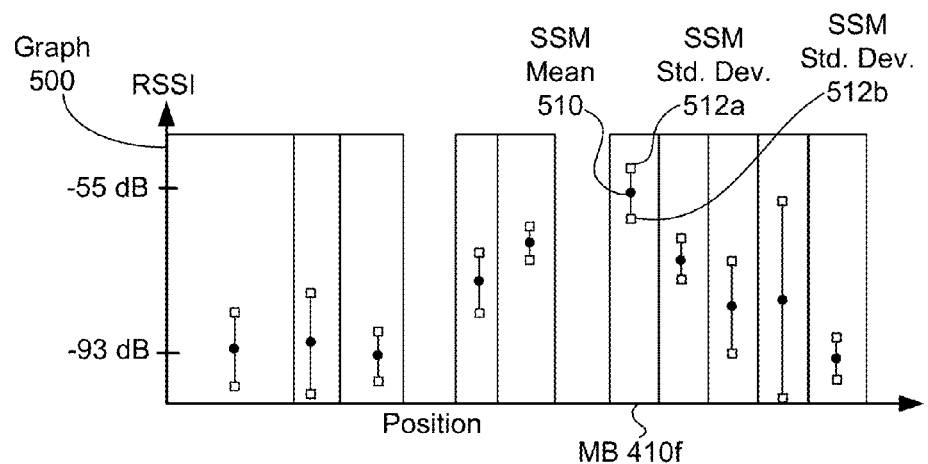
FIG. 5 is a graph of example signal strength measurements, with 1D measurement bins having mean and standard deviation values, in accordance with an example embodiment.

FIG. 5 shows graph 500 with 1D measurement bins having mean and standard deviation values, in accordance with an example embodiment. Graph 500 shows the measurement bins depicted in FIG. 4A. For each measurement bin, graph 500 shows a mean signal strength value for signal strengths in the measurement bin and an indication of a standard deviation for signal strengths in the measurement bin. For example, FIG. 5 shows measurement bin 410f with mean signal strength value 510 of approximately −55 dB using a black dot connected by lines representing error bars to upper standard deviation bound 512a and lower standard deviation bound 512b to indicate signal strength values one standard deviation value (one sigma) from mean value 510. Upper standard deviation bound 512a and lower standard deviation bound 512b are shown in FIG. 5 using respective white squares at approximately −51 dB and −59 dB.

Training Gaussian Processes for Signal Strength Measurements

Once statistics have been calculated for a large number (e.g., billions) of measurement bins, a large number of mean and standard deviation paired values can be used to train a large number of heteroscedastic Gaussian processes. A Gaussian process can use known values of a random variable to estimate values of the random variable for a later-specified time and/or location (or vice versa). In the context of function estimation; i.e., a regression problem, a Gaussian process can estimate a posterior distribution, or range of values of the function, based on a prior distribution that specifies assumptions about the function, and a set of observations. Each observation in the set can take the form (X, y), where X is an input value or vector to the function being estimated and y is an output of a function similar to the function being estimated. That is, if the function being estimated is f( ) then each observation (X, y) can take the form y=f(X)+ϵ, where ϵ is an assumed amount of noise for the observation. In many cases, the prior distribution can include an assumption that the mean of f(X) over all values of X is 0. If no other limitations are placed on f( ) assuming the mean of f(X)=0 is equivalent to a statement that no specific assumptions are made on the values of f( ) If the mean of f( ) is 0, then ϵ can be assumed to be a Gaussian distribution whose mean is 0 and whose covariance is $\sigma^2$.

A heteroscedastic Gaussian process is a Gaussian process that does not operate under assumptions about the variance, which can represent variability, of a random variable. For example, a Gaussian process generated using mean signal strength values from a collection of measurement bins representing a range of locations can be used to calculate mean signal strengths for all possible locations, including locations without training data. Doing so can, for example, enable a mobile device to calculate the likelihood of being at any hypothesized location given a recent signal strength measurement (e.g., 802.11, Bluetooth).

Gaussian process pipeline 100 can use a set of uniquely identifiable measurement bins within the world (e.g., S2 cell), where each measurement bins has an associated signal strength predictive mean (e.g., −75 dB) and standard deviation (e.g., 8 dB) for a uniquely identifiable source (e.g., 802.11 access point, Bluetooth low energy beacon), such as measurement bins 126, to train Gaussian processes. For example, Gaussian process pipeline 100 can use the absolute centroid locations of these bins to construct an input training set, and the mean and standard deviation pairs to construct a target training set.

A Gaussian process for a wireless signal emitter can include a mean function, a kernel function, and a likelihood function. An appropriate mean function can represent signal propagation (i.e., attenuation over free space) from the wireless signal emitter. Traditional Gaussian process training approaches use nonlinear optimization methods to minimize the log marginal likelihood by adjusting the mean, kernel, and likelihood parameters (more technically, hyperparameters). Often the time for this optimization is dominated by the $O(N^3)$ inversion of a covariance matrix for the wireless strength measurements, where $O(N^3)$ or "big O of $N^3$" indicates an operation; e.g., inversion of a covariance matrix, takes on the order of $N^3$ basic machine operations, such as additions, multiplications, memory reads, memory writes, etc. to complete, and where N refers to the size of the training set. For mean and standard deviation paired datasets containing thousands of entries, this inversion is too computationally intensive to perform for billions of wireless signal sources.

Gaussian process pipeline 100 can use a zero valued kernel function and a given heteroscedastic likelihood function, both which have no free parameters, during the optimization. The zero valued kernel function can return zero for all input pairs, exploiting the bin independence assumption made during the mean and standard deviation calculations for per-bin statistics 132. The given heteroscedastic likelihood function can be equal to the squared standard deviation (i.e., variance) of the corresponding input paired with itself, and zero otherwise. Given these function definitions, the time complexity of the covariance matrix inversion is reduced to O(N), allowing for the training of billions of Gaussian processes in the order of minutes using today's computer clusters. This optimization is mathematically equivalent to a weighted least squares optimization incorporating the standard deviations of the bins into the weighting criteria. The benefit of formulating this approach as a Gaussian process is that the trained mean function can be incorporated into a more complete optimization pipeline to calculate, for example, the uncertainty of the mean signal strength estimates.

Figure 6:
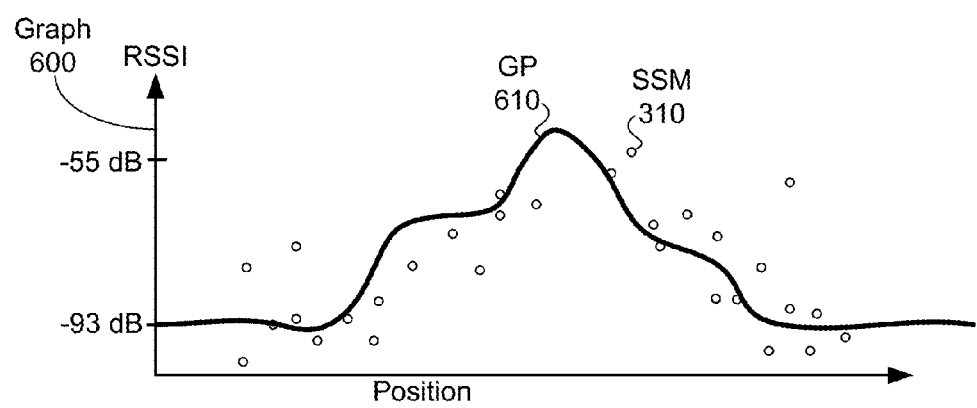
FIG. 6 is a graph of example signal strength measurements with a corresponding Gaussian process, in accordance with an example embodiment.

FIG. 6 shows graph 600 of the signal strength measurements depicted in FIG. 3, including signal strength measurement 310, with corresponding Gaussian process 610, in accordance with an example embodiment. Gaussian processes, such as Gaussian process 610, can use a relatively small amount of data to represent a large data set of signal strength measurements; e.g., tens of measurements as shown in FIG. 6, or in other examples, thousands (or more) signal strength measurements. Also, Gaussian processes, such as Gaussian process 610, can estimate signal strength measurements for locations where signal strength measurements have not previously been observed.

Figure 7:
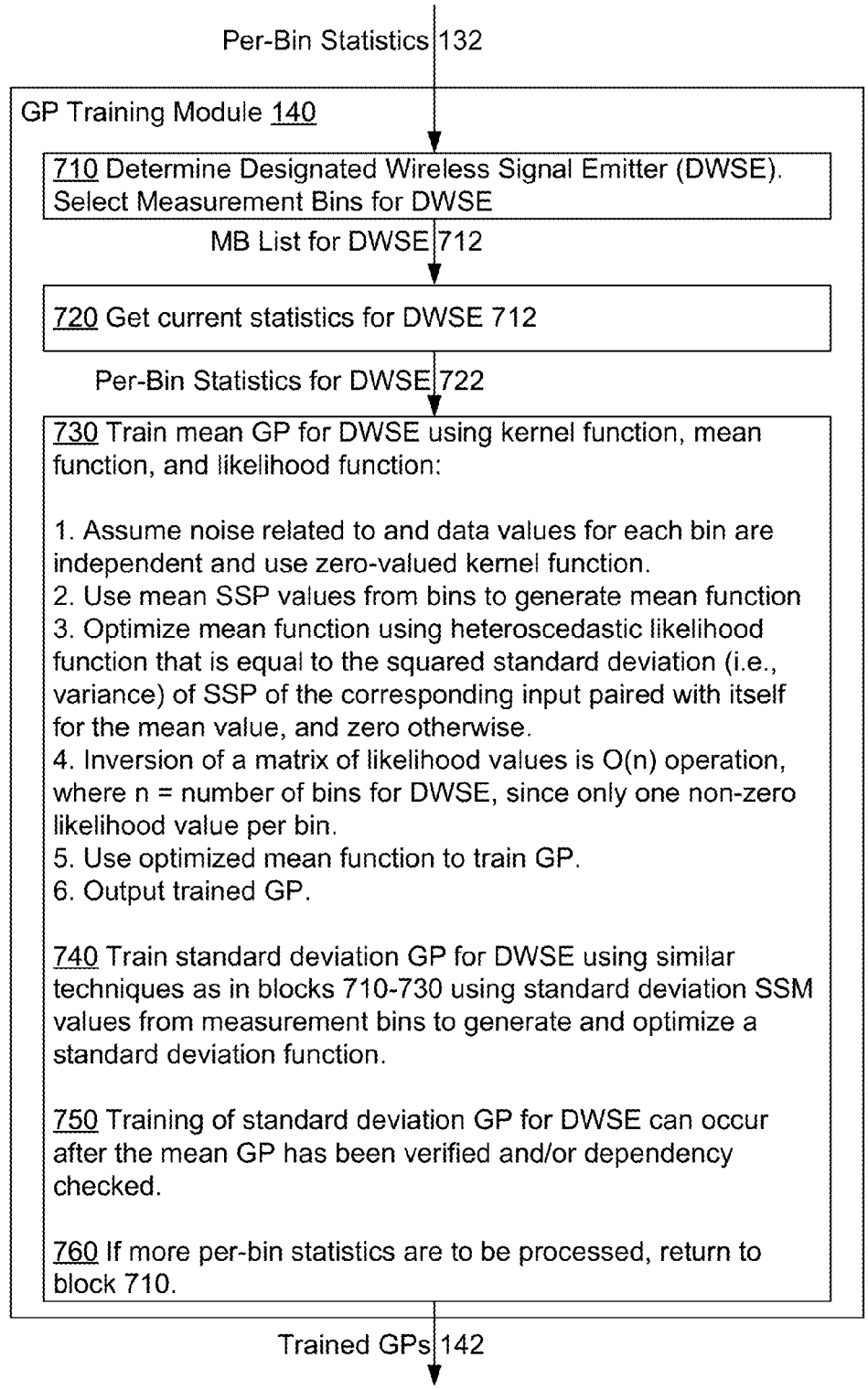
FIG. 7 is a diagram of an example Gaussian process training module, in accordance with an example embodiment.

FIG. 7 is a diagram of Gaussian process training module 140, in accordance with an example embodiment. Gaussian process training module 140 can receive per-bin statistics 132 as input. FIG. 7 shows example pseudo-code for Gaussian process training module 140 to illustrate concepts for training Gaussian processes using signal strength measurement data.

At block 710, Gaussian process training module 140 can determine and/or receive as an input a designated wireless signal emitter DWSE and select measurement bins from measurement bins 126 with signal strength measurements of signals emitted by the designated wireless signal emitter DWSE. For example, the measurement bins can be selected by accessing measurement bin data for measurement bins associated with DWSE, as indicated in FIG. 4F. Then, one or more measurement bins associated with designated wireless signal emitter DWSE 712 can be determined. At block 720, Gaussian process training module 140 can get current statistics from per-bin statistics 132 for each measurement bin associated with designated wireless signal emitter DWSE 712.

At block 730, Gaussian process training module 140 can train a mean Gaussian process to represent signal strength measurements for signals emitted by designated wireless signal emitter DWSE. Gaussian process training module 140 can assume values in each measurement bin is independent of the others, noise related to each measurement bin is independent, and that a zero-valued mean function can be used to train a mean Gaussian process. Then, mean values of per-bin statistics 132 associated with designated wireless signal emitter DWSE 722 can be used to generate a mean function for the signal strength values. Example mean values for signal strength measurements are shown in FIG. 8.

Figure 8:
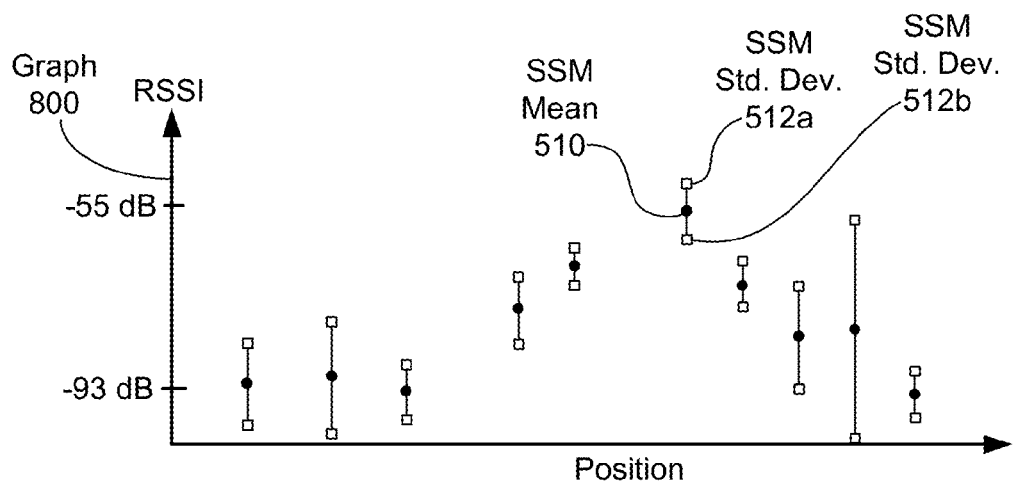
FIG. 8 is a graph of mean and standard deviation values of example signal strength measurements, in accordance with an example embodiment.

FIG. 8 shows graph 800 of mean and standard deviation values of example signal strength measurements, in accordance with an example embodiment. Graph 800 shows a number of mean signal strength values for signal strengths and indications of standard deviation values for signal strengths. For example, FIG. 8 shows a mean signal strength value 510 as a black dot at approximately −55 dB connected by lines representing error bars to upper bound 512a and lower bound 512b of one standard deviation value (one sigma) from the mean using white squares indicated in graph 500 at approximately −51 dB and −59 dB, respectively.

Returning to FIG. 7, block 730 can continue by optimizing the mean function. For example, nonlinear optimization techniques can minimize the log marginal likelihood by adjusting the mean, kernel, and likelihood parameters (more technically, hyperparameters) of the mean function. Nonlinear optimization of the mean function can be performed using a heteroscedastic likelihood function equal to the standard deviation squared (i.e., the variance) of measured signal strength measurements of the corresponding input paired with itself for the mean value, and zero otherwise. That is the heteroscedastic likelihood function can be represented as an n×n diagonal matrix whose diagonal entries (a, a) are equal to the standard deviation squared for measurement bin a, and whose non-diagonal entries are zero, and where n is the number of bins in a list of per-bin statistics associated with designated wireless signal emitter DWSE 722. Inverting the diagonal matrix representation of the heteroscedastic likelihood function is an O(n) operation, while the standard matrix inversion technique is an O(n³) operation. For example, is, if n=1000, the matrix inversion technique used at block 730 would take on the order of n=1000 basic machine operations, as opposed to the standard inversion technique, which would take on the order of n³=1,000,000,000 basic machine operations. Then, the optimized mean function can be used to train a mean Gaussian process to estimate the signal strength measurements for signals emitted by DWSE.

Figure 9:
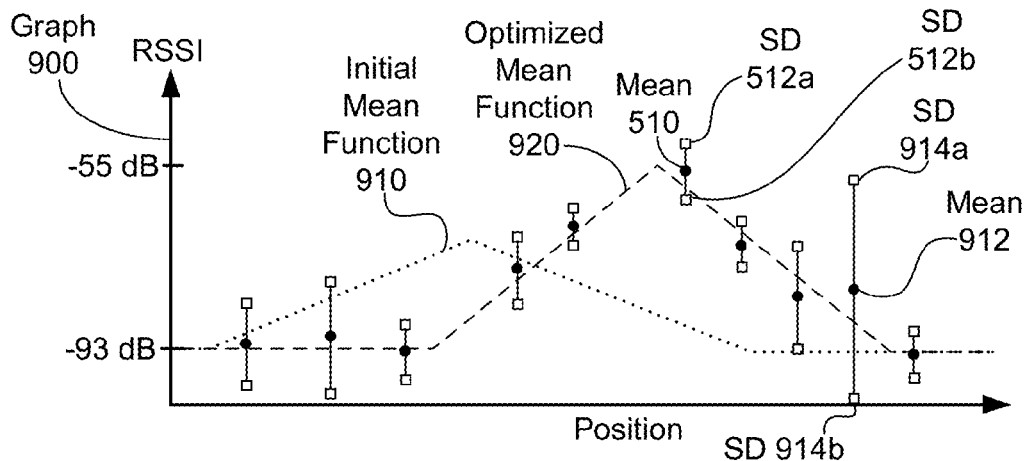
FIG. 9 is a graph of mean functions with mean and standard deviation values of example signal strength measurements, in accordance with an example embodiment.

Example functions generated using the mean values shown in FIG. 8 are shown as mean functions of FIG. 9. FIG. 9 is a graph of mean functions 910, 920 with mean and standard deviation values of example signal strength measurements, in accordance with an example embodiment. Mean function 910 is an example initial mean function produced before optimization at block 730 of the Gaussian process training module 130.

The optimization process of block 730 can be thought of as causing the initial mean function to pass through the error bars surrounding each observed mean and standard deviation pair, as shown FIG. 9. Further, as the inverse of the standard deviation squared is used to optimize mean function 910, relatively small standard deviations, such as shown for mean 510 and standard deviation (SD) upper value 510a, and lower value 510b, have a relatively large effect on optimizing mean function 910 to generate optimized mean function 920. Additionally, relatively large standard deviations, such as shown for mean 912 and standard deviation (SD) upper value 914a, and lower value 914b, have a relatively small effect on generating optimized mean function 920.

Figure 10:
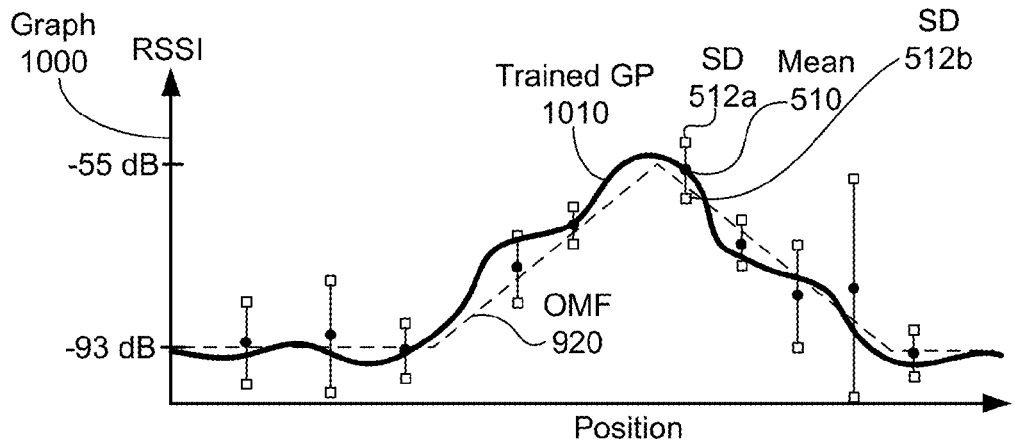
FIG. 10 is a graph of a Gaussian process, mean function, and mean and standard deviation values of example signal strength measurements, in accordance with an example embodiment.

An example trained mean Gaussian process for example signal strength measurements is shown in FIG. 10. FIG. 10 is a graph 1000 of Gaussian process 1010 based on optimized mean function (OMF) 920, in accordance with an example embodiment. Like optimized mean function 920, Gaussian process 1010 stays within error bars of each mean value of signal strength measurements generated from each of the example measurement bins shown in FIG. 5. Gaussian process 1010 is based on per-bin statistics 132, whose mean values and error bars for signal strength measurements shown in FIGS. 2 and 3 are based on standard deviation values are shown in FIG. 8. Further, optimized mean function 920 is shown in FIG. 9 was used to generate Gaussian process 1010.

After training the mean Gaussian process, Gaussian process training module 140 can continue with block 730 to output the trained mean Gaussian process as part of trained Gaussian processes 142.

As indicated at FIG. 7, Gaussian process training module 140 can, at block 740, train a standard deviation Gaussian process for designated wireless signal emitter DWSE using similar techniques as indicated at block 730. Standard deviation signal strength measurements values from per-bin statistics 132 can be used to generate and optimize a standard deviation function that is then used to generate the standard deviation Gaussian process.

At block 750, Gaussian process training module 140 can train the standard deviation Gaussian process for designated wireless signal emitter DWSE after the mean Gaussian process has been verified by Gaussian process verification module 150 and/or dependency checked by Gaussian process dependency checking module 150.

At block 760, Gaussian process training module 140 can determine if additional per-bin statistics 132 are to be processed; e.g., determine if there are more Gaussian processes to train. If additional per-bin statistics 132 are to be processed, then Gaussian process training module 140 can return to block 710 to train more Gaussian processes using per-bin statistics 132.

Verifying Gaussian Processes for Signal Strength Measurements

Gaussian process pipeline 100 can train Gaussian processes when few or many (e.g., thousands) different mobile devices contribute to a training set Given a large (e.g., billions) number of such trained Gaussian processes, the quality of each Gaussian process can be evaluated by Gaussian process pipeline 100 in a scale-invariant manner, i.e., insensitive to training set size differences between Gaussian processes. Evaluating Gaussian process quality can identify Gaussian processes that should be rejected to increase the overall accuracy of locating a mobile device.

Some Gaussian process verification techniques use manual evaluation of Gaussian processes. However, manual techniques are unlikely to be successful to evaluate large numbers of Gaussian processes. Other techniques verify Gaussian processes using threshold-based rejection criteria. However, fixed threshold values based on expected results, including results that are scale variant, can lead to false acceptance or rejection of Gaussian processes.

Gaussian process pipeline 100 can evaluate a large number of trained Gaussian processes, where each Gaussian process is based on a set of hyperparameters that define a prior distribution for the Gaussian process. In the context of a Gaussian process trained using signal strength measurements, the hyperparameters can include location hyperparameters, power-related hyperparameters, signal-related hyperparameters, noise-related parameters, and/or other hyperparameters.

For each hyperparameter (e.g., a scalar representing the signal attenuation rate), Gaussian process pipeline 100 can take hyperparameter values independently from a distribution of hyperparameter values having a related mean and standard deviation. Then, as the number of optimized hyperparameter sets increase, the resulting distribution of hyperparameter values will better reflect the true distribution for each hyperparameter type. In other words, data driven insight can be provided or well-behaved trained Gaussian process-based models.

Gaussian process pipeline 100 can evaluate hyperparameters of trained Gaussian processes to determine whether to reject or accept the trained Gaussian processes by constructing histograms of hyperparameter values and then weighting/prioritizing Gaussian processes based on conformance of their hyperparameters values to the histogram. For example, hyperparameter values representing signal attenuation rate can be approximated by a normal distribution with a clearly identifiable mean (e.g., −0.6 dB per meter) and standard deviation (e.g., 0.2 dB). Thus, trained Gaussian processes with signal attenuation rates close to the identified mean value can be considered potentially more informative, while outliers can be potentially rejected. In some cases, outliers can represent signal sources are not uniquely identifiable and/or static, e.g., an 802.11 access point that randomizes its MAC address and/or relocates.

Gaussian process pipeline 100 can reduce the computational complexity involved in training Gaussian processes by using a multi-stage pipeline. For example, mean Gaussian processes can be trained in a first stage before training standard deviation Gaussian processes in a second stage. A two-stage pipeline for training Gaussian processes enables use of mean-based rejection criteria in generating mean Gaussian processes to reduce the total number of optimizations performed in generating standard deviation Gaussian processes. That is, mean Gaussian processes can be trained and evaluated independently in the first stage from standard deviation Gaussian processes trained and evaluated during the second stage.

Figure 11:
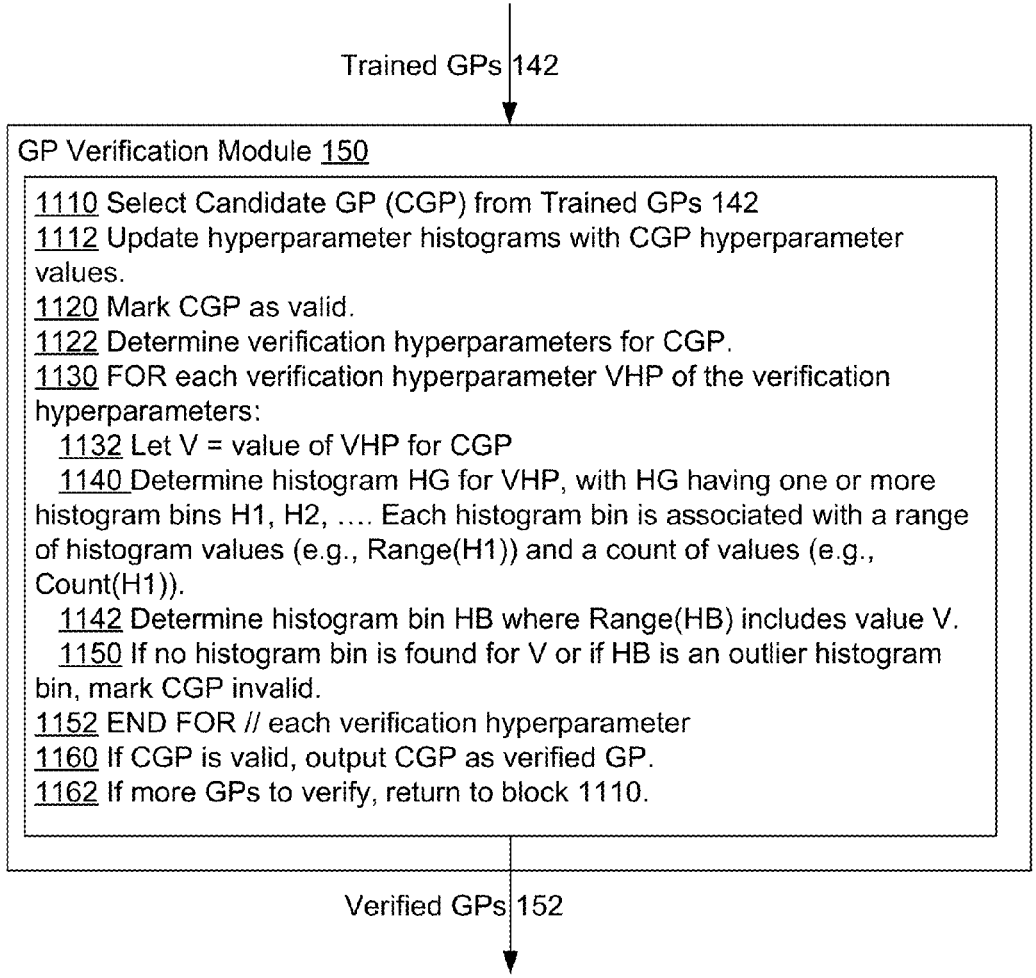
FIG. 11 is a diagram of an example Gaussian process verification module, in accordance with an example embodiment.

FIG. 11 is a diagram of an example Gaussian process verification module 150, in accordance with an example embodiment. Gaussian process verification module 150 can receive one or trained Gaussian processes 142 as inputs and output verified Gaussian processes 152. FIG. 11 shows Gaussian process verification module 150 with example pseudo-code for illustrating concepts for verifying trained Gaussian processes.

At block 1110, a candidate Gaussian process CGP can be selected from trained Gaussian processes 142. Each Gaussian process of trained Gaussian processes 142, including candidate Gaussian process CGP, can be based on one or more hyperparameters. Some, if not all, of the hyperparameters can be used by Gaussian process verification module 150 as verification hyperparameters. If all verification hyperparameters for candidate Gaussian process CGP have values that pass inspection by Gaussian process verification module 150, then candidate Gaussian process CGP can be considered to be verified.

At block 1112, Gaussian process verification module 150 can update one or more hyperparameter histograms using one or more hyperparameter values from candidate Gaussian process CGP. That is, for each verification hyperparameter VHPup of the verification hyperparameters, a value Vup for the verification hyperparameter VHPup can be determined and a histogram bin (if any) in the histogram for verification hyperparameter VHPup can be found for value V. If a histogram bin HBup is found Vup, then a count value for the histogram bin Count(HBup) can be incremented. The histogram mean and standard deviation values can also be updated. Then, based on the updated histogram mean and standard deviation values, or perhaps some other criteria, the outlier/non-outlier status of each histogram bin can be reexamined and perhaps changed. In some embodiments, the processing of block 1112 can occur after candidate Gaussian process CGP is checked for verification; e.g., after the processing of block 1152. In some cases, a histogram bin can store values for one hyperparameter; while in other cases, a histogram bin can store values for two or more hyperparameters.

At block 1120, Gaussian process verification module 150 can initially mark candidate Gaussian process CGP as valid. At block 1122, Gaussian process verification module 150 can determine one or more hyperparameters associated with candidate Gaussian process CGP as verification hyperparameters. In some embodiments, Gaussian process verification module 150 can determine verification hyperparameters before selecting candidate Gaussian process CGP; e.g., as part of initializing Gaussian process verification module 150.

After completing the procedures of block 1122, Gaussian process verification module 150, can begin, a FOR loop to iterate through the verification hyperparameters. The loop can begin with block 1130, where a verification hyperparameter VHP of the verification hyperparameters is selected. At block 1132, Gaussian process verification module 150 can set a variable V to a value of verification hyperparameter VHP.

At block 1140, Gaussian process verification module 150 can determine a histogram HG for verification hyperparameter VHP. Histogram HG can have one or more histogram bins, H1, H2 . . . such as in the example histogram 1310 shown in FIG. 13A. Each histogram bin can be associated with one or more ranges of hyperparameter values; e.g., Range(H1) can represent a range of hyperparameter values for histogram bin H1 representing one hyperparameter; Range(H2, 2) can represent a second range of hyperparameters values for a histogram bin H2 representing two (or more) hyperparameters. Each histogram bin can be associated, for each hyperparameter represented by the histogram bin, with a count of Gaussian processes with a hyperparameter whose value is within the range of hyperparameter values; e.g., Count(H1) can be a count of previously processed Gaussian processes, each of which had a hyperparameter value that was within Range(H1); Count(H2, 2) can be a count of previously processed Gaussian processes, each of which had a second hyperparameter value of histogram bin H2 that was within Range(H2, 2).

For example, suppose a verification hyperparameter VHP1 can possibly have any single value between 0 and 100. In this example, VHP1 has a histogram HG1 represents values of one verification hyperparameter VHP1 from 1000 previous Gaussian Processes, with data for histogram HG1 shown in Table 1 below.

TABLE 1

| HG1 Bin No. | Ranges of Values (inclusive) | Bin Mean | Count | Outlier? |
| --- | --- | --- | --- | --- |
| 1 | 0 to 15 | 7.5 | 41 | Y |
| 2 | 15+ to 25 | 20 | 81 | N |
| 3 | 25+ to 35 | 30 | 120 | N |
| 4 | 35+ to 45 | 40 | 159 | N |
| 5 | 45+ to 55 | 50 | 198 | N |
| 6 | 55+ to 65 | 60 | 159 | N |
| 7 | 65+ to 75 | 70 | 120 | N |
| 8 | 75+ to 85 | 80 | 81 | N |
| 9 | 85+ to 100 | 92.5 | 41 | Y |

The "Bin Mean" column of Table 1 indicates an average value of the range of values for a histogram bin. As an example, for HG1 Bin number 6, the range is "55+ to 65" representing VHP1 values between just over 55 (e.g., 55.0000001) and 65 that has a (rounded) average value of 60. The Bin Mean and Count values for each bin can be used to determine mean and standard deviation values for histogram HG1. In this example, HG1 has a histogram mean value of 50 and a histogram standard deviation of about 19.8. Then, suppose outlier histogram bins are designated as histogram bins whose histogram mean value is more than two histogram standard deviations (two sigma) either above or below the histogram mean value; that is, outlier histogram bins can be histogram bins whose Bin Mean is less than 50−2*19.8=10.4 or whose Bin Mean value that is greater than 50+2*19.8=89.6. In other examples, outlier histogram bins can be selected for values within more or less than two histogram standard deviation values from the mean histogram value.

Using a two-sigma criteria for outlier bins, Table 1 shows that histogram bins 1 and 9 are outlier bins and histogram bins 2-8 are not outlier bins. As additional values are added to histogram HG1, histogram bins can change from being outlier bins to not being outlier bins or vice versa. Other criteria for selecting outlier histogram bins are possible as well.

Then, at block 1142, a histogram bin HB whose range of values Range(HB) includes the hyperparameter value V can be identified. Using the example of Table 1, if V would be 7, then HB would be HG1 Bin number 1, as 7 (the value of V) is within the range 0 to 15 for HB Bin Number 1. As another example, if V would be 62, then HB would be HG1 Bin Number 6, as 7 (the value of V) is within the range 55+ to 65 for HB Bin Number 6. As a third example, if V would be 107, then as no bin corresponds to a value of 107, HB would be "not found".

At block 1150, if no histogram bin is found that corresponds to the value V or if found histogram bin HB corresponds to an outlier bin, then the candidate Gaussian process CGP can be marked as invalid. At block 1152, if there are more verification hyperparameters to be checked for candidate Gaussian process CGP, Gaussian process verification module 140 can return to block 1130. Otherwise, as all verification hyperparameters have been used to verify candidate Gaussian process CGP, Gaussian process verification module 150 can proceed to block 1160.

In some embodiments, comparisons of multiple hyperparameters can be performed along with, or instead of, the FOR loop of blocks 1130 to 1152. For example, function values that take multiple hyperparameter values as inputs can be compared by Gaussian process verification module 150. That is, a function VF( ), such as a cost function, average, weighted average, or another function of one or more verification hyperparameter values, can be used to calculate verification values based on one or more hyperparameter values from Gaussian processes and/or hyperparameter histogram(s). In particular embodiments, a hyperparameter histogram can involve multiple hyperparameter values; e.g., rather than a one-dimensional hyperparameter histogram, such as a bar chart as indicated in FIG. 13A, a multi-dimensional histogram, such as a grid, volume, or other representation of multiple hyperparameter values can be utilized That is, values V1, V2, and VH can be determined as verification values for respective Gaussian processes GP1, GP2, and histogram(s) H1, H2, . . . where V1=VF (GP1.VHP1, GP1.VHP2, . . . ), V2=VF(GP2.VHP1, GP2.VHP2 . . . ), and VH=VF(H1.value, H2.value . . . ) are verification function values based on multiple hyperparameter values, GP1.VHP1 is a first verification hyperparameter value for Gaussian process GP1, GP1.VHP2 is a second verification hyperparameter value for Gaussian process GP1, GP2.VHP1 is the first verification hyperparameter value for Gaussian process GP2, GP2.VHP2 is the second verification hyperparameter value for Gaussian process GP2, H1.value is a value associated with hyperparameter histogram H1, and H2.value is a value associated with hyperparameter histogram H2. Then, if V1 and VH are within (or in some embodiments, outside of) a threshold value, GP1 can be marked as valid; otherwise, GP1 can be marked as invalid. Similarly, if V2 and VH are within the threshold value, GP2 can be marked as valid; otherwise, GP2 can be marked as invalid.

Many other single and multiple-variable comparisons between hyperparameter values, hyperparameter histograms, and/or hyperparameter histogram values for validating Gaussian processes are possible as well.

At block 1160, if candidate Gaussian process CGP is marked as valid, Gaussian process verification module 150 can output candidate Gaussian process CGP as part of verified Gaussian processes 152 If candidate Gaussian process CGP is marked as invalid, Gaussian process verification module 150 can discard CGP, store CGP as an unverified process, or otherwise process CGP; e.g., output CGP as one or more unverified Gaussian processes separate from verified Gaussian processes 152

At block 1162, if there are more trained Gaussian processes 142 to verify, then Gaussian process verification module 150 can return to block 1110 and verify another trained Gaussian process.

FIG. 12 shows graph 1200 of example signal strength measurements with corresponding trained Gaussian process 1210 and estimated signal attenuation line 1220, in accordance with an example embodiment. Graph 1200 shows the signal strength measurements of FIG. 3 with position indicated on the X axis and signal strength indicated on the Y axis as RSSI, where the signal strength measurements include signal strength measurement 310. Gaussian process 1210 is trained to model mean values for the signal strength measurements shown in FIG. 12.

As mentioned above, trained Gaussian process 1210 can be defined by values of one or more hyperparameters. In the context of signal strength measurements, the hyperparameter values can specify signal locations, values for signal power and other signal-related parameters (e.g., frequency, attenuation), noise, and/or other specifications. In particular, FIG. 12 shows estimated signal attenuation line 1220 illustrating a signal attenuation rate hyperparameter for Gaussian process 1210. For example, if a hyperparameter representing a slope of estimated signal attenuation line 1220 were larger; e.g., the signal attenuation line was line 1230 instead of line 1220, then Gaussian process 1210 would have a steeper ascent to maximum point 1222. As another example, if a hyperparameter representing a slope of estimated signal attenuation line 1220 were smaller; e.g., the signal attenuation line was line 1232 instead of line 1220, then Gaussian process 1210 would have a shallower ascent to maximum point 1222.

FIG. 13A shows graph 1300 of histogram 1310 of attenuation-rate hyperparameter values for a Gaussian process, in accordance with an example embodiment. Histogram 1310 includes non-outlier histogram bins (HBs) 1312 and outlier histogram bin 1334. Along with histogram bins 1312 and 1334, graph 1300 illustrates three regions 1340, 1342, 1344 where histogram 1310 does not have a histogram bin for attenuation-rate hyperparameter values.

Each histogram bin of histogram 1310 can be associated with a range of attenuation-rate hyperparameter values, a bin mean, or mean value of ranges associated with the histogram bin, and a count of values for histogram bin, such as listed in Table 2 below.

TABLE 2

| Histogram Bin No. | Ranges of Values (in dB/m) | Bin Mean | Count | Outlier Bin? |
|---|---|---|---|---|
| 1320 | −1.066 to −0.933 | −1.0 dB/m | 4 | No |
| 1322 | −0.932 to −0.799 | −0.866 dB/m | 10 | No |
| 1324 | −0.798 to −0.665 | −0.732 dB/m | 16 | No |

TABLE 2-continued

| Histogram Bin No. | Ranges of Values (in dB/m) | Bin Mean | Count | Outlier Bin? |
|---|---|---|---|---|
| 1326 | −0.664 to −0.531 | −0.598 dB/m | 21 | No |
| 1328 | −0.530 to −0.397 | −0.464 dB/m | 17 | No |
| 1330 | −0.396 to −0.263 | −0.330 dB/m | 7 | No |
| 1332 | −0.263 to −0.130 | −0.197 dB/m | 5 | No |
| 1334 | +0.133 to +0.266 | +0.2 dB/m | 2 | Yes |

Table 2 illustrates that each of histogram bins 1320-1332 is a non-outlier histogram bin. A non-outlier histogram bin can be associated with a valid range of hyperparameter values. That is, since histogram bins 1320-1332 are a contiguous group of non-outlier histogram bins and collectively include a continuous range of hyperparameter values, any attenuation-rate hyperparameter value between −1.066 dB/m (the minimum attenuation-rate for histogram bins 1320-1332) and −0.130 dB/m (the maximum attenuation-rate for histogram bins 1320-1332) is a valid attenuation-rate hyperparameter value.

Invalid hyperparameter values can be associated with both outlier histogram bins and with ranges of values not represented by histogram bins. Combining contiguous ranges of attenuation-rate hyperparameter values associated outlier histogram bin 1334 with regions 1340, 1342, 1344 unrepresented by histogram bins, graph 1300 indicates that attenuation-rate hyperparameter values less than −1.066 dB/m or greater than −0.130 dB/m are invalid.

As discussed above, histogram bins can be classified as non-outlier or outlier histogram bins based on histogram mean and histogram standard deviation values. That is, if the histogram mean value for a histogram is HM and the histogram standard deviation value for the histogram is HSD, then histogram bins whose bin mean values are within a non-outlier (valid) range of values can be considered to be non-outlier bins. An example non-outlier range of values can be defined by HM±c*HSD, where c=a positive value; e.g., c=1, 2, 2.5, or 3; other example non-outlier ranges are possible as well. In some embodiments, a histogram bin HBx can be considered to be a non-outlier bin if any value of Range(HBx), rather than just the bin mean, is within an non-outlier range of values; while in other embodiments, histogram bin HBx can be considered to be a non-outlier bin if all values of Range(HBx) are within an non-outlier range of values.

The histogram mean value HM of a histogram can be determined using Equation (1):

$$HM = \sqrt{\frac{\sum_{i=1}^{NHB} BM_i * C_i}{\sum_{i=1}^{NHB} C_i}} \quad (1)$$

where NHB is a number of histogram bins, $BM_i$ is the bin mean for histogram bin i, $1 \leq i \leq NHB$, and $C_i$ is the count of values associated with the histogram bin. Using the values from Table 2 above, the histogram mean value HM for histogram 1310 is approximately −0.554.

The standard deviation value HSD of a histogram can be determined using Equation (2) below:

$$HSD = \sqrt{\frac{\sum_{i=1}^{NHB} C_i * (BM_i - HM)^2}{\sum_{i=1}^{NHB} C_i}} \quad (2)$$

Using the values from Table 2 above and a histogram mean HM value of −0.554, the histogram standard deviation HSD for histogram 1310 is approximately 0.236. Then, letting c=2, the formula HM±c*HSD can specify a non-outlier range of values (HM−2*HSD, HM+2*HSD) that equals (−1.026, −0.0.082) Then, as indicated by Table 2, each of histogram bins 1320-1332 have a bin value within the non-outlier range of bin values, and so histogram bins 1320-1332 can be classified as non-outlier histogram bins. Histogram bin 1334 has a bin value of +0.2 that is outside the non-outlier range of bin values, and so can be classified as an outlier histogram bin. Other techniques for determining outlier and non-outlier bins are possible as well.

FIG. 13B shows example data 1350 for a histogram of hyperparameter values for a Gaussian process, in accordance with an example embodiment. In some embodiments, more, fewer, and/or different data can be used as hyperparameter histogram data 1350.

Hyperparameter histogram data 1350 can include hyperparameter identifier 1352 and number of histogram bins 1354. Hyperparameter identifier 1352 can be a name, number, and/or some other denotation(s) that can identify the hyperparameter; e.g., for histogram 1310 discussed above, example names that can be used as hyperparameter identifier 1352 are "Attenuation Rate", "Attenuation-Rate Hyperparameter", and "Signal Attenuation Rate". Number of histogram bins 1354 can be an (integer) value indicating how many histogram bins are part of the histogram; e.g., for histogram 1310 of FIG. 13A, the number of histogram bins 1354 is eight.

Then, for each of the number of histogram bins 1354, hyperparameter histogram data 1350 can include data such as hyperparameter range 1360, hyperparameter count 1362, and outlier indicator 1364. Hyperparameter range 1360 can indicate an interval of hyperparameter values associated with the histogram bin, such as an interval between a minimum hyperparameter value and a maximum hyperparameter value, such as shown in the example hyperparameter range values for histogram 1310 indicated above in the second column of Table 2. Hyperparameter count 1362 can indicate a number of Gaussian processes, each of whose hyperparameter value was within hyperparameter range 1360; i.e., a number of Gaussian processes whose hyperparameter value is represented by the histogram bin. Example hyperparameter count values for histogram 1310 are indicated above in the fourth column of Table 2. Outlier indicator 1364 can indicate whether the histogram bin is an outlier histogram bin—an example of "Yes" and "No" values being used as outlier indicator 1364 for histogram 1310 is shown in the fifth column of Table 2.

In some embodiments, one histogram bin can store information for two or more hyperparameters. In these embodiments, a histogram bin can have data such as a hyperparameter count indicating a number of hyperparameters associated with the histogram bin. Then, for each of the number of hyperparameters indicated by the hyperparameter count, a hyperparameter range, hyperparameter count, and outlier indicator can be stored as part of the histogram bin; e.g., using the same or similar data as hyperparameter range 1360, hyperparameter count 1362, and outlier indicator 1364 discussed above. Other embodiments are possible as well.

Figure 14:
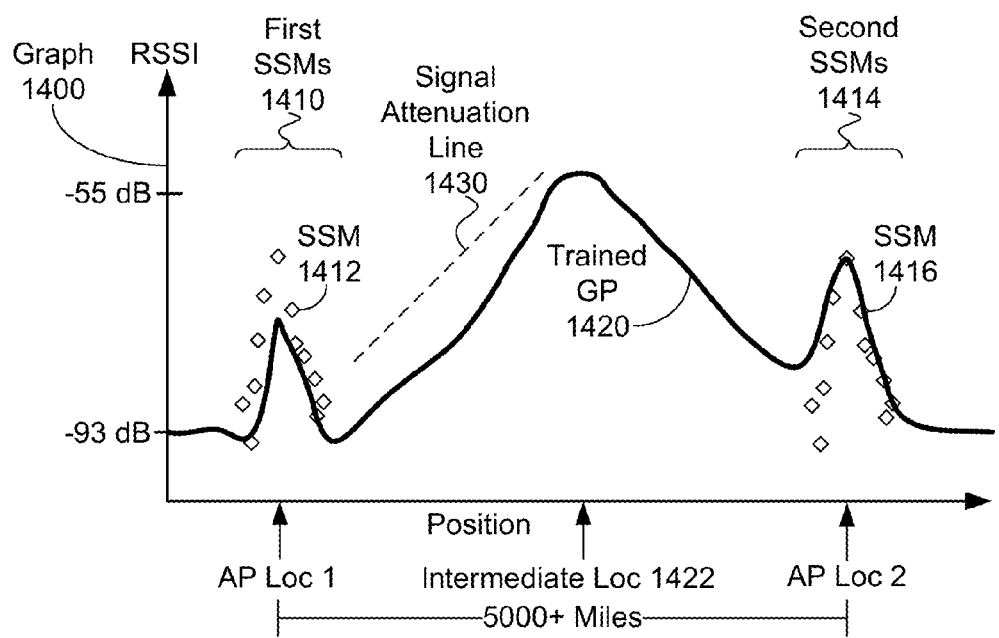
FIG. 14 is a diagram of an example Gaussian process based on signal strength measurements for an access point that has been moved, in accordance with an example embodiment.

FIG. 14 is a graph 1400 of Gaussian process 1420 trained using signal strength measurements for an access point that has been moved, in accordance with an example embodiment. In a scenario that led to graph 1400, first signal strength measurements 1410, including signal strength measurement 1412 for the access point were observed at a first location indicated as "AP Loc 1" of FIG. 14. Then, the access point was powered down and moved to a second location more than 5,000 miles away, indicated as "AP Loc 2" of FIG. 14. The access point was then powered up and started generating wireless signals observed as second signal strength measurements 1414, including signal strength measurement 1416. Note that graph 1400 is not drawn to scale.

As shown in FIG. 1, Gaussian process 1420 has three distinct peaks—one corresponding to the first location, one corresponding to the second location, and a third and highest peak corresponding to intermediate location 1422 between the first and second locations. In this scenario, the access point was not active at intermediate location 1422—no signal strength measurements are shown in graph 1400 at or near intermediate location 1422. As such, Gaussian process 1420 does not accurately model signals emitted by the access point.

Gaussian process 1420 can be verified based on hyperparameter values using Gaussian process verification module 150, as discussed above in the context of at least FIGS. 11-13B. In particular, signal attenuation line 1430 represents an attenuation-rate hyperparameter value indicates approximately +0.0 dB/meter. As part of verification of Gaussian process 1420, Gaussian process verification module 150 can attempt to determine a histogram bin of histogram 1310 for the attenuation-rate hyperparameter value for Gaussian process 1420. Using the values in Table 2 for the histogram bins of histogram 1310, no histogram bin exists for a +0.0 dB/meter value—rather, looking at FIG. 13A, a +0.0 dB/meter value is in region 1342 unrepresented by histogram bins. As no histogram bin exists for the attenuation-rate hyperparameter of Gaussian process 1420, Gaussian process verification module 150 can mark Gaussian process 1420 as invalid, as discussed above in the context of block 1150 of FIG. 11.

Checking Gaussian Processes for Inter-Process Dependencies

Given a large number (e.g., billions) of valid, trained Gaussian processes, one goal is to identify which Gaussian processes are probabilistically dependent. For example, a single access point often broadcasts several different MAC addresses on the same wireless channel (i.e., the access point uses virtual MAC addresses). Since the measurement errors associated with these addresses are likely to be correlated, corresponding Gaussian processes can be treated as correlated or dependent. Not correlating Gaussian processes can lead to less informative wireless models and, in the context of locating mobile devices, decreased location accuracy.

Given a dataset of signal strength measurements, one approach to identify correlation between two wireless signals is to calculate the similarity of their corresponding measurements. Given that some datasets can include trillions (or more) signal strength measurements, comparing all measurements to each other is not feasible. Another approach is to compare individual scans, i.e., gatherings of many (potentially hundreds) signal strength measurements taken at the same time but representing different addresses. Then, similarities among signal strength measurement pairs within the scan can be compared (e.g., was the signal strength of address A close to address B?), followed by comparing frequencies of this type of correlation (e.g., how often was the signal strength of address A close to address B?). This approach has the disadvantage that both signal source properties (e.g., MAC address rotation) and mobile scan properties (e.g., maximum number of reported measurements) differ between their respective hardware, which can degrade the overall performance of correlation identification. Instead of scans, other approaches consider spatial proximity when comparing signal strength measurement. This approach can be susceptible to false positives given certain geometric (e.g., symmetric) configurations of the environment and/or patterns of the signal strength measurement collections.

Instead, Gaussian process pipeline 100 considers Gaussian processes whose hyperparameters have been optimized and checked for validity. Each Gaussian process can be associated with a uniquely identifiable address (or other identifier) for an access point and has an embedded signal propagation profile; e.g., having one or more hyperparameters that represent a hypothesized location (e.g., latitude and longitude) of the access point. Gaussian process pipeline 100 can incorporate signal propagation information into Gaussian processes as part of their mean functions.

Before using these trained Gaussian processes, Gaussian process pipeline 100 can identify correlation between wireless signals. Doing so prevents location algorithms from treating multiple dependent information sources as independent, a problem often referred to as double counting. In addition, knowing correlations between wireless signals allows merging of Gaussian processes; e.g., generating merged Gaussian processes by retraining some Gaussian processes with larger, more informative datasets.

Gaussian process pipeline 100 can identify correlated wireless signals by first grouping signal sources based on proximity to a hypothesized location (e.g., of a mobile computing device) and then comparing the other features of corresponding Gaussian processes. Grouping signal sources based on proximity to the hypothesized location can be based on values of location-representative hyperparameters, while comparing other features such as noise properties can utilize values of other hyperparameters. For example, proximity-based grouping can locate MAC addresses whose signal sources are hypothesized to be within a particular location; e.g., a corporate conference room. Then, Gaussian process pipeline 100 can compare values of other hyperparameters to investigate other features, such as respective signal attenuation rates and likelihood noise variances. Gaussian processes whose hyperparameters are within a certain range of one another can then be identified as probabilistically dependent; otherwise, the Gaussian processes can be identified as probabilistically independent.

Gaussian process pipeline 100 allows for more flexible and informative notions of correlation. For example, two collocated yet hardware independent access points operating at the same frequency (e.g., 2.4 GHz) can be identified as probabilistically dependent, even if the access points operate at different power outputs. This identification cannot be done correlating only signal strength measurements, since their measured strengths will differ in this example. Similarly, signals of different frequencies that originate from a common source can be identified as probabilistically independent, since the environment can affect the originated signals differently and in informative ways.

FIG. 15 is a diagram of Gaussian process dependency checking module 160, in accordance with an example embodiment. Gaussian process dependency checking module 160 can receive one or more verified Gaussian processes 152 as an input and output one or more Gaussian processes indicated to be independent Gaussian processes 162. FIG. 15 shows example pseudo-code for Gaussian process dependency checking module 160 to illustrate concepts for checking Gaussian processes for dependencies.

Gaussian process dependency checking module 160 can determine a set of NHP hyperparameters, where NHP>0, used to define verified Gaussian processes 152. At block 1510, Gaussian process dependency checking module 160 can determine a set of NCHP comparison hyperparameters, where NHP≥NCHP>0.

The set of comparison hyperparameters can be used to determine dependence between Gaussian processes. For example, two Gaussian processes TGP1 and TGP2, each based on at least a set of NCHP hyperparameters, can be dependent Gaussian processes if a distance between a comparison hyperparameter value of TGP1 is within a threshold value of a corresponding comparison hyperparameter value of TGP2 for all NCHP hyperparameters in the set of comparison hyperparameters. Otherwise, a distance of at least one comparison hyperparameter value of TGP1 is greater than the threshold value of at least one corresponding comparison hyperparameter value of TGP2, and so TGP1 can be considered to be independent of TGP2.

A distance function Distance(X, Y) can be used to compare hyperparameter values for dependency. Examples of distance function Distance(X, Y) include, but are not limited to, functions based on: a difference between X and Y, an absolute value of a difference between X and Y, and an nth root of a difference taken to the nth degree; e.g., $[(X-Y)^n]^{1/n}$.

At block 1520, Gaussian process dependency checking module 160 can select a set SGP of N verified Gaussian processes, SGP=GP1, GP2, . . . , each of which are associated with a predetermined location L, and where N>1. If N=0, no Gaussian processes are associated with location L, and so no dependency checking needs to be performed. If N=1, then only one Gaussian process is associated with location L, and again, no dependency checking needs to be performed for only one process. In some embodiments, Gaussian process dependency checking module 160 can determine location L; e.g., Gaussian process dependency checking module 160 can receive location L as a single input, can receive a group of predetermined locations including location L, can randomly determine location L, such as for testing purposes.

At block 1522, Gaussian process dependency checking module 160 can (initially) indicate that each Gaussian process in set SGP is an independent Gaussian process. At block 1530, a pair of Gaussian processes not already checked for dependencies, GP1 and GP2, can be selected from the set SGP. At block 1532, an independence indicator "indep" can be initialized to 0, indicating an initial assumption that GP1 and GP2 are dependent (that is, not independent). At block 1534, if both GP1 and GP2 are indicated to be independent Gaussian processes, then Gaussian process dependency checking module 160 can proceed to block 1540. Otherwise, Gaussian process dependency checking module 160 can proceed to block 1560.

At block 1540, Gaussian process dependency checking module 160 can loop through each hyperparameter HP(i) of the set of NCHP comparison hyperparameters using i as an index value for the set of comparison hyperparameters. At block 1542, distance function Distance( ) can return a distance between a value of hyperparameter i for GP1; e.g., GP1.HP(i), and a value of hyperparameter i for GP2; e.g., GP2.HP(i). If the returned distance is greater than a threshold value for the $i^{th}$ hyperparameter; e.g., Threshold(HP(i)), then GP1 and GP2 can be considered to be independent. That is, if (Distance(GP1.HP(i), GP2.HP(i))>Threshold(HP (i)), then GP1 and GP2 can be considered to be to independent, and so at block 1544, the independence indicator indep can be set to 1. At block 1550, the if statement related to distance function Distance( ) started at block 1542 can be completed. At block 1552, the loop started at block 1540 can be completed.

In some embodiments, comparisons of multiple hyperparameters can be performed along with, or instead of, the FOR loop of blocks 1530 to 1552. For example, function values that take multiple hyperparameter values as inputs can be compared by Gaussian process dependency checking module 160. That is, a function DCF( ), such as a cost function, average, weighted average, or another function of one or more comparison hyperparameter values, can be used to calculate dependency checking values based on one or more hyperparameter values from Gaussian processes.

That is, values DV1 and DV2 can be determined as dependency checking values for respective Gaussian processes GP1 and GP2, where DV1=DCF(GP1.CHP1, GP1.CHP2, . . . ) and DV2=DCF(GP2.CHP1, GP2.CHP2 . . . ) are dependency checking function values that are based on multiple hyperparameter values, GP1.CHP1 is a first comparison hyperparameter value for Gaussian process GP1, GP1.CHP2 is a second comparison hyperparameter value for Gaussian process GP1, GP2.CHP1 is the first comparison hyperparameter value for Gaussian process GP2, and GP2.CHP2 is the second comparison hyperparameter value for Gaussian process GP2. Then, if V1 and V2 are within (or in some embodiments, outside of) a threshold value, V1 and V2 can be considered to be dependent Gaussian processes; otherwise, V1 and V2 can be considered to be independent Gaussian processes.

Many other single and multiple-variable comparisons between comparison hyperparameter values for determining Gaussian process dependencies are possible as well.

At block 1554, if the independence indicator is equal to zero, then GP1 and GP2 are considered to be dependent, and so at least one of GP1 and GP2 can be marked as dependent. At block 1556, the if statement started at block 1554 can be completed. At block 1560, the if statement started at block 1534 can be completed.

At block 1570, the for loop begin at block 1530 can be completed, and so dependency checking can be completed for GP1 and GP2. If additional pairs of Gaussian processes associated with location L are to be tested for dependencies, Gaussian process dependency checking module 160 can return to block 1530, where a new pair of Gaussian processes can be checked for dependency.

At block 1572, each Gaussian process in the set SGP that is marked as an independent Gaussian process can be output as part of independent Gaussian processes 162. Some or all Gaussian processes in SGP marked as an dependent Gaussian processes can be discarded, merged, output as a dependent Gaussian process, and/or otherwise processed, output as one or more dependent Gaussian processes separate from independent Gaussian processes 152.

At block 1580, if there are more verified Gaussian processes 152 to check for dependencies, then Gaussian process dependency checking module 160 can return to block 1510 and check more Gaussian processes for dependencies.

FIG. 16 shows example Gaussian process data 1610 for representing a Gaussian process, in accordance with an example embodiment. In some embodiments, a Gaussian process can be represented by more, less, and/or different data than Gaussian process data 1610.

Gaussian process data 1610 includes a Gaussian process identifier 1620, physical location information 1630, verification indicator 1640, independence indicator 1642, wireless signal emitter identifier 1650, and a number of hyperparameters 1660. In the example shown in FIG. 16, the number of hyperparameters, NHP, is greater than two; while in other examples, more or fewer hyperparameters can be associated with a Gaussian process and stored as part of Gaussian process data.

Gaussian process identifier 1620 can be a name, number, and/or some other denotation(s) that uniquely distinguish a Gaussian process. Physical location information 1630 can indicate an area or space associated with the Gaussian process, such as information; e.g., latitude, longitude, and perhaps altitude, locating a center point, a centroid, a bounding box, or other representation of an area or space. Verification indicator 1640 can indicate whether the Gaussian process has been verified, such as discussed above in the context of FIGS. 11-14. Independence indicator 1640 can indicate whether the Gaussian process has been determined to be independent, such as discussed in the context of FIGS. 15, 17A, 17B, 17C, 18, and 19. Wireless signal emitter identifier 1650 can be used to uniquely distinguish a wireless signal emitter and can have the properties of wireless signal emitter identifier 470 described above in the context of FIG. 4F.

Gaussian process data 1610 can store a value of each hyperparameter associated with the Gaussian process. FIG. 16 shows that Gaussian process data 1610 can store value 1662 of Hyperparameter 1, value 1664 of Hyperparameter 2, and so on, until value 1666 of Hyperparameter NHP is stored. In some embodiments, an identifier and/or other data about some or all of the NHP hyperparameters can be stored with corresponding hyperparameter values as part of Gaussian process data 1610.

Figure 17A:
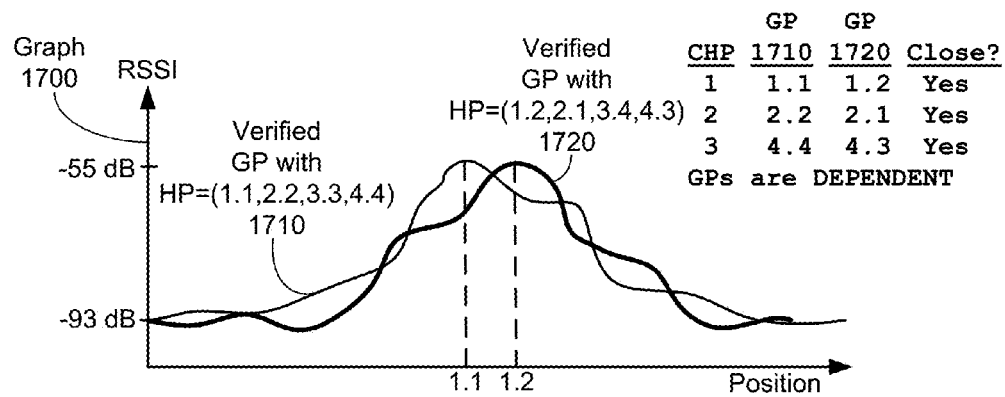
FIG. 17A is a graph of two dependent Gaussian processes, in accordance with an example embodiment.
Figure 17B:
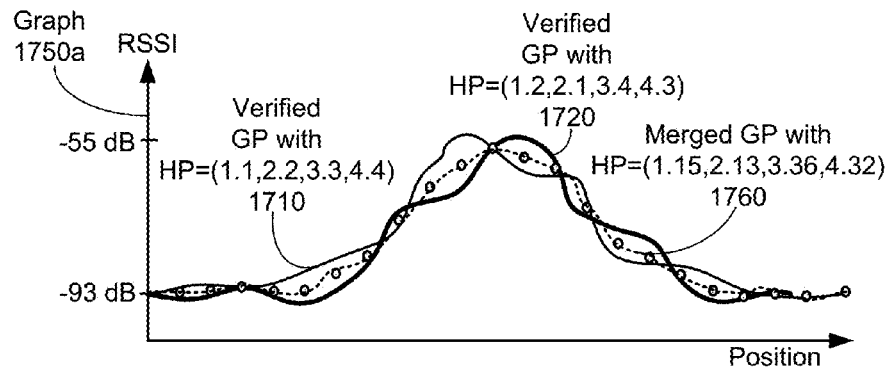
FIG. 17B is a graph of two dependent Gaussian processes and a merged Gaussian process, in accordance with an example embodiment.
Figure 17C:
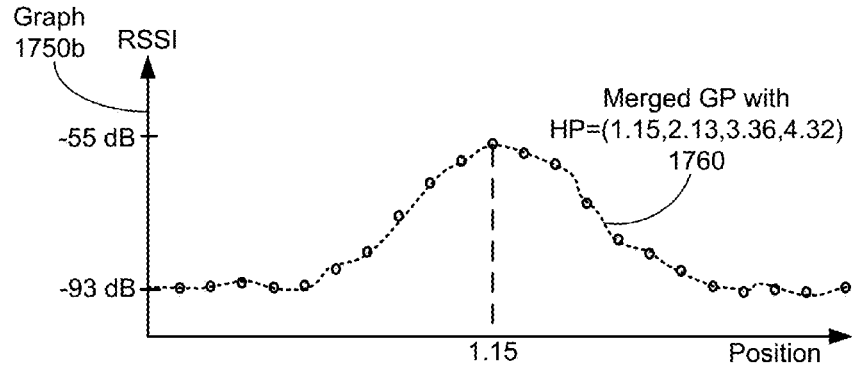
FIG. 17C is a graph of a merged Gaussian process, in accordance with an example embodiment.
Figure 18:
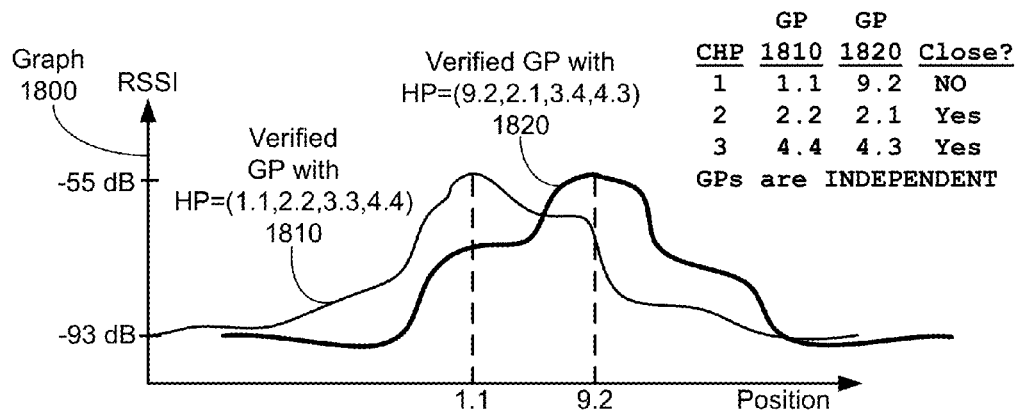
FIG. 18 is a graph of two independent Gaussian processes, in accordance with an example embodiment.
Figure 19:
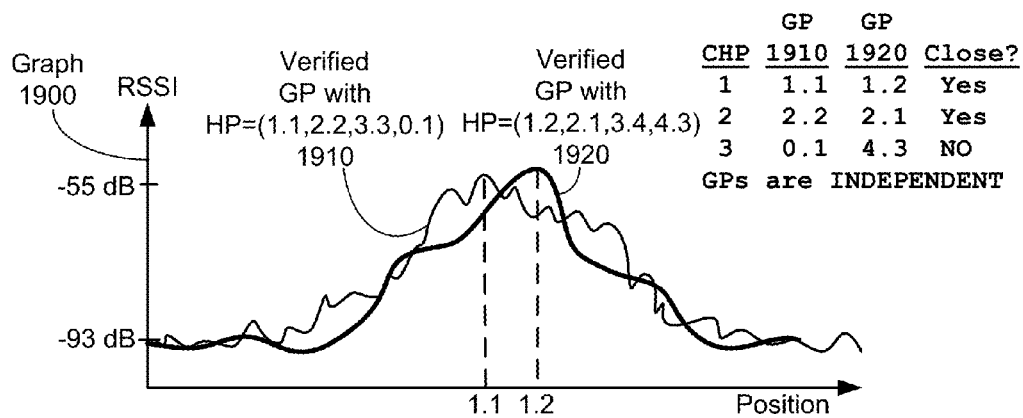
FIG. 19 is a graph of two other independent Gaussian processes, in accordance with an example embodiment.

In the examples shown in FIGS. 17A, 17B, 17C, 18, and 19, the same four hyperparameters are used for all of Gaussian processes 1710, 1720, 1760 of FIGS. 17A-17C, Gaussian processes 1810, 1820 of FIG. 18, and Gaussian processes 1910, and 1920 of FIG. 19. Of these four hyperparameters, a first hyperparameter is associated with a location of the Gaussian process, a second hyperparameter is associated with a signal attenuation rate, a third hyperparameter is associated with a power output of signals measured to generated the Gaussian process, and a fourth hyperparameter is associated with noise related to the Gaussian process. Values for these four hyperparameters are shown in FIGS. 17A, 17B, 17C, 18, and 19 as a quadruple: (HP1, HP2, HP3, HP4), where HP1 is a value for the first (location) hyperparameter, HP2 is a value for the second (signal attenuation) hyperparameter, HP3 is a value for the third (power) hyperparameter, and HP4 is a value for the fourth (noise) hyperparameter.

In the examples shown in FIGS. 17A, 17B, 17C, 18, and 19, a set of three comparison hyperparameters has been selected from the four hyperparameters to check Gaussian processes for dependence. The three comparison hyperparameters include: a first comparison hyperparameter, which is the first (location) hyperparameter, a second comparison hyperparameter, which is the second (signal attenuation) hyperparameter, and a third comparison hyperparameter, which is the fourth (noise) hyperparameter.

FIG. 17A shows graph 1700 of two dependent Gaussian processes 1710 and 1720, in accordance with an example embodiment. FIG. 17A shows verified Gaussian process 1710 associated with hyperparameter values of (1.1, 2.2, 3.3, 4.4) and verified Gaussian process 1720 associated with hyperparameter values of (1.2, 2.1, 3.4, 4.3).

The upper-right portion of FIG. 17A shows a comparison table for values of the three comparison hyperparameters for Gaussian processes 1710, 1720. The comparison table has four columns: the first column, headed by "CHP" indicates which of the three comparison hyperparameters is being compared using that row of the comparison table, the second column, headed by "GP1710", indicates the value of the comparison hyperparameter for Gaussian process 1710, the third column, headed by "GP1720", the value of the comparison hyperparameter for Gaussian process 1720, and the fourth column, headed by "Close?" indicates whether the comparison hyperparameter values are within a threshold value; i.e., within tolerance, of each other.

In some embodiments, comparison hyperparameter values can be compared to a common threshold value (e.g., an absolute value of the difference of the hyperparameter values can be less than 0.2 units). In other embodiments, some or all comparison hyperparameter values can be compared to hyperparameter-specific threshold values. For examples of hyperparameter-specific threshold values, a difference between first comparison hyperparameter values can be compared to a threshold of 0.2 location units, a difference between second comparison hyperparameter values can be compared to a signal attenuation threshold of 0.15 dB/m, and a difference between third comparison hyperparameter values can be compared to a noise threshold of 0.3. In other examples, formulas and/or relative values can be used instead of, or along with constant values; e.g., two hyperparameters can be within a threshold of 5% of the larger (or smaller) hyperparameter value to be considered close, two hyperparameter values V1 and V2 can be within tolerance if $f2(V1, V2) \leq X$, where $f2(V1, V2) = \sqrt{(V1-V2)^2}$ and X is a constant value greater than zero. Many other comparisons and thresholds related to closeness/tolerance of hyperparameter values are possible as well.

For the example shown in FIG. 17A, distances, in terms of absolute values of differences in values of the comparison hyperparameters, are each compared to a 0.2 unit threshold to determine closeness. Then, for the first comparison hyperparameter, the distance between values is |1.1−1.2|=0.1, which is less than the 0.2 unit threshold, and so the first comparison hyperparameter values for Gaussian processes 1710 and 1720 can be considered to be close. For the second comparison hyperparameter, the distance between values is |2.2−2.1|=0.1, which is less than the 0.2 unit threshold, and so the second comparison hyperparameter values for Gaussian processes 1710 and 1720 can be considered to be close. For the third comparison hyperparameter (or fourth hyperparameter), the distance between values is |4.4−4.3|=0.1, which is less than the 0.2 unit threshold, and so the third comparison hyperparameter values for Gaussian processes 1710 and 1720 can be considered to be close. As each of the three comparison hyperparameter values for Gaussian processes 1710 and 1720 are considered to be close, Gaussian processes 1710 and 1720 can be considered to be dependent by Gaussian process dependency checking module 160 and as indicated at upper-right of FIG. 17A.

FIG. 17B shows graph 1750*a* of two dependent Gaussian processes 1710 and 1720 and merged Gaussian process 1760, in accordance with an example embodiment. As Gaussian processes 1710 and 1720 are dependent as discussed immediately above, Gaussian processes 1710 and 1720 can be merged. To merge Gaussian processes, signal strength measurements associated with Gaussian process 1710 can be combined with signal strength measurements associated with Gaussian process 1720 to generate a merged Gaussian process; e.g., merged Gaussian process 1760. FIG. 17B shows merged Gaussian process 1760 having hyperparameter values of 1.15, 2.13, 3.36, and 4.32.

FIG. 17C shows graph 1750b of merged Gaussian process 1760, in accordance with an example embodiment. FIG. 17C indicates that, in some embodiments, once Gaussian processes 1710 and 1720 have been merged, they can be deleted as being replaced by merged Gaussian process 1760.

In other embodiments, one of Gaussian processes 1710 and 1720 can be selected to represent both can be considered both Gaussian processes 1710, 1720; e.g., in scenarios where a large number of signal strength measurements were used to train at least one of Gaussian processes 1710 and 1720. In these scenarios, one Gaussian process; e.g., the Gaussian process of Gaussian processes 1710 and 1720 that was trained using a larger number of signal strength measurements can represent both Gaussian processes 1710 and 1720. Other techniques for selecting and/or merging dependent Gaussian processes 1710 and 1720 are possible as well.

FIG. 18 shows graph 1800 of two independent Gaussian processes 1810 and 1820, in accordance with an example embodiment. In particular, FIG. 18 shows verified Gaussian process 1810 has hyperparameter values of (1.1, 2.2, 3.3, 4.4) and verified Gaussian process 1820 has hyperparameter values of (9.2, 2.1, 3.4, 4.3). As shown in FIG. 18, Gaussian processes 1810 and 1820 have maximum signal strength values at respective locations 1.1 and 9.2, which are also the values of the respective first hyperparameters of the two Gaussian processes.

The upper-right portion of FIG. 18 shows a comparison table for values of the three comparison hyperparameters for Gaussian processes 1810, 1820. For the example shown in FIG. 18, distances, in terms of absolute values of differences in values of the comparison hyperparameters, are each compared to a 0.2 unit threshold to determine closeness. Then, for the first comparison hyperparameter, the distance between values is |1.1−9.2|=8.1, which is greater than the 0.2 unit threshold, and so the first comparison hyperparameter values for Gaussian processes 1810 and 1820 can be considered not to be close. As at least one pair of comparison hyperparameter values are not close, Gaussian process dependency checking module 160 can consider Gaussian processes 1810 and 1820 to be independent, as discussed above in the context of FIG. 15. In some embodiments, as the first comparison hyperparameter indicates independence, values of the second and third comparison hyperparameter values are not compared for Gaussian processes 1810 and 1820.

FIG. 19 shows graph 1900 of two independent Gaussian processes 1910 and 1920, in accordance with an example embodiment. In particular, FIG. 19 shows verified Gaussian process 1910 with hyperparameter values of (1.1, 2.2, 3.3, 0.1) and verified Gaussian process 1920 with hyperparameter values of (1.2, 2.1, 3.4, 4.3). As shown in FIG. 19, Gaussian processes 1910 and 1920 have respective fourth hyperparameter values of 0.1 and 4.3. As discussed above, the fourth hyperparameter for Gaussian processes 1910 and 1920 is associated with noise. FIG. 19 shows that Gaussian process 1910 with a fourth hyperparameter value of 0.1 is more irregular; i.e., noisier, than Gaussian process 1920 which has a fourth hyperparameter value of 4.3.

The upper-right portion of FIG. 19 shows a comparison table for values of the three comparison hyperparameters for Gaussian processes 1910, 1920. For the example shown in FIG. 19, distances, in terms of absolute values of differences in values of the comparison hyperparameters, are each compared to a 0.2 unit threshold to determine closeness. Then, for the first comparison hyperparameter, the distance between values is |1.1−1.2|=0.1, which is less than the 0.2 unit threshold, and so the first comparison hyperparameter values for Gaussian processes 1910 and 1920 can be considered to be close. For the second comparison hyperparameter, the distance between values is |2.2−2.1|=0.1, which is less than the 0.2 unit threshold, and so the second comparison hyperparameter values for Gaussian processes 1910 and 1920 can be considered to be close. For the third comparison hyperparameter (or fourth hyperparameter), the distance between values is |0.1−4.3|=4.2, which is greater than the 0.2 unit threshold, and so the third comparison hyperparameter values for Gaussian processes 1910 and 1920 can be considered as not close.

As at least one pair of comparison hyperparameter values are not close, Gaussian process dependency checking module 160 can consider Gaussian processes 1910 and 1920 to be independent, as discussed above in detail in the context of blocks 1542 and 1544 of FIG. 10. Even though Gaussian processes 1910 and 1920 have similar locations for maximum signal strengths and have similar signal attenuation rates, as indicated by the first and second comparison hyperparameters, Gaussian processes 1910 and 1920 have different noise profiles, and so can be considered independent Gaussian processes.

Example Operations

Figure 20:
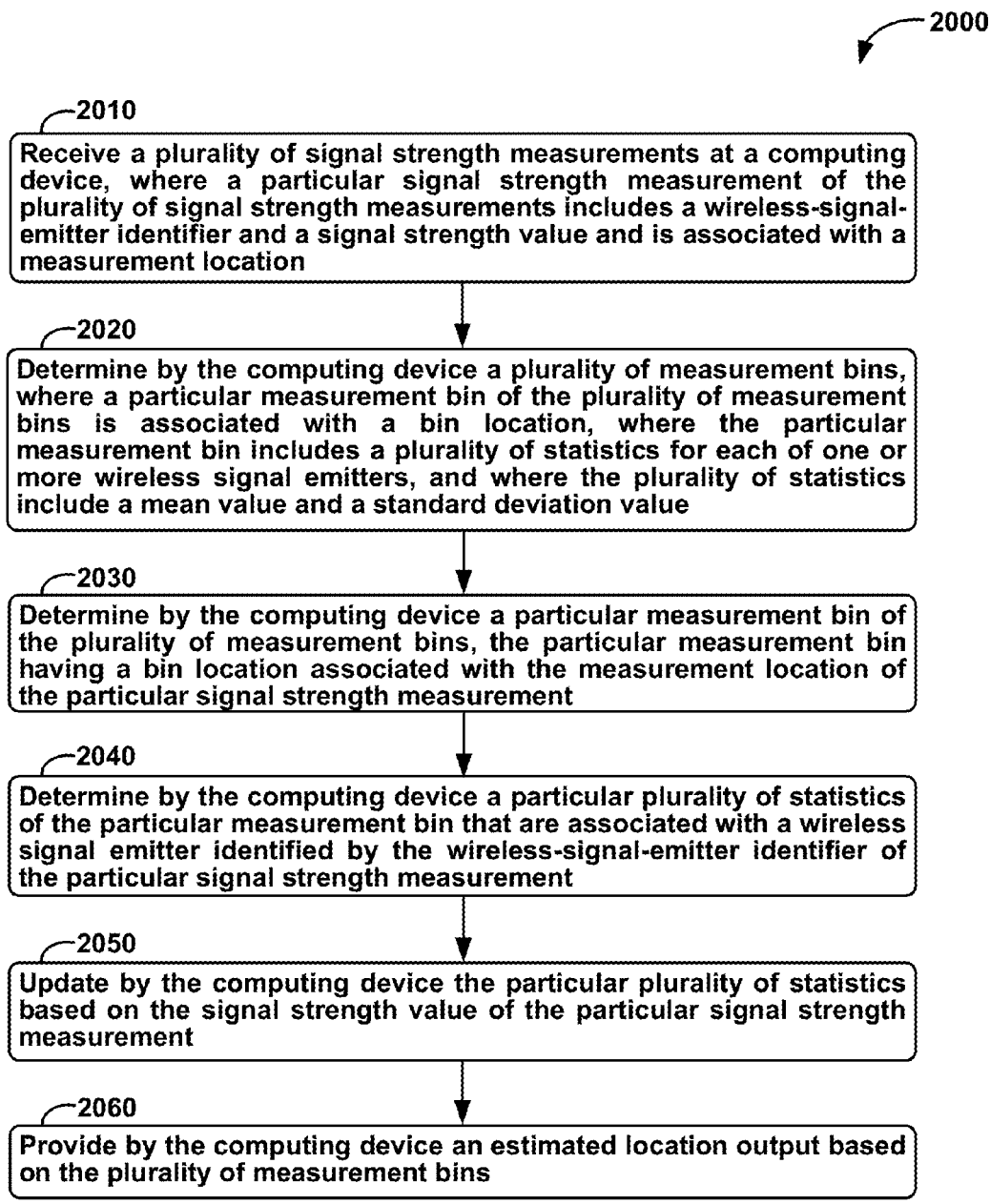
FIG. 20 is a flowchart of a method, in accordance with an example embodiment.

FIG. 20 is a flowchart of method 2000, in accordance with an example embodiment. Method 2000 can be carried out by a computing device, such as computing device 2500 described below in the context of FIG. 25.

Method 2000 can begin at block 2010, where the computing device can receive a plurality of signal strength measurements. A particular signal strength measurement can include a wireless-signal-emitter identifier and a signal strength value and can be associated with a measurement location, such as discussed above in the context of FIGS. 1-5. In some embodiments, the plurality of signal strength measurements can include a plurality of mobile-device-related signal strength measurements, where each signal strength measurement of the plurality of mobile-device-related signal strength measurements can be associated with a mobile device, such as discussed above in the context of FIGS. 1-5.

At block 2020, the computing device can determine a plurality of measurement bins. A particular measurement bin of the plurality of measurement bin can be associated with a bin location. The particular measurement bin can include a plurality of statistics for each of one or more wireless signal emitters. The plurality of statistics can include a mean value and a standard deviation value, such as discussed above in the context of at least FIGS. 1, 2, 4F and 5.

In some embodiments, the plurality of measurement bins are each associated with a bin area that includes the bin location, such as discussed above in the context of FIGS. 1-5. In other embodiments, the plurality of measurement bins can include a first measurement bin associated with a first bin area having a first bin area size and a second measurement bin associated with a second bin area having a second bin area size, where the first bin area size differs from the second bin area size, such as discussed above at least in the context of FIGS. 4A, 4D, and 4E.

At block 2030, the computing device can determine a particular measurement bin having a bin location associated with the measurement location of the particular signal strength measurement, such as discussed above in the context of at least FIGS. 1, 2, 4F and 5.

At block 2040, the computing device can determine a particular plurality of statistics of the particular measurement bin that are associated with a wireless signal emitter identified by the wireless-signal-emitter identifier of the particular signal strength measurement, such as discussed above in the context of at least FIGS. 1, 2, 4F and 5.

At block 2050, the computing device can update the particular plurality of statistics based on the signal strength value of the particular signal strength measurement, such as discussed above in the context of at least FIGS. 1, 2, 4F and 5.

In some embodiments, the particular plurality of statistics can have a normal-gamma distribution. Then, updating the particular plurality of statistics based on the signal strength value of the signal strength measurement can include: determining by the computing device a number of observations related to the particular plurality of statistics and determining by the computing device an updated mean value and an updated standard deviation value for the particular plurality of statistics based on the number of observations, the mean value, and the signal strength value, such as discussed above in the context of at least FIGS. 4F and 5.

At block 2060, the computing device can provide an estimated location output based on the plurality of measurement bins, such as discussed above in the context of FIG. 1. In some embodiments, providing the estimated location output can include: receiving a request related to locating a mobile device; determining by the computing device the estimate of the location of the mobile device based on the plurality of measurement bins; generating by the computing device the estimated location output including the estimate of the location; and providing the estimated location output. For example, the estimate of the location can include a location function, such as discussed above in the context of FIG. 1.

In some embodiments, method 2000 can further include: generating by the computing device a spatial index for the plurality of measurement bins, where the spatial index is configured to enable geographically-related queries regarding the plurality of measurement bins such as discussed above in the context of at least FIG. 1. In other embodiments, the plurality of measurement bins can each be associated with a number of signal strength measurements. Then, method 2000 can further include: determining a threshold number of per-bin signal strength measurements; for at least one measurement bin of the plurality of measurement bins: determining whether the number of signal strength measurements associated with the at least one measurement bin is below the threshold number of per-bin signal strength measurements; and, after determining that the number of signal strength measurements associated with the at least one measurement bin is below the threshold number of per-bin signal strength measurements, merging the measurement bin with a designated measurement bin of the plurality of measurement bins, where the designated measurement bin is associated with at least the threshold number of per-bin signal strength measurements, such as discussed above in the context of FIGS. 4A and 4D.

Figure 21:
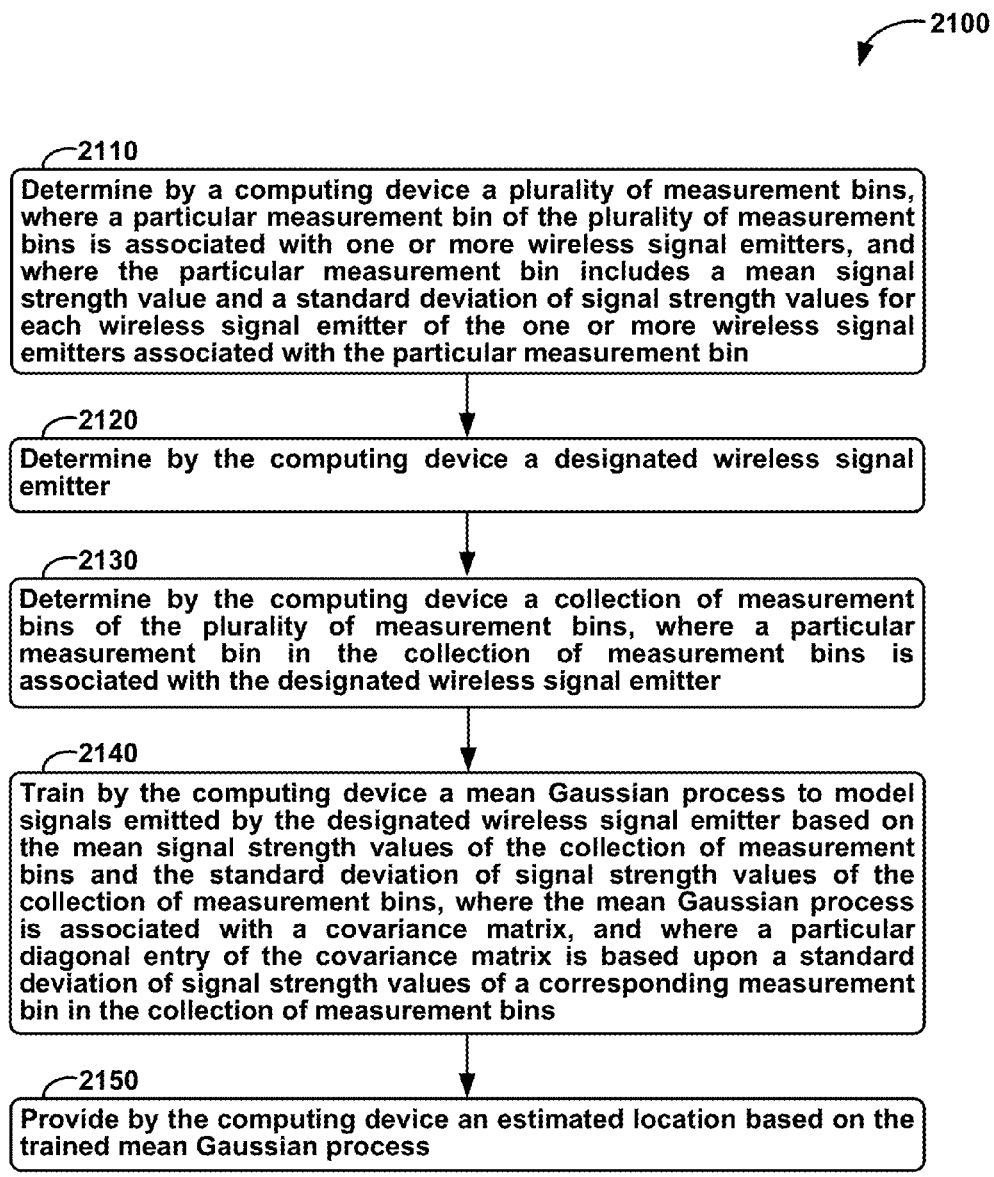
FIG. 21 is a flowchart of a method, in accordance with an example embodiment.

FIG. 21 is a flowchart of method 2100, in accordance with an example embodiment. Method 2100 can be carried out by a computing device, such as computing device 2500 described below in the context of FIG. 25. Method 2100 can begin with block 2110, where the computing device can determine a plurality of measurement bins, where a particular measurement bin of the plurality of measurement bins can be associated with one or more wireless signal emitters, and where the particular measurement bin can include a mean signal strength value and a standard deviation of signal strength values for each wireless signal emitter of the one or more wireless signal emitters associated with the particular measurement bin, such as discussed above in the context of at least FIGS. 1 and 7-10. At block 2120, the computing device can determine a designated wireless signal emitter, such as discussed above in the context of at least FIGS. 1 and 7-10.

At block 2130, the computing device can determine a collection of measurement bins of the plurality of measurement bins, where a particular measurement bin in the collection of measurement bins can be associated with the designated wireless signal emitter, such as discussed above in the context of at least FIGS. 1 and 7-10.

At block 2140, the computing device can train a mean Gaussian process for the designated wireless signal emitter based on the mean signal strength values of the collection of measurement bins and the standard deviation of signal strength values of the collection of measurement bins. The mean Gaussian process can be associated with a covariance matrix, where a particular diagonal entry of the covariance matrix can be based upon a standard deviation of signal strength values of a corresponding measurement bin in the collection of measurement bins, such as discussed above in the context of at least FIG. 1. In some embodiments, each non-diagonal entry of the covariance matrix can be equal to 0, such as discussed above in the context of at least FIG. 1.

At block 2150, the computing device can provide an estimated location based on the trained mean Gaussian process, such as discussed above in the context of at least FIG. 1. For example, the estimated location can be provided as an output of the computing device. In some embodiments, providing the estimated location can include: receiving a request related to locating a mobile device; determining an estimate of the location of the mobile device based on the trained mean Gaussian process; generating the estimated location including the estimate of the location; and providing the estimated location. For example, the estimate of the location can include a location function, such as discussed above in the context of FIG. 1.

In still other embodiments, method 2100 can include training, by the computing device, a standard deviation Gaussian process for the designated wireless signal emitter based on the mean signal strength values of the collection of measurement bins and the standard deviation of signal strength values of the collection of measurement bins, such as discussed above in the context of at least FIGS. 1, 7, and 10.

In even other embodiments, method 2100 can include determining by the computing device whether at least one bin in the collection of measurement bins is modified. Then, after determining that at least one bin in the collection of measurement bins is modified, a modified trained mean Gaussian process for the designated wireless signal emitter can be trained based on the mean signal strength values of the collection of measurement bins including the modified measurement bin and the standard deviation of signal strength values of the collection of measurement bins, such as discussed above in the context of at least FIGS. 1, 7, and 10.

In particular of the even other embodiments, method 2100 can include determining by the computing device whether a difference between the trained mean Gaussian process and the modified trained mean Gaussian process exceeds a threshold; and, after determining that the difference between the trained mean Gaussian process and the modified trained mean Gaussian process exceeds the threshold, providing an second output based on the modified trained mean Gaussian process, such as discussed above in the context of at least FIGS. 1, 7, and 10.

In other particular of the even other embodiments, the trained mean Gaussian process can be associated with a confidence value. Then, method 2100 can include: determining whether a difference between the trained mean Gaussian process and the modified trained mean Gaussian process exceeds a threshold and, after determining that the difference between the trained mean Gaussian process and the modified trained mean Gaussian process does not exceed the threshold, increasing the confidence value associated with the trained mean Gaussian process, such as discussed above in the context of at least FIGS. 1, 7, and 10.

In yet other embodiments, method 2100 can include: providing the estimated location can include providing a representation of the trained mean Gaussian process, such as discussed above in the context of at least FIG. 1.

Figure 22:
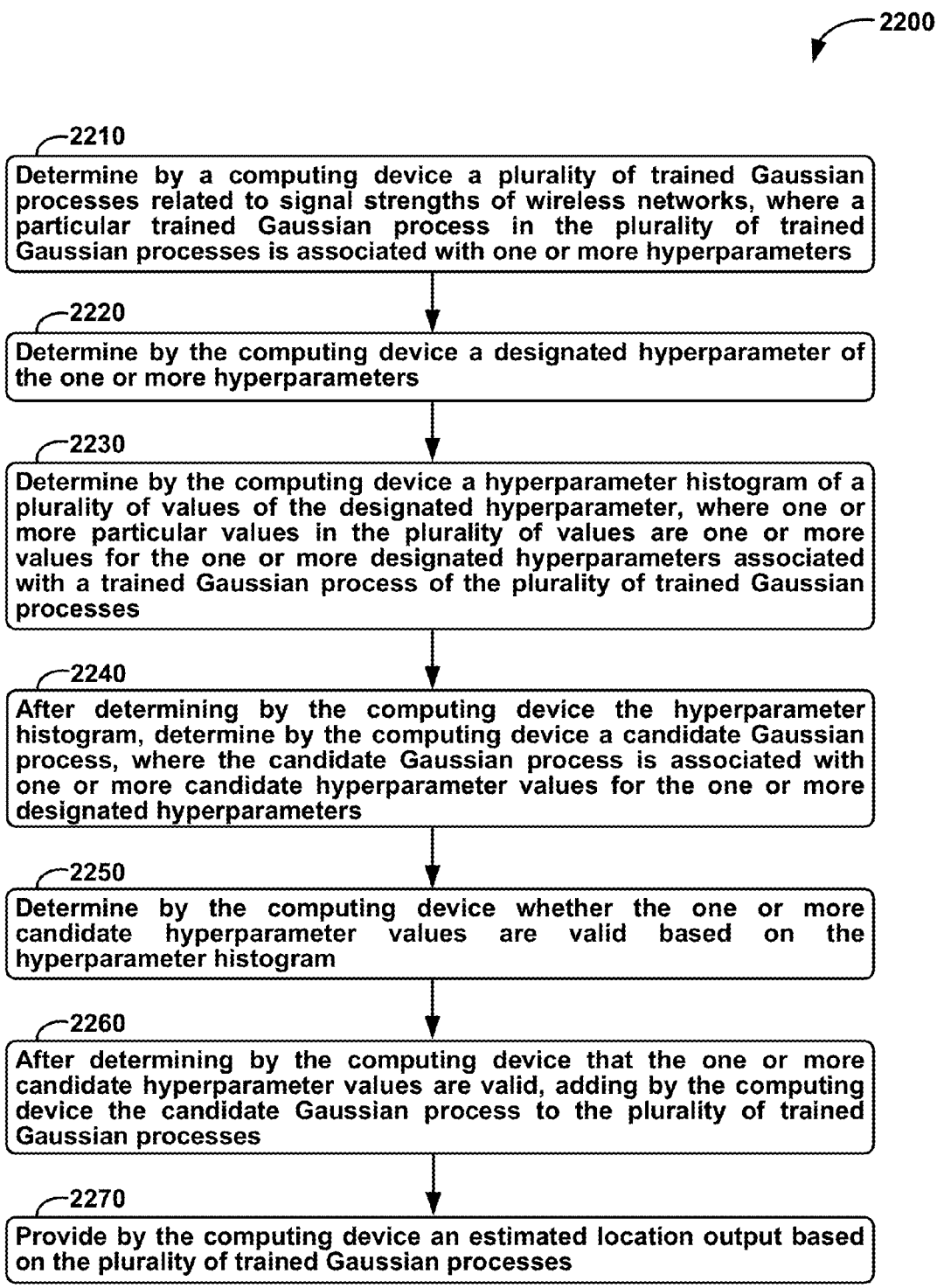
FIG. 22 is a flowchart of a method, in accordance with an example embodiment.

FIG. 22 is a flowchart of method 2200, in accordance with an example embodiment. Method 2200 can be carried out by a computing device, such as computing device 2500 described below in the context of FIG. 25.

Method 2200 can begin with block 2210, where the computing device can determine a plurality of trained Gaussian processes related to signal strengths of wireless networks, where a particular trained Gaussian process in the plurality of trained Gaussian processes can be associated with one or more hyperparameters, such as discussed above at least in the context of FIGS. 1 and 11.

At block 2220, the computing device can determine one or more designated hyperparameters of the one or more hyperparameters such as discussed above at least in the context of FIGS. 1 and 11-13A. In some embodiments, a designated hyperparameter of the one or more designated hyperparameters can be associated with an attenuation value of one or more signals of the wireless networks, such as discussed above at least in the context of FIGS. 11-13A.

At block 2230, the computing device can determine a hyperparameter histogram of a plurality of values of the one or more designated hyperparameters. One or more particular values in the plurality of values can be one or more values for the one or more designated hyperparameters associated with a trained Gaussian process of the plurality of trained Gaussian processes, such as discussed above at least in the context of FIGS. 1, 11, and 13A. In some embodiments, the hyperparameter histogram can include a plurality of histogram bins, where a particular histogram bin of the plurality of histogram bins is associated with one or more ranges of values of the one or more designated hyperparameters, such as discussed above in the context of at least FIGS. 11, 13A, and 13B.

At block 2240, the computing device can, after determining the hyperparameter histogram, determine a candidate Gaussian process, where the candidate Gaussian process can be associated with one or more candidate hyperparameter values for the one or more designated hyperparameters, such as discussed above at least in the context of FIGS. 1, 11, and 13A.

At block 2250, the computing device can determine whether the one or more candidate hyperparameter values are valid based on the hyperparameter histogram, such as discussed above at least in the context of FIGS. 1, 11, and 13A. In some embodiments, determining by the computing device whether the one or more candidate hyperparameter values are valid based on the hyperparameter histogram can include: determining one or more candidate ranges of values associated with a candidate histogram bin of the plurality of histogram bins, where the one or more candidate ranges of values includes the candidate hyperparameter value; and determining whether the candidate hyperparameter value is valid based on a histogram count associated with the candidate histogram bin, such as discussed above in the context of at least FIGS. 11, 13A, and 13B.

In particular embodiments, the particular histogram bin can be further associated with a range histogram count, where the range histogram count for the particular histogram bin can be based on a number of trained Gaussian processes whose designated hyperparameter values are within the ranges of values of the one or more designated hyperparameters associated with the particular histogram bin, and where the histogram count associated with the candidate histogram bin is based on a range histogram count for the candidate histogram bin, such as discussed above in the context of at least FIGS. 11, 13A, and 13B.

In more particular embodiments, determining by the computing device whether the one or more candidate hyperparameter values are valid can include: determining one or more mean values and one or more standard deviation values for the values of the one or more designated hyperparameters represented by the hyperparameter histogram; determining whether the candidate histogram bin is an outlier histogram bin based on the one or more mean values and the one or more standard deviation values; and after determining that the candidate histogram bin is not an outlier histogram bin, determining that the one or more candidate hyperparameter values are valid, such as discussed above in the context of at least FIGS. 11, 13A, and 13B.

In even more particular embodiments, determining by the computing device whether the one or more candidate hyperparameter values are valid based on the hyperparameter histogram can include: determining one or more mean values and one or more standard deviation values for the values of the one or more designated hyperparameter represented by the hyperparameter histogram; determining whether the candidate histogram bin is an outlier histogram bin based on the one or more mean values and the one or more standard deviation values; and after determining that the candidate histogram bin is an outlier histogram bin, determining that the one or more candidate hyperparameter values are not valid, such as discussed above in the context of at least FIGS. 11, 13A, and 13B.

At block 2260, the computing device can, after determining that the one or more candidate hyperparameter values are valid, add the candidate Gaussian process to the plurality of trained Gaussian processes, such as discussed above at least in the context of FIGS. 1 and 11.

At block 2270, the computing device can provide an estimated location output based on the plurality of trained Gaussian processes, such as discussed above at least in the context of FIG. 1. In some embodiments, providing the estimated location output can include: receiving a request related to locating a mobile device; determining by the computing device an estimate of the location of the mobile device based on the trained Gaussian processes; generating by the computing device the estimated location output including the estimate of the location; and providing the estimated location output. For example, the estimate of the location can include a location function, such as discussed above in the context of FIG. 1.

In some embodiments, method 2200 can further include: determining by the computing device a second candidate Gaussian process, where the second candidate Gaussian process can be associated with one or more second candidate hyperparameter values for the one or more designated hyperparameters; determining by the computing device whether the one or more second candidate hyperparameter values are valid based on the hyperparameter histogram; and after determining by the computing device that the one or more second candidate hyperparameter values are not valid, rejecting by the computing device the second candidate Gaussian process, such as discussed above in the context of at least FIG. 11.

Figure 23:
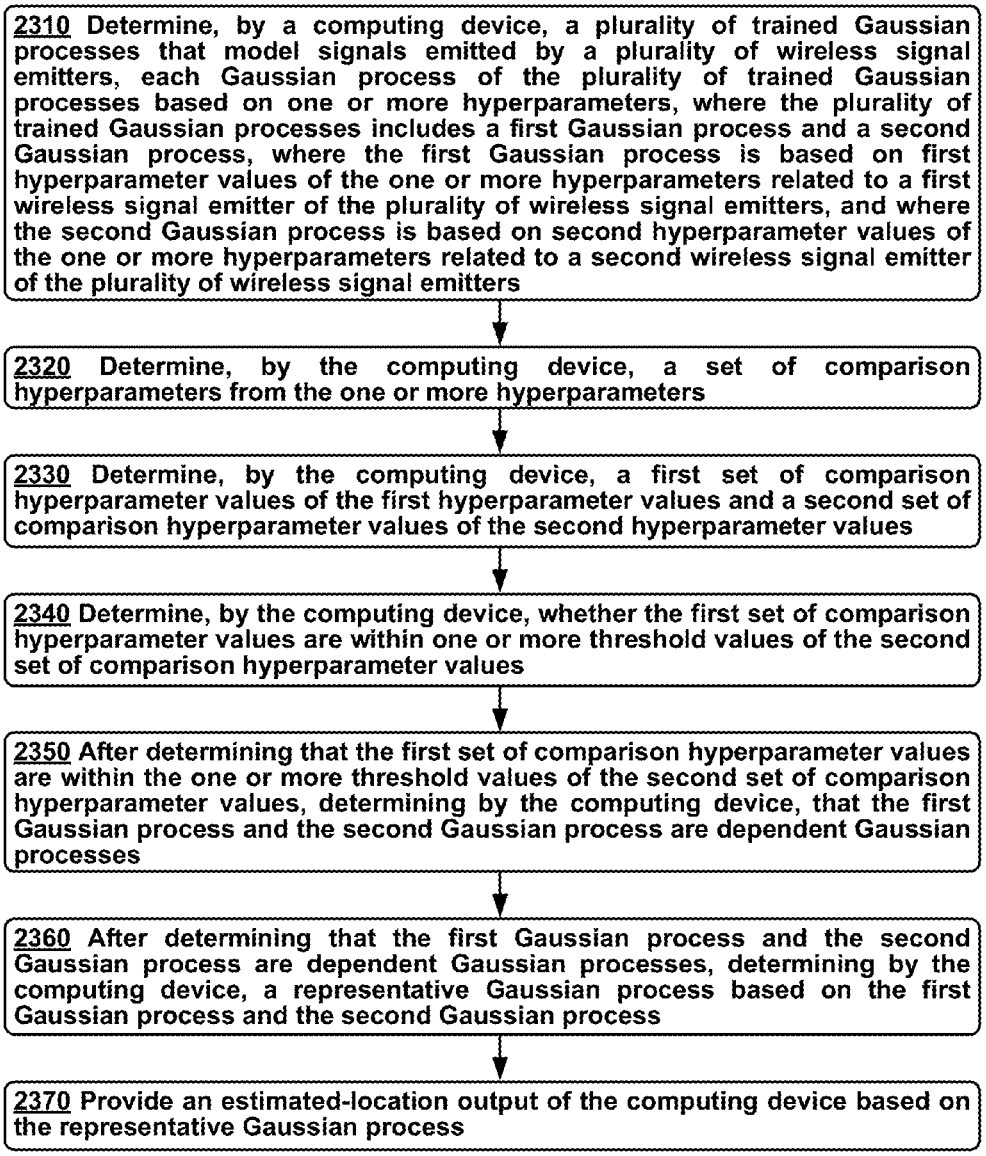
FIG. 23 is a flowchart of a method, in accordance with an example embodiment.

FIG. 23 is a flowchart of method 2300, in accordance with an example embodiment. Method 2300 can be carried out by a computing device, such as computing device 2500 described below in the context of FIG. 25.

Method 2300 can begin with block 2310, where the computing device can determine a plurality of trained Gaussian processes that model signals emitted by a plurality of wireless signal emitters. Each Gaussian process of the plurality of trained Gaussian processes can be based on one or more hyperparameters. The plurality of trained Gaussian processes can include a first Gaussian process and a second Gaussian process, where the first Gaussian process is based on first hyperparameter values of the one or more hyperparameters related to a first wireless signal emitter of the plurality of wireless signal emitters, and where the second Gaussian process is based on second hyperparameter values of the one or more hyperparameters related to a second wireless signal emitter of the plurality of wireless signal emitters, such as discussed above in the context of at least FIGS. 1 and 15-19.

In some embodiments, the one or more hyperparameters can be selected from the group of hyperparameters consisting of: a location hyperparameter, a power-output hyperparameter, a signal-attenuation hyperparameter, and a noise hyperparameter. In particular embodiments, the location hyperparameter can include a latitude hyperparameter and a longitude hyperparameter. In particular embodiments, the noise hyperparameter includes a background-noise hyperparameter and a noise-confidence hyperparameter.

In other embodiments, the first wireless signal emitter can be identified using a first wireless-signal-emitter identifier and the second wireless signal emitter can be identified using a second wireless-signal-emitter identifier. Then, the first Gaussian process can be associated with the first wireless-signal-emitter identifier and the second Gaussian process can be associated with the second wireless-signal-emitter identifier, such as discussed above in the context of at least FIGS. 15-19. In particular of the other embodiments, at least one wireless-signal-emitter identifier of the first wireless-signal-emitter identifier and the second wireless-signal-emitter identifier can include a BSSID.

At block 2320, the computing device can determine a set of comparison hyperparameters from the one or more hyperparameters, such as discussed above in the context of at least FIGS. 1 and 15-19.

At block 2330, the computing device can determine a first set of comparison hyperparameter values of the first hyperparameter values and a second set of comparison hyperparameter values of the second hyperparameter values, such as discussed above in the context of at least FIGS. 1 and 15-19.

At block 2340, the computing device can determine whether the first set of comparison hyperparameter values are within one or more threshold values of the second set of comparison hyperparameter values, such as discussed above in the context of at least FIGS. 1 and 15-19.

At block 2350, after determining that the first set of comparison hyperparameter values are within the one or more threshold values of the second set of comparison hyperparameter values, the computing device can determine that the first Gaussian process and the second Gaussian process are dependent Gaussian processes, such as discussed above in the context of at least FIGS. 1 and 15-19.

At block 2360, after determining that the first Gaussian process and the second Gaussian process are dependent Gaussian processes, the computing device can determine a representative Gaussian process based on the first Gaussian process and the second Gaussian process, such as discussed above in the context of at least FIGS. 1, 15, and 17A-17C.

In some embodiments, determining by the computing device the representative Gaussian process can include: determining first signal strength measurements used to train the first Gaussian process; determining second signal strength measurements used to train the second Gaussian process, where the first signal strength measurements can differ from the second signal strength measurements; and training the representative Gaussian process using both the first signal strength measurements and the second signal strength measurements, such as discussed above in the context of at least FIGS. 17A-17C.

In other embodiments, merging the first Gaussian process with the second Gaussian process can include: determining first signal strength measurements used to train the first Gaussian process; determining second signal strength measurements used to train the second Gaussian process, where the first signal strength measurements differ from the second signal strength measurements; training the representative Gaussian process using both the first signal strength measurements and the second signal strength measurements; and after training the representative Gaussian process, associating the representative Gaussian process with the first access-point identifier and the second access-point identifier, such as discussed above in the context of at least FIGS. 17A-17C.

At block 2370, the computing device can provide an estimated-location output based on the representative Gaussian process, such as discussed above in the context of at least FIG. 1. In some embodiments, providing the estimated-location output can include: receiving a request related to locating a mobile device; determining an estimate of the location of the mobile device based on the representative Gaussian process; generating the estimated-location output including the estimate of the location; and providing the estimated-location output. For example, the estimate of the location can include a location function, such as discussed above in the context of FIG. 1. In other embodiments, providing the estimated-location output can include: after training the representative Gaussian process, providing the estimated-location output of the computing device based on the representative Gaussian process, such as discussed above in the context of FIG. 1.

In some embodiments, method 2300 can further include: after determining, for an outlying comparison hyperparameter of the set of comparison hyperparameters, that the first outlying comparison hyperparameter value of the first hyperparameter values is not within a corresponding threshold outlying comparison hyperparameter value of the second outlying comparison hyperparameter value of the second hyperparameter values, determining, by the computing device, that the first Gaussian process is independent of the second Gaussian process, such as discussed above in the context of at least FIGS. 1, 15, 18 and 19.

Example Data Network

Figure 24:
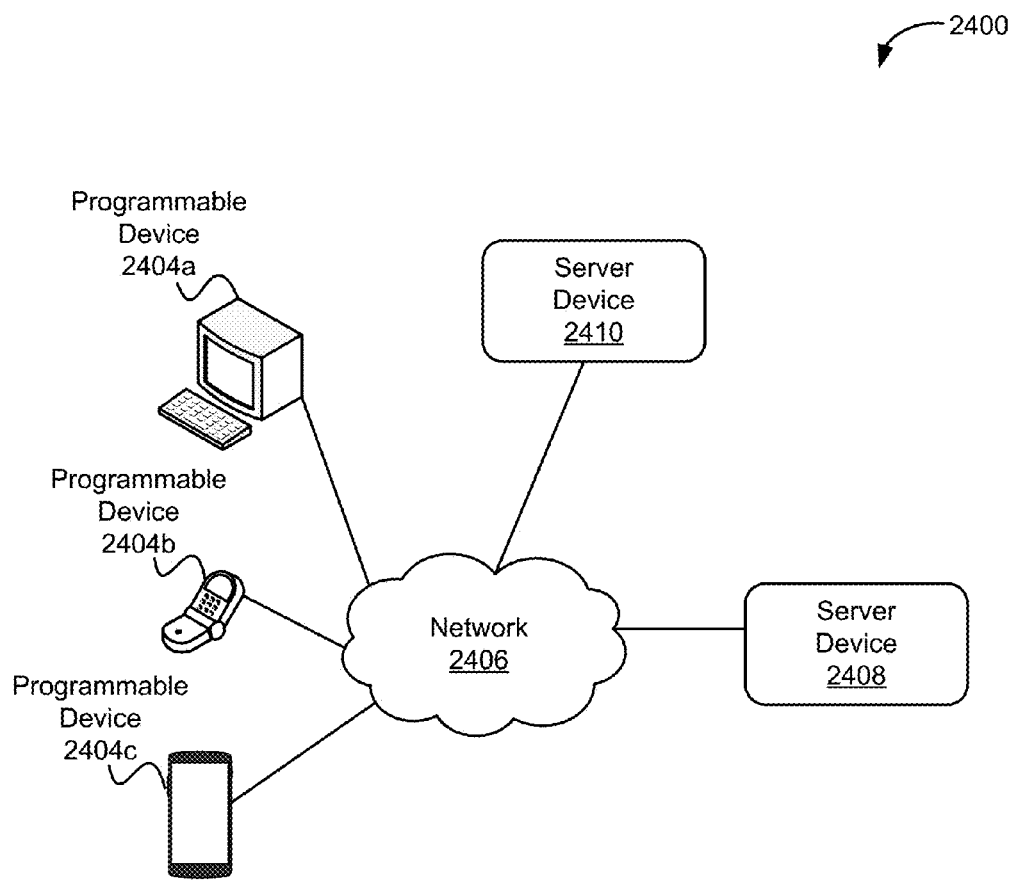
FIG. 24 depicts a distributed computing architecture, in accordance with an example embodiment.

FIG. 24 depicts a distributed computing architecture 2400 with server devices 2408, 2410 configured to communicate, via network 2406, with programmable devices 2404a, 2404b, and 2404c, in accordance with an example embodiment. Network 2406 may correspond to a LAN, a wide area network (WAN), a corporate intranet, the public Internet, or any other type of network configured to provide a communications path between networked computing devices. The network 2406 may also correspond to a combination of one or more LANs, WANs, corporate intranets, and/or the public Internet.

Although FIG. 24 only shows three programmable devices, distributed application architectures may serve tens, hundreds, or thousands of programmable devices. Moreover, programmable devices 2404a, 2404b, and 2404c (or any additional programmable devices) may be any sort of computing device, such as an ordinary laptop computer, desktop computer, network terminal, wireless communication device (e.g., a cell phone or smart phone), and so on. In some embodiments, programmable devices 2404a, 2404b, and 2404c may be dedicated to the design and use of software applications. In other embodiments, programmable devices 2404a, 2404b, and 2404c may be general purpose computers that are configured to perform a number of tasks and need not be dedicated to software development tools. In particular embodiments, the functionality of programmable devices 104, 106 can be performed by one or more of programmable devices 2404a, 2404b, and 2404c.

Server devices 2408, 2410 can be configured to perform one or more services, as requested by programmable devices 2404a, 2404b, and/or 2404c. For example, server device 2408 and/or 2410 can provide content to programmable devices 2404a-2404c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 2408 and/or 2410 can provide programmable devices 2404a-2404c with access to software for database, search, computation, graphical, audio, video, World Wide Web/Internet utilization, and/or other functions. Many other examples of server devices are possible as well.

Computing Device Architecture

Figure 25A:
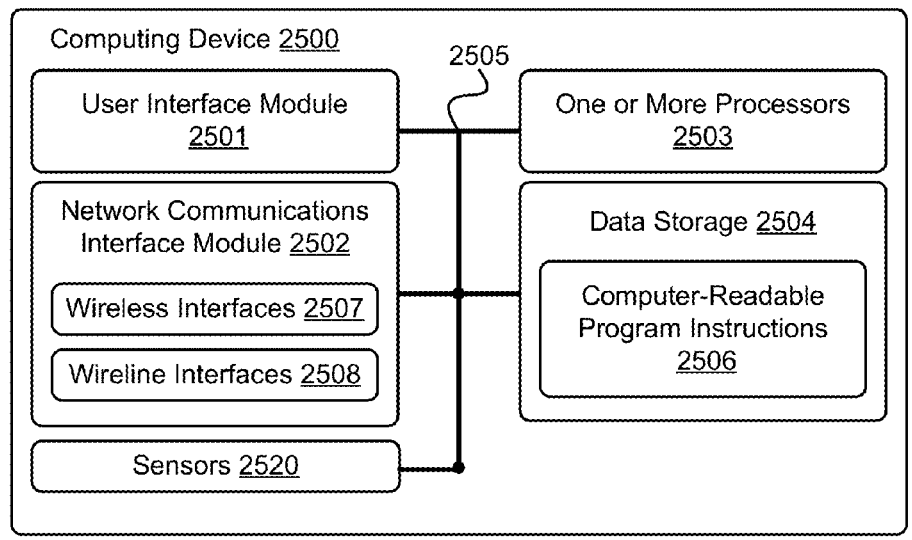
FIG. 25A is a block diagram of a computing device, in accordance with an example embodiment.

FIG. 25A is a block diagram of a computing device 2500 (e.g., system) in accordance with an example embodiment. In particular, computing device 2500 shown in FIG. 25A can be configured to perform one or more functions of Gaussian process pipeline 100, computing device 102, signal strength measurement receiving module 120, bin sorting module 124, bin statistics module 130, Gaussian process training module 140, Gaussian process verification module 150, Gaussian process dependency checking module 160, location function generation module 170, location function selection module 180, network 2406, server devices 2408, 2410, and/or one or more of programmable devices 104, 106, 2404a, 2404b, and 2404c. Computing device 2500 may include a user interface module 2501, a network-communication interface module 2502, one or more processors 2503, data storage 2504, and sensors 2520, all of which may be linked together via a system bus, network, or other connection mechanism 2505.

User interface module 2501 can be operable to send data to and/or receive data from external user input/output devices. For example, user interface module 2501 can be configured to send and/or receive data to and/or from user input devices such as a keyboard, a keypad, a touch screen, a computer mouse, a track ball, a joystick, a camera, a voice recognition module, and/or other similar devices. User interface module 2501 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 2501 can also be configured to generate audible output(s), such as a speaker, speaker jack, audio output port, audio output device, earphones, and/or other similar devices.

Network-communications interface module 2502 can include one or more wireless interfaces 2507 and/or one or more wireline interfaces 2508 that are configurable to communicate via a network, such as network 2406 shown in FIG. 24. Wireless interfaces 2507 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 2508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 2502 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 2503 can include one or more general purpose processors and/or one or more special purpose processors (e.g., digital signal processors, application specific integrated circuits, etc.). Processors 2503 can be configured to execute computer-readable program instructions 2506 that are contained in the data storage 2504 and/or other instructions as described herein.

Data storage 2504 can include one or more computer-readable storage media that can be read and/or accessed by at least one of processors 2503. The one or more computer-readable storage media can include volatile and/or non-volatile storage components, such as optical, magnetic, organic or other memory or disc storage, which can be integrated in whole or in part with at least one of processors 2503. In some embodiments, data storage 2504 can be implemented using a single physical device (e.g., one optical, magnetic, organic or other memory or disc storage unit), while in other embodiments, data storage 2504 can be implemented using two or more physical devices.

Data storage 2504 can include computer-readable program instructions 2506 and perhaps additional data, such as but not limited to data used by one or more modules and/or other components of Gaussian process pipeline 100. In some embodiments, data storage 2504 can additionally include storage required to perform at least part of the methods and techniques and/or at least part of the functionality of the devices and networks.

Sensors 2520 can be configured to measure conditions in an environment for computing device 2500 and provide data about that environment. The data can include, but is not limited to, location data about computing device 2500, velocity (speed, direction) data about computing device 2500, acceleration data about computing device, and other data about the environment for computing device 2500. Sensors 2520 can include, but are not limited to, GPS sensor(s), location sensors(s), gyroscope(s), accelerometer(s), magnetometer(s), camera(s), light sensor(s), infrared sensor(s), and microphone(s).

Other components of computing device 2500 can provide data about the environment of computing device 2500 as well. For example, wireline interfaces 2507 and wireless interfaces 2508 can provide information about networks that are accessible and/or accessed by computing device 2500, as well as other environmental information (e.g., weather information). As another example, user interface 2501 can request and receive data from a user of computing device 2500. Other examples are possible as well.

Cloud-Based Servers

Figure 25B:
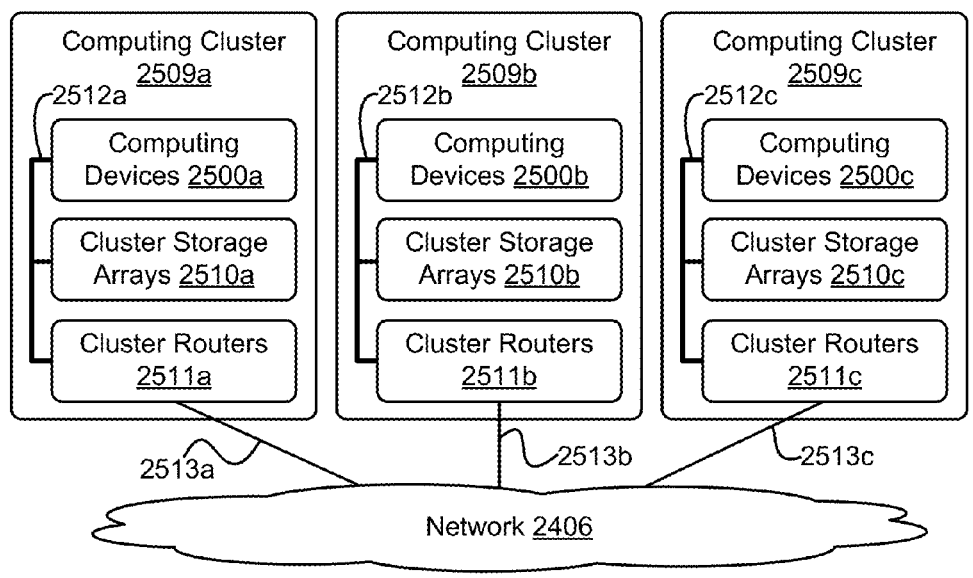
FIG. 25B depicts a cloud-based server system, in accordance with an example embodiment.

FIG. 25B depicts network 2406 of computing clusters 2509a, 2509b, 2509c arranged as a cloud-based server system in accordance with an example embodiment. Server devices 2408 and/or 2410. Some or all of the modules/components of Gaussian process pipeline 100 can be cloud-based devices that store program logic and/or data of cloud-based applications and/or services. In some embodiments, Gaussian process pipeline 100 can be on a single computing device residing in a single computing center. In other embodiments, Gaussian process pipeline 100 can include multiple computing devices in a single computing center, or even multiple computing devices located in multiple computing centers located in diverse geographic locations. For example, Gaussian process pipeline 100 can be on each of server devices 2408 and 2410, and FIG. 24 depicts each of server devices 2408 and 2410 residing in different physical locations.

In some embodiments, software and data associated with Gaussian process pipeline 100 can be encoded as computer readable information stored in non-transitory, tangible computer readable media (or computer readable storage media) and accessible by programmable devices 2404a, 2404b, and 2404c, and/or other computing devices. In some embodiments, data associated with Gaussian process pipeline 100 can be stored on a single disk drive or other tangible storage media, or can be implemented on multiple disk drives or other tangible storage media located at one or more diverse geographic locations.

FIG. 25B depicts a cloud-based server system in accordance with an example embodiment. In FIG. 25B, the functions of Gaussian process pipeline 100 can be distributed among three computing clusters 2509a, 2509b, and 2508c. Computing cluster 2509a can include one or more computing devices 2500a, cluster storage arrays 2510a, and cluster routers 2511a connected by a local cluster network 2512a. Similarly, computing cluster 2509b can include one or more computing devices 2500b, cluster storage arrays 2510b, and cluster routers 2511b connected by a local cluster network 2512b. Likewise, computing cluster 2509c can include one or more computing devices 2500c, cluster storage arrays 2510c, and cluster routers 2511c connected by a local cluster network 2512c.

In some embodiments, each of the computing clusters 2509a, 2509b, and 2509c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 2509a, for example, computing devices 2500a can be configured to perform various computing tasks of Gaussian process pipeline 100. In one embodiment, the various functionalities of Gaussian process pipeline 100 can be distributed among one or more of computing devices 2500a, 2500b, and 2500c. Computing devices 2500b and 2500c in computing clusters 2509b and 2509c can be configured similarly to computing devices 2500a in computing cluster 2509a. On the other hand, in some embodiments, computing devices 2500a, 2500b, and 2500c can be configured to perform different functions.

In some embodiments, computing tasks and stored data associated with Gaussian process pipeline 100 be distributed across computing devices 2500a, 2500b, and 2500c based at least in part on the storage and/or processing requirements of some or all components/modules of Gaussian process pipeline 100, the storage and/or processing capabilities of computing devices 2500a, 2500b, and 2500c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 2510a, 2510b, and 2510c of the computing clusters 2509a, 2509b, and 2509c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of Gaussian process pipeline 100 can be distributed across computing devices 2500a, 2500b, and 2500c of computing clusters 2509a, 2509b, and 2509c, various active portions and/or backup portions of data for these components can be distributed across cluster storage arrays 2510a, 2510b, and 2510c. For example, some cluster storage arrays can be configured to store the data of one or more modules/components of Gaussian process pipeline 100, while other cluster storage arrays can store data of other modules/components of Gaussian process pipeline 100 Additionally, some cluster storage arrays can be configured to store backup versions of data stored in other cluster storage arrays.

The cluster routers 2511a, 2511b, and 2511c in computing clusters 2509a, 2509b, and 2509c can include networking equipment configured to provide internal and external communications for the computing clusters. For example, the cluster routers 2511a in computing cluster 2509a can include one or more internet switching and routing devices configured to provide (i) local area network communications between the computing devices 2500a and the cluster storage arrays 2501a via the local cluster network 2512a, and (ii) wide area network communications between the computing cluster 2509a and the computing clusters 2509b and 2509c via the wide area network connection 2513a to network 2406. Cluster routers 2511b and 2511c can include network equipment similar to the cluster routers 2511a, and cluster routers 2511b and 2511c can perform similar networking functions for computing clusters 2509b and 2509b that cluster routers 2511a perform for computing cluster 2509a.

In some embodiments, the configuration of the cluster routers 2511a, 2511b, and 2511c can be based at least in part on the data communication requirements of the computing devices and cluster storage arrays, the data communications capabilities of the network equipment in the cluster routers 2511a, 2511b, and 2511c, the latency and throughput of local networks 2512a, 2512b, 2512c, the latency, throughput, and cost of wide area network links 2513a, 2513b, and 2513c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
receiving a plurality of signal strength measurements at a computing device, wherein a particular signal strength measurement of the plurality of signal strength measurements comprises a wireless-signal-emitter identifier and a signal strength value and is associated with a measurement location;
determining by the computing device a plurality of measurement bins, wherein a particular measurement bin of the plurality of measurement bins is associated with a bin location, wherein the particular measurement bin comprises a plurality of statistics for each of one or more wireless signal emitters, and wherein the plurality of statistics comprise a mean value and a standard deviation value;
determining by the computing device a particular measurement bin of the plurality of measurement bins, the particular measurement bins is associated with the measurement location of the particular signal strength measurement;
determining by the computing device a particular plurality of statistics of the particular measurement bin that are associated with a wireless signal emitter identified by the wireless-signal-emitter identifier of the particular signal strength measurement;
updating by the computing device the particular plurality of statistics based on the signal strength value of the particular signal strength measurement; and
providing by the computing device an estimated location output based on the plurality or measurement bins.

2. The method of claim 1, where providing the estimated location output comprises: receiving a request related to locating a mobile device;
determining by the computing device an estimate of the location of the mobile device based on the plurality of measurement bins;
generating by the computing device the estimated location output comprising the estimate of the location; and
providing the estimated location output.

3. The method of claim 1, wherein the plurality or signal strength measurements comprise a plurality of mobile-device-related signal strength measurements, and wherein each signal strength measurement of the plurality of mobile-device-related signal strength measurements is associated with a mobile device.

4. The method of claim 1, further comprising:
generating by the computing device a spatial index based on the measurement locations of the plurality of measurement bins, wherein the spatial index is configured to enable geographically-related queries regarding the plurality of measurement bins.

5. The method of claim 1, wherein the particular plurality of statistics have a normal-gamma distribution, and wherein updating the particular plurality of statistics based on the signal strength value of the signal strength measurement comprises:
determining by the computing device a number of observations related to the particular plurality of statistics; and
determining by the computing device an updated mean value and an updated standard deviation value for the particular plurality of statistics based on the number of observations, the mean value, and the signal strength value.

6. The method of claim 1, wherein the plurality of measurement bins are each associated with a bin area that includes the bin location.

7. The method of claim 1, wherein the plurality of measurement bins comprise a first measurement bin associated with a first bin area having a first bin area size and a second measurement bin associated with a second bin area having a second bin area size, and wherein the first bin area size differs from the second bin area size.

8. The method of claim 1, wherein the plurality of measurement bins are each associated with a number of signal strength measurements, and wherein the method further comprises:
determining a threshold number of per-bin signal strength measurements;
for at least one measurement bin of the plurality or measurement bins: determining whether the number of signal strength measurements associated with the at least one measurement bin is below the threshold number of per-bin signal strength measurements; and
after determining that the number of signal strength measurements associated with the at least one measurement bin is below the threshold number of per-bin signal strength measurements, merging the measurement bin with a designated measurement bin of the plurality of measurement bins, wherein the designated measurement bin is associated with at least the threshold number of per-bin signal strength measurements.

9. A computing device, comprising: one or more processors; and
data storage, configured to store at least computer-readable program instructions, wherein the instructions are configured to, upon execution by the one or more processors, cause the computing device to perform functions comprising:
receiving a plurality of signal strength measurements, wherein a particular signal strength measurement of the plurality of signal strength measurements comprises a wireless-signal-emitter identifier and a signal strength value and is associated with a measurement location;
determining a plurality of measurement bins, wherein a particular measurement bin of the plurality of measurement bins is associated with a bin location, wherein the particular measurement bin comprises a plurality of statistics for each of one or more wireless signal emitters, and wherein the plurality of statistics comprise a mean value and a standard deviation value;
determining a particular measurement bin of the plurality of measurement bins, the particular measurement bin having a bin location associated with the measurement location of the particular signal strength measurement;
determining a particular plurality of statistics of the particular measurement bin that are associated with a wireless signal emitter identified by the wireless-signal-emitter identifier of the particular signal strength measurement;
updating the particular plurality of statistics based on the signal strength value of the particular signal strength measurement; and
providing an estimated location output based on the plurality of measurement bins.

10. The computing device of claim 9, where providing the estimated location output comprises:
receiving a request related to locating a mobile device;
determining an estimate of the location of the mobile device based on the plurality of measurement bins;
generating the estimated location output comprising the estimate of the location; and providing the estimated location output.

11. The computing device of claim 9, wherein the plurality of signal strength measurements comprise a plurality of mobile-device-related signal strength measurements, and wherein each signal strength measurement of the plurality of mobile-device-related signal strength measurements is associated with a mobile device.

12. The computing device of claim 9, wherein the functions further comprise: generating a spatial index based on the measurement locations or the plurality of measurement bins, wherein the spatial index is configured to enable geographically-related queries regarding the plurality of measurement bins.

13. The computing device of claim 9, wherein the particular plurality of statistics have a normal-gamma distribution, and wherein updating the particular plurality of statistics based on the signal strength value of the signal strength measurement comprises:
determining a number of observations related to the particular plurality of statistics; and
determining an updated mean value and an updated standard deviation value for the particular plurality of statistics based on the number of observations, the mean value, and the signal strength value.

14. The computing device of claim 9, wherein the plurality of measurement bins are each associated with a bin area, that includes the bin location.

15. The computing device of claim 9, wherein the plurality of measurement bins comprise a first measurement bin associated with a first bin area having a first bin area size and a second measurement bin associated with a second bin area having a second bin area size, and wherein the first bin area size differs from the second bin area size.

16. The computing device of claim 9, wherein the plurality of measurement bins are each associated with a number of signal strength measurements, and wherein the method further comprises:
determining a threshold number of per-bin signal strength measurements; for at least one measurement bin of the plurality of measurement bins: determining whether the number of signal strength measurements associated with the at least one measurement bin is below the threshold number of per-bin signal strength measurements; and
after determining that the number of signal strength measurements associated with the at least one measurement bin is below the threshold number of per-bin signal strength measurements, merging the at least one measurement bin with a designated measurement bin of the plurality of measurement bins, wherein the designated measurement bin is associated with at least the threshold number of per-bin signal strength measurements.

17. An article of manufacture including a Non-transitory computer-readable storage medium having instructions stored thereon that, in response to execution by one or more processors, cause the one or more processors to perform functions comprising:

receiving a plurality of signal strength measurements, wherein a particular signal strength measurement of the plurality of signal strength measurements comprises a wireless-signal-emitter identifier and a signal strength value and is associated with a measurement location;

determining a plurality of measurement bins, wherein a particular measurement bin of the plurality of measurement bins is associated with a bin location, wherein the particular measurement bin comprises a plurality of statistics for each of one or more wireless signal emitters; and wherein the plurality of statistics comprise a mean value and a standard deviation value;

determining a particular measurement bin of the plurality of measurement bins, the particular measurement bin having a bin location associated with the measurement location of the particular signal strength measurement;

determining a particular plurality of statistics of the particular measurement bin that are associated with a wireless signal emitter identified by the wireless-signal-emitter identifier of the particular signal strength measurement;

updating the particular plurality of statistics based on the signal strength value of the particular signal strength measurement; and providing an estimated location output based on the plurality of measurement bins.

18. The article of manufacture of claim 17, where providing the estimated location output comprises:

receiving a request related to locating a mobile device;

determining an estimate of the location of the mobile device based on the plurality of measurement bins;

generating the estimated location output comprising the estimate of the location; and providing the estimated location output.

19. The article of manufacture of claim 17, wherein the plurality of signal strength measurements comprise a plurality of mobile-device-related signal strength measurements; and wherein each signal strength measurement of the plurality of mobile-device-related signal strength measurements is associated with a mobile device.

20. The article of manufacture of claim 17, wherein the particular plurality of statistics have a normal-gamma distribution, and wherein updating the particular plurality of statistics based on the signal strength value of the signal strength measurement comprises:

determining a number of observations related to the particular plurality of statistics; and determining an updated mean value and an updated standard deviation value for the particular plurality of statistics based on the number of observations, the mean value, and the signal strength value.

* * * * *